United States Patent [19]

Musgrave

[11] E Re. 30,347

[45] Reissued Jul. 22, 1980

[54] CORRECTIONS FOR SEISMIC DATA OBTAINED FROM EXPANDING-SPREAD

[75] Inventor: Albert W. Musgrave, Dallas, Tex.

[73] Assignee: Mobil Oil Corporation, New York, N.Y.

[21] Appl. No.: 815,518

[22] Filed: Jul. 14, 1977

Related U.S. Patent Documents

Reissue of:

[64] Patent No.: 3,697,939
Issued: Oct. 10, 1972
Appl. No.: 101,776
Filed: Dec. 28, 1970

U.S. Applications:

[63] Continuation of Ser. No. 496,735, Sep. 30, 1965, abandoned, which is a continuation-in-part of Ser. No. 95,111, Mar. 13, 1961, abandoned.

[51] Int. Cl.[2] ..... G01V 1/36

[52] U.S. Cl. ..... 367/51; 367/59; 346/33 C

[58] Field of Search ..... 340/15.5 TD, 15.5 MC, 340/15.5 TC; 346/33 C; 367/51, 59

[56] References Cited

U.S. PATENT DOCUMENTS

| | | | |
|---|---|---|---|
| 1,909,205 | 5/1933 | McCollum | 340/15.5 |
| 1,923,107 | 8/1933 | McCollum | 340/15.5 |
| 2,021,943 | 11/1935 | McCollum | 340/15.5 |
| 2,087,120 | 7/1937 | Salvatori et al. | 340/15.5 |
| 2,231,575 | 2/1941 | Gardner | 340/15.5 |
| 2,555,806 | 6/1951 | Mitchell, Jr. | 340/15.5 |
| 2,658,579 | 11/1953 | Rieber | 340/15.5 |
| 2,732,906 | 1/1956 | Mayne | 340/15.5 |
| 2,795,287 | 6/1957 | Sharpe | 340/15.5 |
| 2,858,523 | 10/1958 | Hawkins | 340/15.5 |
| 2,886,795 | 5/1959 | Thatcher | 340/15.5 |
| 2,941,184 | 6/1960 | Moody | 340/15.5 |
| 2,946,393 | 7/1960 | Hawkins | 340/15.5 |
| 2,950,459 | 8/1960 | Loper | 340/15.5 |
| 2,980,885 | 4/1961 | Mize et al. | 340/15.5 |
| 2,981,928 | 4/1961 | Crawford et al. | 340/15.5 |
| 2,988,729 | 6/1961 | Musgrave | 340/15.5 |
| 2,990,535 | 6/1961 | Parkinson et al. | 340/15.5 |
| 3,005,184 | 10/1961 | Savit | 340/15.5 |
| 3,016,970 | 1/1962 | Allyn et al. | 340/15.5 |
| 3,027,085 | 3/1962 | Evans | 340/15.5 |
| 3,041,578 | 6/1962 | Elliot | 340/15.5 |
| 3,075,172 | 1/1963 | Loper et al. | 340/15.5 |
| 3,076,176 | 1/1963 | Lawrence | 340/15.5 |
| 3,105,568 | 10/1963 | Jolly | 340/15.5 |
| 3,156,892 | 11/1964 | Woods et al. | 340/15.5 |
| 3,223,967 | 12/1965 | Lash | 340/15.5 |

OTHER PUBLICATIONS

"Seismic Velocities from Surface Measurements", Dix, *Geophysics*, vol. 20, No. 1, Jan. 1955.

"Complex Reflection Patterns and Their Geologic Sources", Rieber, *Geophysics*, vol. 2, No. 2, Mar. 1937.

"Vertical Velocities and Reflection Shooting", Gardiner, *Geophysics*, vol. 12, No. 2, Apr. 1947.

"Velocity Determinations by Means of Reflection Profiles", Green, *Geophysics*, vol. 3, No. 4, Oct. 1938.

*Primary Examiner*—Howard A. Birmiel
*Attorney, Agent, or Firm*—C. A. Huggett; W. J. Scherback

[57] ABSTRACT

Seismic signals from detectors forming split spreads are utilized to correct for weathering, elevation, and the like signals from detectors forming an expanded spread. The signals of the seismic section delineated by the expanded spread have applied thereto time changes under the control of a hyperbolic generator. There are generated as a result of the sweeping across the section and lengthwise thereof of the seismic signals the generation of functions utilized to provide normal moveout corrections of greater precision or accuracy than heretofore. With the normal moveout corrections of greater accuracy applied to the signals of the seismic section, additional corrections are made for dip and thereafter for delineation of the velocity characteristics of the earth along the stratigraphic column. There is included provision not only for identification of primary reflections and multiples but also for the elimination of multiples from the signals of the seismic section. The foregoing operations are carried out in an automatic system which may be either of the analog or digital type.

48 Claims, 31 Drawing Figures

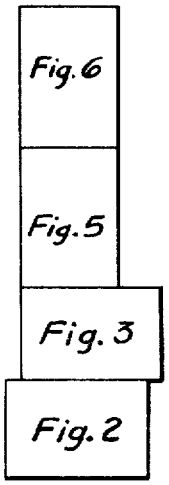
Fig. 1C
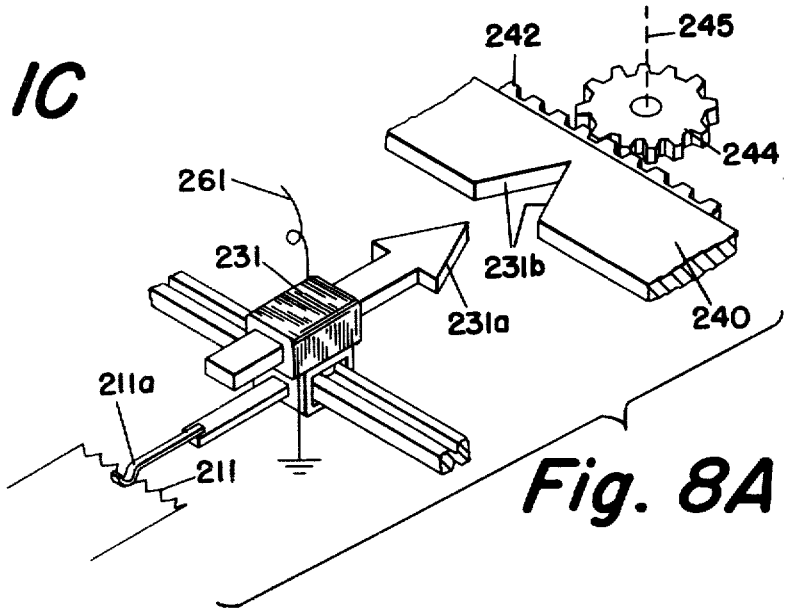
Fig. 8A
Fig. 4
| RIGHT TRACE | RECORDER LOCATION | LEFT TRACE | SHOOTERS NO. 1 EXP. SPREAD | SHOOTERS NO. 2 SPLITS |
|---|---|---|---|---|
| 11 | D | 16 | E → | D → |
| 14 | C | 19 | B ← | C → |
| 17 | A | 22 | – → | A → |
| 20 | B | 25 | C ← | B → |
| 23 | E | 28 | D → | E → |
Fig. 5A
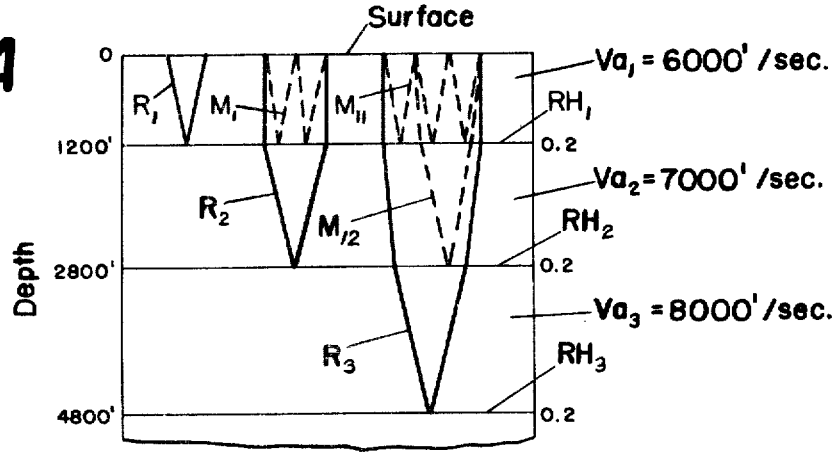

51
51a
51b
51c
51d
51e
S.P.D
S.P.C
S.P.A
S.P.B.
S.P.E.
R
38
Recorder
34
33
30
11
RH1
S2
P2
P3
S1
P1
D
C
A
B
E
36
35
50a
50d
50c
50b
50e
S.P.E.
S.P.C.
S.P.A.
S.P.B
S.P.D.
50
Recorder
28
37

$$\Delta T_1 = \sqrt{\frac{X^2}{V_a^2} + T_o^2} - T_o \quad (1)$$

160
SQUELCH CIRCUITS
PICK-UP HEADS
P
RECORD HEADS
R
162
166
0
.4
.8
1.2
1.6
R1
R2
R3
M1
M11
M12
161
149
SEISMIC RECORDS
-6 -5 -4 -3 -2 -1 0 +1 +2
RECORD HEADS
PICK-UP HEADS

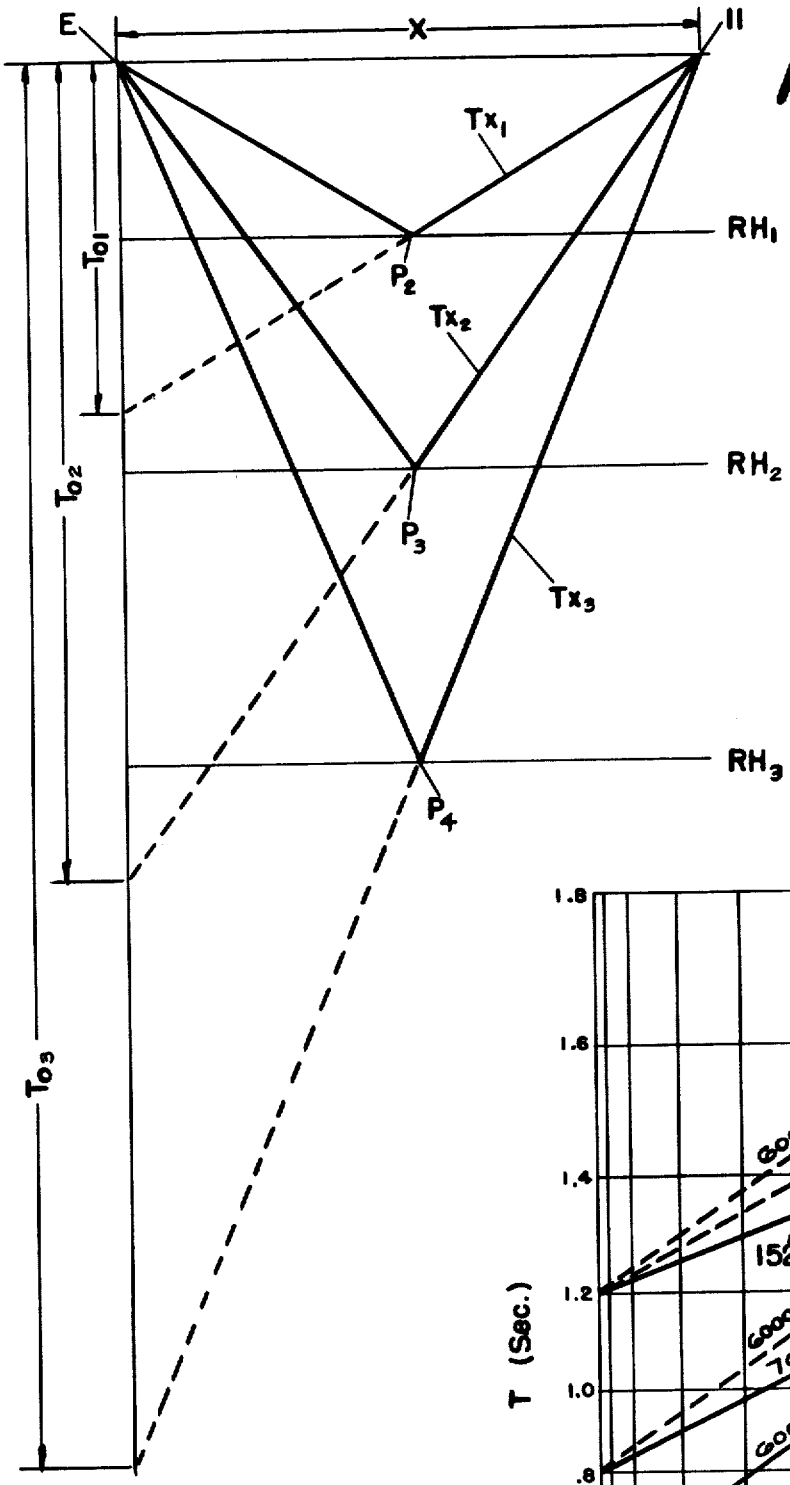
Fig. 6A
Fig. 6B
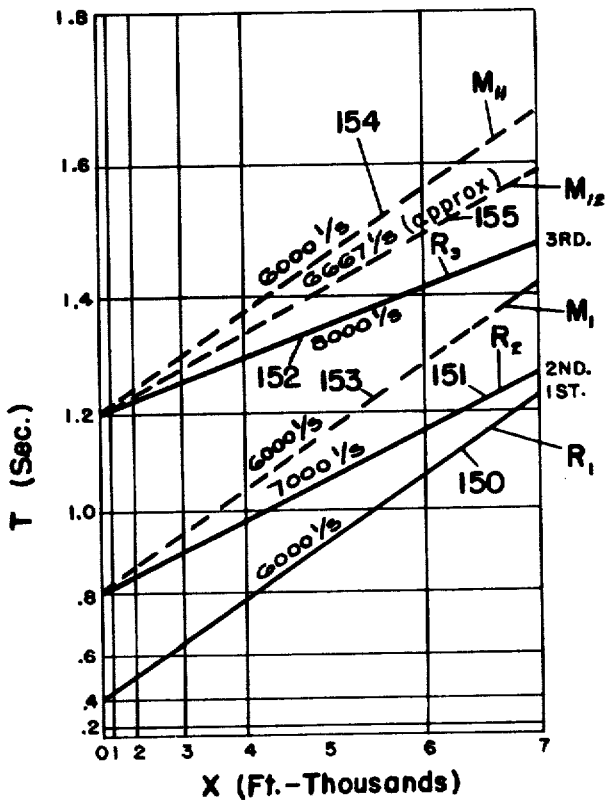

SEISMIC RECORD
166
-2 -1 0 +1 +2
252
A
247
REDUCTION GEARING
254
STEP DRIVE
246
258
265
264
263
253
266
245
261
262
ROLLERS
241
SOLENOIDS
211a
221
231b
240
211
231
231a
212a
222
232b
212
232
232a
213a
223
233b
213
233
233a
209
214a
224
234b
242
208
214
234
234a
215a
225
235b
244
215
235
216a
226
235a
216
217a
227
217
228
218
218a
208a
220
219
241

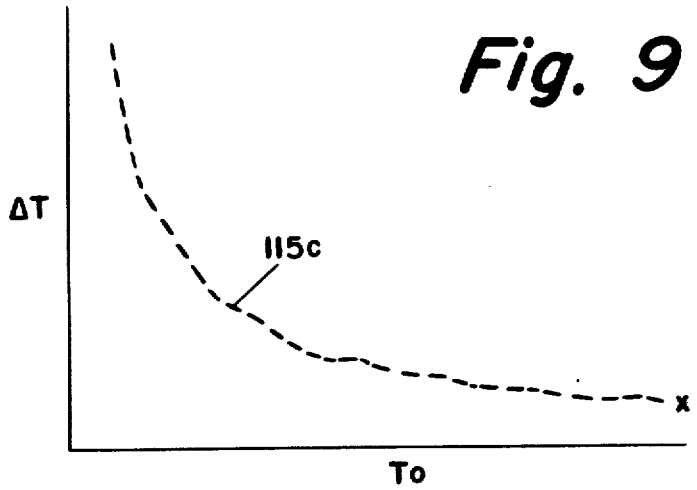
Fig. 9
Fig. 10
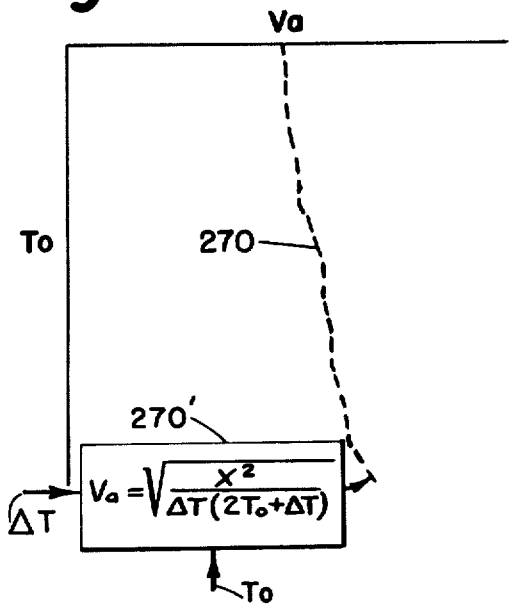
Fig. 11
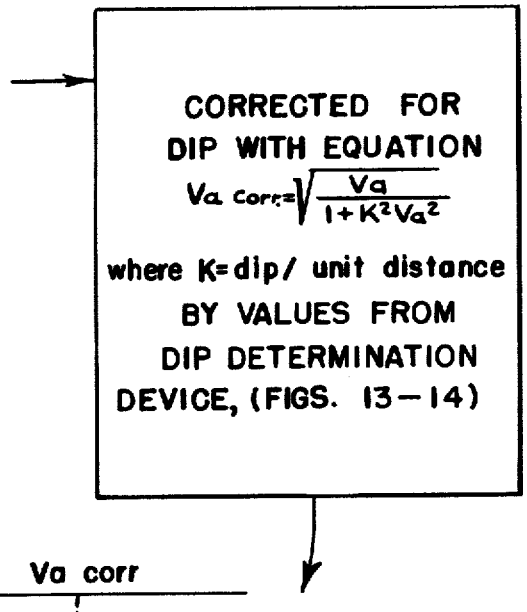
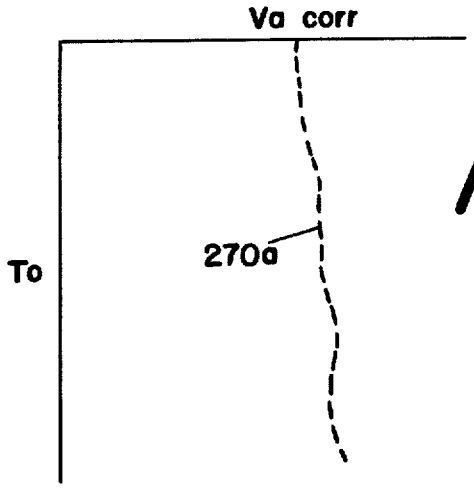
Fig. 12

DYNAMIC TIME CORRECTION
$\Delta T_d$
403
402
404
$T_o$ = VERTICAL TIME $R_3$
401
445 SMOOTHING FILTER
$R_3$
444 RECTIFIER SQUELCH CIRCUITS
430
429
PLAYBACK HEADS
P
R
RECORD HEADS
416
431
426
SEISMIC RECORDS
$R_1$
$R_2$
$M_1$
$R_3$
$M_{12}$
$M_{11}$
0
.4
.8
1.2
1.6
RECORD HEADS
R
PLAYBACK HEADS
P
9000
8500
8000
7500
7000
6500
6000
5500
5000

CORRECTIONS FOR SEISMIC DATA OBTAINED FROM EXPANDING-SPREAD

Matter enclosed in heavy brackets [ ] appears in the original patent but forms no part of this reissue specification; matter printed in italics indicates the additions made by reissue.

CROSS REFERENCE TO RELATED APPLICATION

Continuation of Ser. No. 496,735, Sept. 30, 1965, abandoned, which is a continuation-in-part of Ser. No. 95,111, March 13, 1961, abandoned.

BACKGROUND OF THE INVENTION

This invention relates to seismic exploration and more particularly to methods and systems for obtaining and utilizing seismic data obtained from expanding-spreads.

In a more specific aspect of the invention, velocity profiles are now made available for vertical sections of earth formations underlying expanding-spread profiles, which heretofore have been available only by actual measurements in holes drilled through such sections.

In seismic exploration, acoustic waves generated by production of seismic impulses as by explosion of a charge of dynamite or by weight dropping techniques at near surface sending stations are detected after reflection from subsurface beds to produce seismic signals which by reason of time occurrence of reflection components therein are related to the depth and the attitude of subsurface reflecting beds. However, due to the nature of the seismic process itself and the instrumentation employed for detecting and recording such signals, the useful information may be considered to be that from a very narrow band as compared with the seismic waves initially generated. Therefore, the information and data from ordinary seismic records as to the depth and layering of surface structures are correspondingly limited.

In the past, detailed and exact data as to the acoustic properties of the subsurface formations have been obtained by incremental velocity logs of bore holes extending through the formation of interest. However, it frequently is most desirable to be able to obtain such information without the attendant expense of a drilling program to provide the necessary bore holes.

SUMMARY OF THE INVENTION

In accordance with the present invention, data from expanding seismic-spreads are transformed into information as to the velocity distribution or characteristics of the vertical section lying at the center of the expanding-spread. By carrying out expanding-spread operations at each of a plurality of points along a selected profile, variations in subsurface structure underlying such profile may be detected from the resultant velocity data derived from the expanding-spread seismic signals. In accordance with the present invention, the foregoing is achieved by providing expanded-spread seismic signals which are accurately corrected as to time both for surface variations and for the geometrical spreading present in expanded-spread operations, the elimination of otherwise obscuring secondary reflections, and the derivation from signals representative of primary reflections of data necessary to check the correctness of available velocity information and to provide corrections if needed.

It is therefore an object of the invention to provide a method and system for correcting individually the multiplicity of traces of seismographic records for static corrections in those areas where variables such as weathering and elevation are encountered.

It is a further object of the invention to provide for the correction of an assumed velocity profile by utilization of primary reflection signals present in expanding-spread seismic data.

In carrying out the present invention there have been devised methods, apparatus and systems in themselves new and by means of which there may be obtained data from seismic surveys corrected and modified in a manner to render more useful and reliable seismic interpretations thereof. Immediately following the identification of the several Figures, there will be presented a brief summary outline of selected novel aspects both in respect to methods and apparatus.

DESCRIPTION OF THE DRAWINGS

FIG. 1C illustrates the manner in which

FIGS. 2, 3, 5, 6, 7, 8 and 8A diagrammatically illustrate a substantial part of the apparatus embodying the present invention and by means of which the invention thereof may be practiced;

FIG. 4 is a chart of a "shooting" schedule useful in the practice of the invention as illustrated in FIG. 2;

FIG. 5A is a chart illustrating multiple travel paths;

FIG. 6A is a ray chart illustrating the travel of seismic waves in the subsurface layers;

FIG. 6B is a graph illustrative of background theory underlying the present invention;

FIGS. 9, 10, 11 and 12 are graphs or blocks including equations therein which are illustrative of the nature of corrected data obtainable in accordance with the present invention and of the manner in which such corrected data is further utilized;

A MORE DETAILED DESCRIPTION OF THE PREFERRED EMBODIMENTS

Figure 1A:
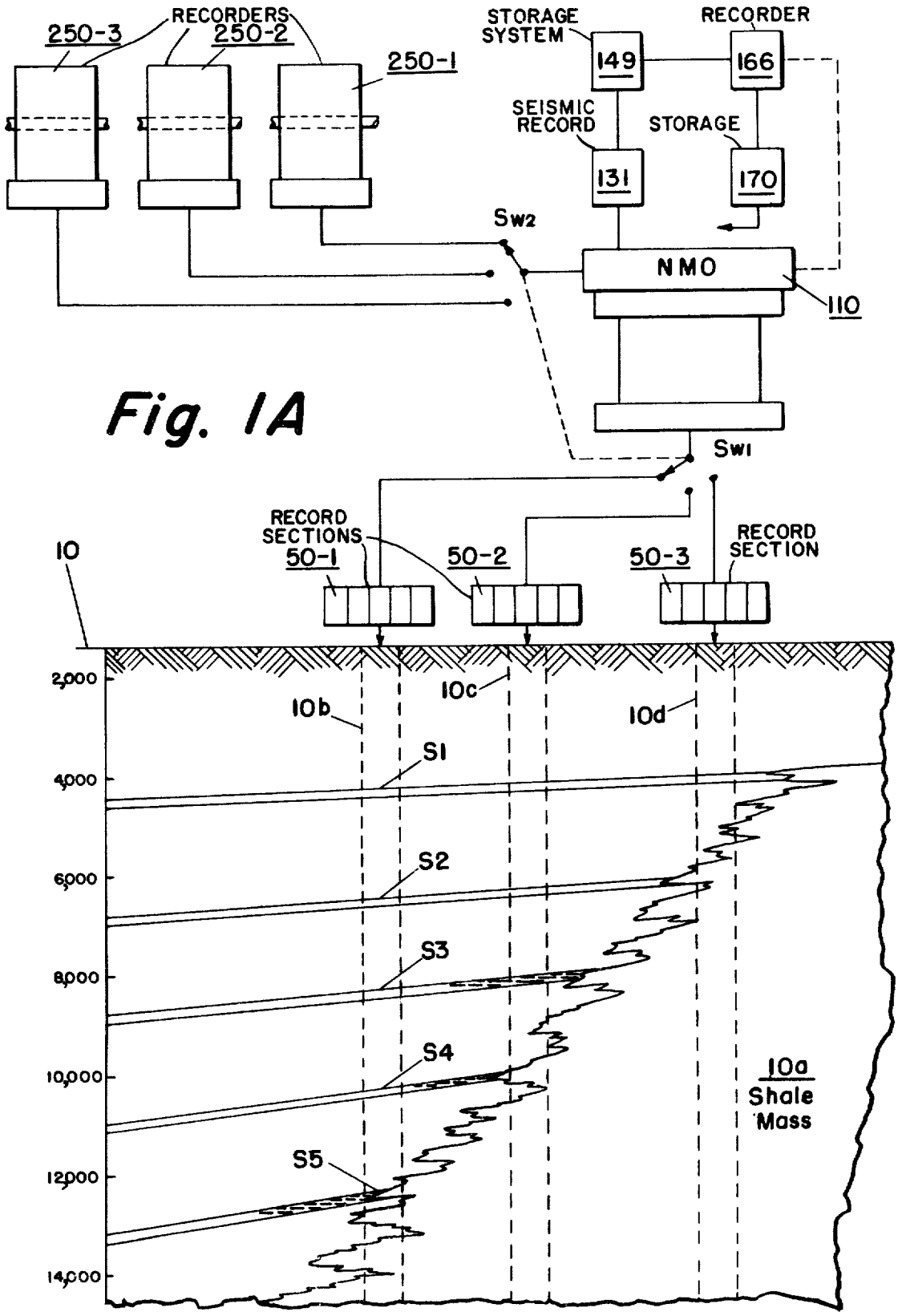
FIG. 1A diagrammatically illustrates in block diagram the application of the invention to the type of subsurface structures with respect to which the present invention yields reliable data of a higher order of reliability than heretofore has been available.

Referring now to FIG. 1A the invention in one form has been shown as applied to seismic exploration through the use of expanding-spreads, which, while useful in connection with problem areas other than the one illustrated in FIG. 1A, are particularly useful where structures of the type illustrated are encountered. A profile or seismic traverse extending along a line 10 may often overlie subsurface structural features such as are represented on the flank of a shale mass 10a into which various reflecting subsurface horizons S1–S5 terminate. Often it is difficult to identify the interface or the boundary between the shale mass 10a and the normal sand shale interbedding planes lying above and over the shale mass. In accordance with the present invention a plurality of expanding-spread arrays of detectors are employed. These arrays are located respectively at each of a plurality of selected locations along line 10 and preferably oriented at right angles to line 10. Thus arrayed, and subsurface formations may be probed at each of the spread locations with acoustic waves for generating a plurality of sets of expanding-spread seismic data. More particularly, a first expanding-spread array 50-1 is employed for the production of seismic signals which include reflection components spaced along a time scale as they arrive at detecting stations in the expanding-spread array after reflection from the successively deeper S1–S5. The stratigraphic columns 10b, 10c and 10d are thus investigated by means of the expanding-spread record-sections 50-1, 50-2 and 50-3.

Figure 2:
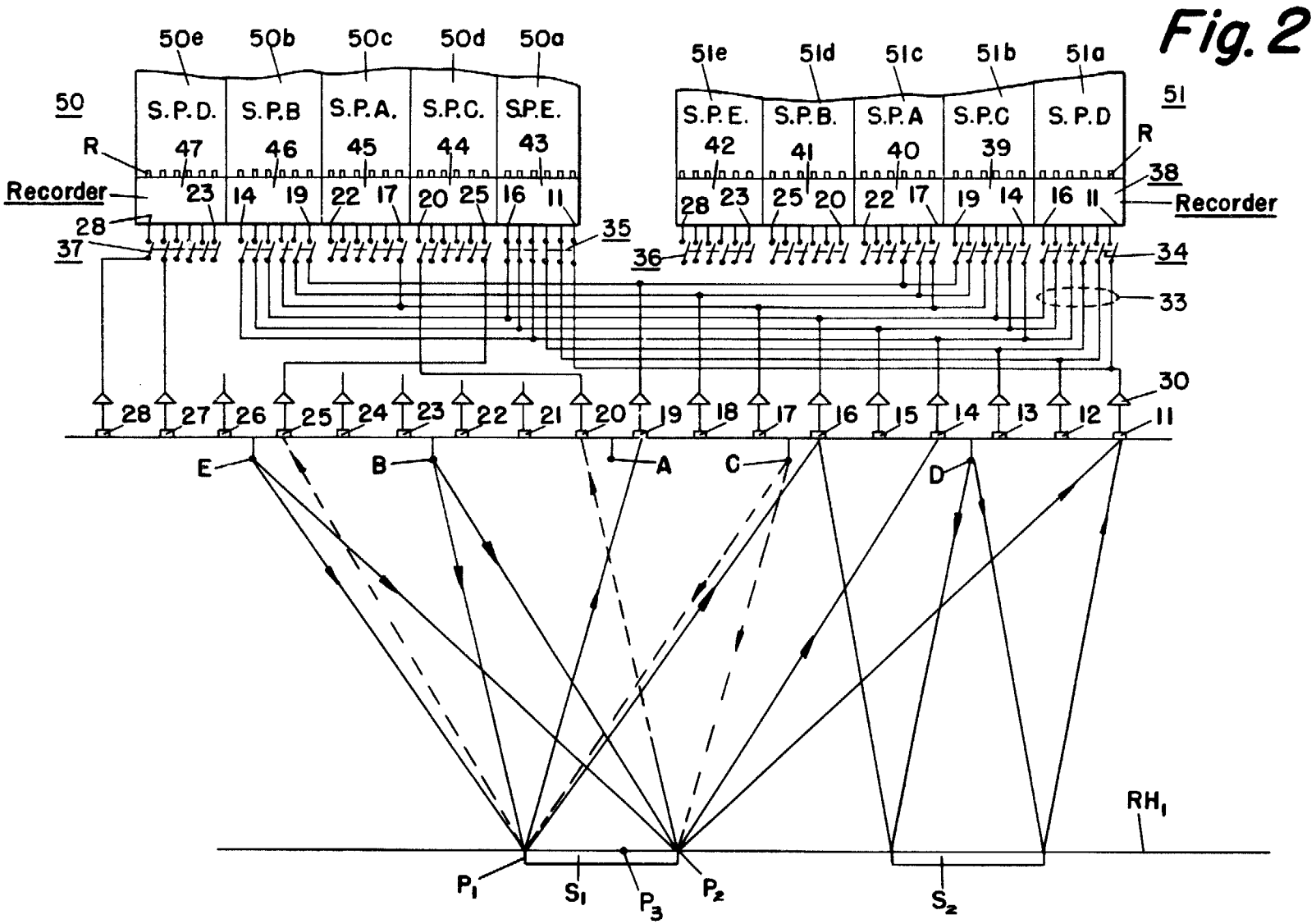
FIGS. 2, 3, 5 and 6 are to be assembled to form one complete system embodying the present invention.

As will be later explained in detail and particularly in connection with FIGS. 2 and 3, an expanding-spread record-section comprises at least three records, each preferably having a plurality of traces and each obtained as a result of the generation of seismic energy at different locations. In FIG. 2 a record-section 50 comprises the five records 50a–50e respectively produced with generation of the seismic energy at generating stations shown as shotholes A-E. While the specific arrangement of the exploring system for record-section 50 will be hereinafter explained in greater detail, it is to be understood that such a multisignal set of seismic data is provided for each of the sections 50-1, 50-2 and 50-3, FIG. 1A. The seismic data obtained for each such section is then applied to a data treating system. Flow lines have been provided in FIG. 1A which diagrammatically indicate the flow of data from each of these systems, the switch Sw-1 being shown along with switch Sw-2 to indicate the shift in the data from the expanding-spread 50-1 to the data from expanding-spread 50-2 and thence to the data from expanding-spread 50-3. Briefly stated, the expanding-spread seismic data of section 50-1 is first corrected, if necessary for variations in weathering [an] *and* elevation of the detecting stations, and then in unit 110 it is corrected for normal moveout or spread geometry. The resultant seismic signals are then selectively combined and scanned in unit 131 by a sweeping function to produce a plurality of output signals, one for each sweeping function. The signals produced from unit 131 are recorded in a storage system 149, are after removal of noise, again recorded by unit 166. Selected signals from storage system 166 have applied to them a plurality of sweeping functions which in conjunction with an inverter serve to eliminate in the record of recorder 131 the effect of multiple reflections from the subsurface structures S1 to S5. Other selected signals from storage system 166 are utilized to correct the normal moveout corrector unit 110 for any inaccuracies present therein by reason of the use of previously available velocity data for the formations underlying the expanding-spread of section 50-1. Such previously available data may contain substantial error but may be used as a first approximation to the actual velocity profile.

The expanding-spread data is utilized for correcting the velocity function employed by the normal moveout corrector 110. Having accomplished the important step of obtaining a correct velocity function from previously available data, the expanding-spread data is again applied to the normal moveout corrector 110 now employing a corrected velocity function and thence to a recorder 250-1, to provide an expanding-spread seismic record-section corrected on a trace-by-trace basis for weathering, elevation and spread geometry. Thereafter, data from the expanding-spread array 50-2 is similarly treated for the production of a second expanding-spread seismic section for recorder 250-2. The latter section is uniquely related to the stratigraphic column 10c.

Thereafter the data from expanding-spread array 50-3 is then treated for the production by recorder 250-3 of another seismic record-section of the vertical column 10d. It will be noted that columns 10b and 10c extend through the subsurface interface $S_3$, but that the latter interface is discontinuous along the flank of the shale mass 10a. Accordingly, it will be seen that the interface $S_3$ terminates short of the column 10d. The result is that on the seismic record-sections from recorders 250-1, 250-2 and 250-3 a reflection from the third interface $S_3$ will appear only on the first two record-sections. It does not appear on the record-section from recorder 250-3. By reason of features of the present invention, which permit the complete and accurate correction of all signals for the variables such as weathering and elevation, and the time-variable, dependent upon spread geometry, the disappearance of a reflection as will be indicated on the record from recorder 250-3, may be relied upon as an indication of the existence of a structure such as shown in FIG. 1A in contrast with disappearance of reflections due to signal-cancellation effects.

By utilizing expanding-spread arrays at a plurality of points such as illustrated, the analysis of the subsurface structure may be extended even beyond the limited example shown in FIG. 1A so that relatively subtle structures such as the disappearance of a shale mass as at a boundary with such shale and normal sand shale bedding structures may be detected and delineated.

Figure 1B:
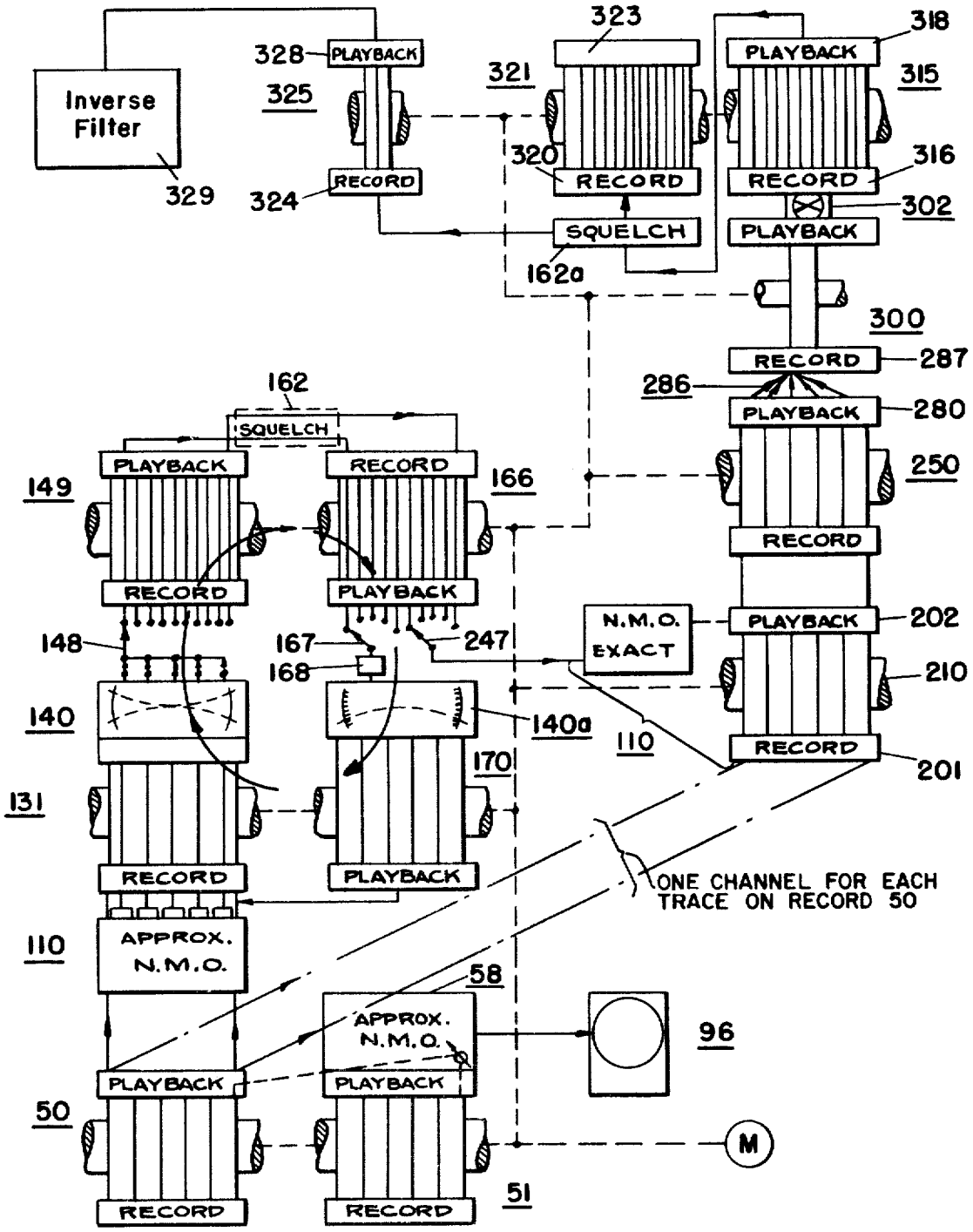
FIG. 1B is a block diagram of one of the systems of FIG. 1A and utilized for the presentation of a brief overall description of the invention prior to a consideration of its detailed aspects.

In FIG. 1B there has been illustrated in block form and on a functional basis, a system for treating expanding-spread seismic data obtained from one of the arrays such as for the section 50-1 of FIG. 1A. While a detailed description of the system will be presented in connection with more detailed drawings, it will be helpful to note that each set of expanding-spread seismic data such as shown in FIG. 1B forming the seismic record-section 50 is first corrected for weathering and for elevation variations where the same is necessary. In marine areas it may not be necessary to introduce such corrections, but where weathering is a problem one manner of accomplishing weathering correction is to employ a set of split-spread records, a split-spread seismic section such as the section 51.

For the purpose of the present description and as used in the claims the term "weathering correction" is defined as a static correction which includes not only variations in weathering and elevation, but any such additional correction as may be necessary to refer all seismic record times to a selected datum.

When weathering corrections are necessary, each signal of the expanding-spread section 50 is corrected on a trace-by-trace basis for the weathering determined from the split-spread record-section 51. Seismic signals in record-section 50 thus corrected for weathering are then applied to a normal moveout corrector 110 wherein geometrical spreading corrections are completed based upon the best available subsurface velocity data relative to the stratigraphic column underlying the expanding-spread array 50-1 of FIG. 1A. In the seismic record-section 50 primary reflections appearing thereon have a lineup or reflection orientation across the record-section which corresponds generally with a hyperbola or hyperbolic arc, the precise nature of which is dependent upon the velocity characteristics of the subsurface formations and the spacing between, or geometrical spreading of the several detectors. Accordingly, the normal move-out corrector 110 dynamically adjusts pick-up heads by amounts to compensate for the disposition of the several reflections appearing across the record-section. In accordance with the present invention the signals from each of the plurality of records of section 50 are after approximate correction for moveout by the unit 110 combined together and individually recorded or stored by unit 131. The resulting five traces, each a composite of the signals on each seismogram or record of section 50 is then played back after modification by means of a function generator 140. The unit 140 may be considered a function generator, inasmuch as it is designed to adjust a plurality of pick-up heads through a plurality of positions, the pick-up heads in each position lying on an arc or curve corresponding with the difference between two hyperbolic functions. As will later be explained in detail and particularly in connection with FIGS. 5 and 6, the hyperbolic scanning device or generator 140 applies supplemental corrections to those provided by the normal movement corrector. Since for each position of the scanning device 140 corrections are applied representing the difference between different hyperbolic functions, there may be achieved the attainment of valuable additional information. This information is obtained by combining the several traces after modification by device 140 and recording or storing each of the resulting composite signals as upon separate traces, one for each correcting function applied by the device 140.

In accordance with the invention, it has been found that there is a correlation between the correcting function applied by the device 140 and the signals which add cumulatively on a composited trace stored or recorded by the device 149. More particularly, for a given area, multiples will add cumulatively on several traces of device 149 with hyperbolic corrective functions introduced by device 140 concave downwardly or with greatest eccentricity. As the eccentricity of the corrective functions decreases, primary reflections will appear and some of them may appear on traces corresponding with the corrective functions of lesser degree of eccentricity and some with reversed sign, i.e., concave upwardly. Thus on the device 149 there will appear on certain of the traces high amplitude signals respectively representative of multiples and reflections. Noise and the like may be removed by a squelch circuit 162. Afterwards the noise-free traces will be recorded or stored in the device 166 preparatory to repeated play-back. By utilizing an inverter 168 and a second scanning device 167, any signals appearing on a selected group of traces known to be multiples will be inverted and restored in a recording or storage device 170 in time-phase with, but inverted with, respect to the multiples stored or recorded by device 131.

Accordingly, by adding the signals representing multiples, after inversion, to the signals on the several traces of the device 131, the multiples will be eliminated by cancellation effects. The composited signals of the record of recorder 131 will again be applied to the scanning device 140 and again stored or recorded by the device 149, the noise removed, and again stored or recorded by the device 166. There then appear at recorders 149 and 166 multiple-free records with the time-appearance of primary reflections unaffected by the presence of multiples in the original seismic data.

In FIG. 1B the information from the storage device or recorder 166 is derived trace-by-trace by a scanning switch 247 and applied to the normal moveout corrector 110. For purposes of clarity in FIG. 1B, this normal moveout corrector has been illustrated a second time, though it will be later explained in connection with FIGS. 7 and 8 that the corrections introduced into its operation will not require an additional moveout corrector but can be the same one as shown receiving information from the record-section 50. These same considerations apply to the normal moveout corrector 58 since only one such unit need be provided for the several operations already described and to be described.

Figure 13:
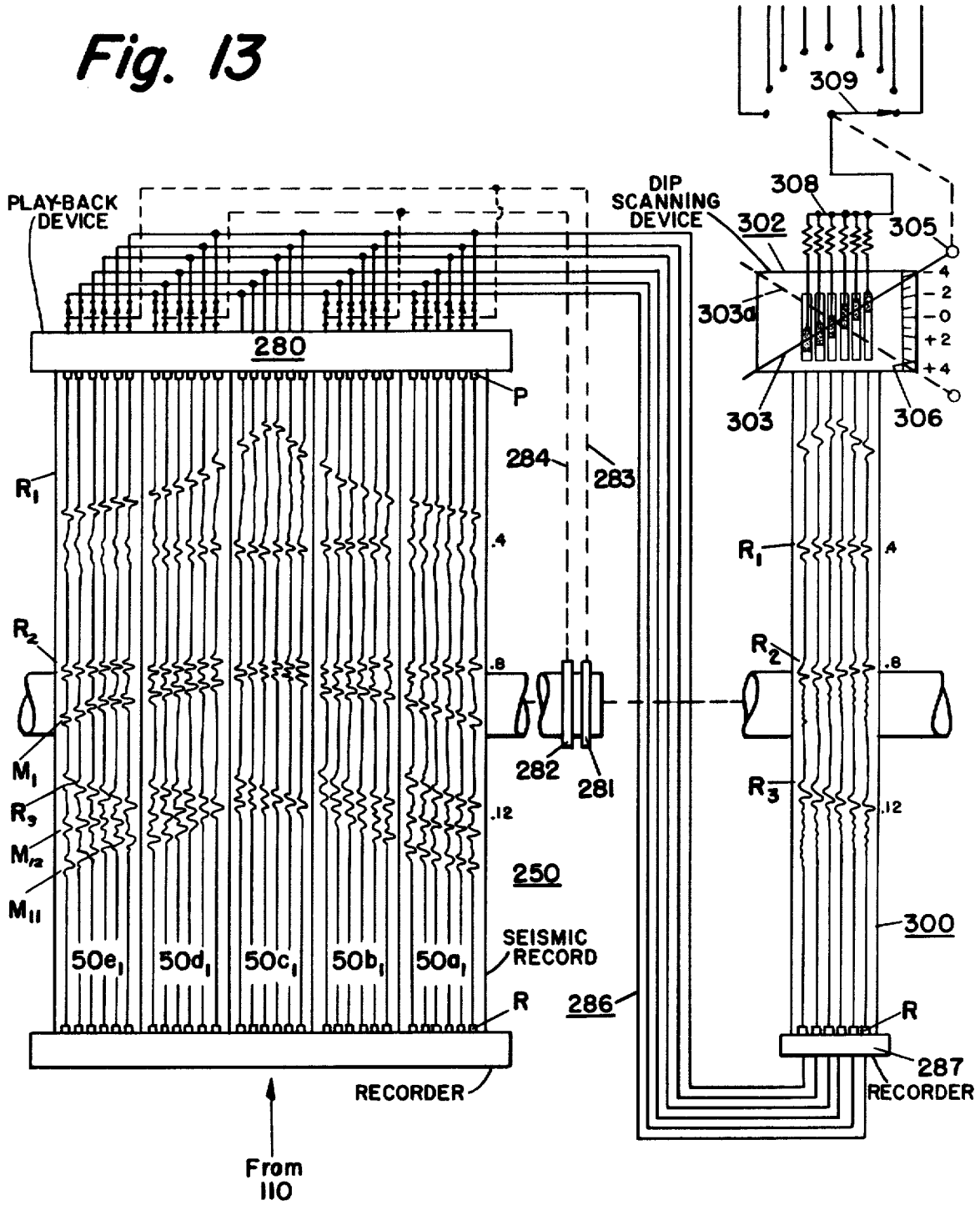
FIGS. 13 and 14 include a detailed illustration of the display and recorder or storage device 250 of FIG. 7 and illustrate further apparatus and steps utilized in the practice of the invention.

The position of switch 247 and the time occurrence of a reflection on one or more of the several traces of storing device 166 provides information as to the magnitudes of the correction to be applied to the normal moveout corrector 110 and also the time occurrence of that correction during application to the normal moveout device 110 of the seismic signals. The end result is the setting of the normal moveout corrector 110 to correspond with the existing velocity profile from which the seismic data were obtained and with a degree of precision substantially corresponding with exact information as to the velocity characteristics of the subsurface layering of the several stratigraphic columns 10b–10d of FIG. 1A. For that reason the data from the original record section 50 may now be applied to the normal moveout corrector 110 and in its corrected form stored or recorded as a new record on the device 250. Where there has been accomplished relatively precise corrections for weathering and normal moveout, multiples and noise to large degree will later be cancelled out as will be explained more particularly in connection with FIG. 13.

The cancellations occur by combining or compositing selected traces as indicated by the arrows 286 representative of combining circuits and for the recording by the device 287 on the recorder or storage means 300. Thus at the recorder or storage device 300 there will appear in alignment only the primary reflections. Moreover, the alignment of such reflections will be along lines indicative of any slope or dip in the reflecting horizons. By utilizing a dip-determining arrangement 302, precise measurements may be made of the slope. This is accomplished by introducing time-shifts along lines representative of linear changes across the record at recorder 300. Thus the appearance at the recorder or storage device 315 of traces each indicative of the particular linear corrective function becomes a measure of the dip of a particular reflecting horizon. Stated differently, the reflections as appearing on the record of recorder 315 have been corrected for dip. After removal of noise as by a squelch circuit 162a, the resultant reflections can be either stored or recorded by device 321 as a noise-free record or combined in a single record or storage device 325. Thus the end result of the several features of the invention previously described is a single record on which only reflections appear and at times representative of the depths of the reflecting horizons. The final data from the record of recorder 325 may be utilized in conjunction with an inverse filter 329 to produce a final record representative of the detailed velocity layer below the expanding-spread from which the data for the record 50 was obtained. This inverse filter may be of the type illustrated in Lawrence et al U.S. Pat. No. 3,076,177 and assigned to the same assignee as the present invention.

With the foregoing outline of the operations as a whole, it will be understood that the several method steps may be carried out by a wide variety of apparatus, including computing equipment, which by a mathematical approach will provide solutions to equations which may be exact or approximate, as may be desired. In the more detailed description which follows, there will be presented both the field techniques and a description of simplified analog type of instruments by means of which the invention may be utilized and which are illustrative of the many features of the invention, to which the appended claims have been directed.

Referring to the drawings, particularly FIG. 2, a plurality of detectors 11–28 inclusive have been illustrated in spaced apart relation. These detectors or geophones uniformly spaced one from the other cover an entire profile to be surveyed in accordance with the present invention. It is to be understood that this profile may be of much greater length than illustrated, and it can also be shorter (as short as three spreads). Though, as will later be explained, the actual operations in the field will differ from those now being described, the illustration of the entire profile does provide a ready means of better understanding some of the underlying principles of the invention. Distributed along the profile are a plurality of shotpoints identified by the reference characters A–E inclusive.

The detectors 11–28 disposed along the profile and the shotpoints A–E spaced at points selected within the profile are employed for producing two sets of records. The first set 51 of records 51a–51e will hereinafter be referred to as split-spread records. A split-spread record includes signals detected along a segment, such as $S_2$ of the profile wherein the shotpoint, such as shotpoint D, at which the seismic waves are generated is at the center of such segment. The second set 50 of records 50a–50e will hereinafter be referred to as expanding-spread records, that is, a series of records in which the distance from shotpoint to the detectors progressively increases. The signals as recorded on all expanding-spread records include components reflected from a common subsurface segment, as $S_1$ underlying the center of the profile.

A split-spread record 51a is produced, for example, by detonating a charge of dynamite located in shot hole D, FIG. 2, and detecting the resultant seismic waves in that segment of the profile spanned by detectors 11–16. An expanding spread record 50e is produced by generating seismic waves at shotpoint D and detecting them in that segment of the profile spanned by detectors 23–28. When shooting a split-spread record, seismic energy thus generated as from shotpoint D, travels downwardly to a first reflecting horizon $RH_1$. A part of this energy is reflected as from the segment $S_2$ and is thereafter received by the first spread of detectors 11–16. With connections from detectors 11–16 extending to recorder 38 by way of a gang switch 34, recorder 38, having associated recording heads, produces a record 51a of the resulting seismic waves. It is to be understood that the records will be phonographically reproducible, whether on magnetic, photographic or other reproducible medium. In the drawings, however, records are, in most cases, illustrated by visible, variable amplitude representations of the seismic waves for the purpose of aiding in the understanding of the invention.

Though the particular ray paths for all of the successive split-spreads have not been illustrated, it will be understood that they are exactly like those illustrated from the shotpoint D. For the split-spread from shotpoint C, the second of the right-hand gang switches will be closed, and with the detonation of dynamite at shotpoint C, there will be made the record 51b for the spread including detectors 14–19. Similarly, split-spread record 51c will be made with the spread 17–22 symmetrically located with respect to shotpoint A. The spread for split-spread record 51d will include the geophones 20–25 for shot hole B, and the last record with gang switch 36 closed, will, of course, be for the spread 23–28 having three geophones on either side of shot hole E and disposed along the straight line on which the other geophones are located.

In addition to the split-spreads 51a–51e, there will be produced the set of expanding-spread records 50a–50e. It will be convenient to consider first the centrally located record 50c. This will correspond with the split-spread record 51c and is produced with the dynamite charge at shotpoint A and the detectors 17–22 connected to the recorder 45 through the associated gang switch. The actual connections between the detectors 17–22 and the associated centrally disposed gang switch have not all been illustrated in order to simplify the drawing. For each gang switch, there have been illustrated sufficient conductors to indicate the circuit arrangements and to make it obvious to one skilled in the art how the wiring, schematically shown, will be completed.

A characteristic of the set of expanding-spread records is that reflection points are the same on each subsurface reflecting horizon for all records. For example, the segment $S_1$ of reflecting horizon $RH_1$ is common to each record of the set 50, of FIG. 1B, of expanding-spread records 50a–50c of FIG. 2. This will be clearly understood by considering shotpoint B. Upon detonation of a charge of dynamite at shotpoint B, seismic energy traveling along the ray paths indicated will be reflected from the points $P_1$ and $P_2$ to the detectors 19 and 14. It is to be observed that the reference characters 17 and 22 have been applied to the recorder 45 to identify the spread, including geophones 17–22 inclusive.

Similarly, other spreads have been identified on records 50a–50e and 51a–51e by the reference characters of corresponding detectors.

Considering now the ray path from the shotpoint A and comprising A-$P_1$-22, it will be seen that it is to a close approximation the same as the path B-$P_1$-19, from shotpoint B. Since the seismic energy from the shotpoints A and B traverses substantially the same path, the disposition of the recording head from the geophone 19 for record 50b adjacent the recording head for the geophone 22 for record 50c, will provide a time-tie as between the records 50c and 50b. An examination of the remaining paths and the arrangement of the recording heads relative to the several spreads of geophones will reveal that there has been maintained throughout the set of expanding-spread records 50a–50e corresponding time-ties. One more example will be given.

Considering now the ray path B-$P_2$-14 and the ray path from shotpoint D, namely D-$P_2$-23, it will be seen that the two substantially correspond and by thus disposing the recording head for the detector 23 at the right side on record 50e and adjacent the recording head for the detector 14 on the left side of record 50b there is provided a time-tie between the two records. Similar comparisons may be readily made between the illustrated broken-line ray paths from the shotpoint C to its spread of geophones 20–25 inclusive, and the ray paths from shotpoint E.

Though the end results are the same, as those just described, the sequence of operations in the field need bear little resemblance to them. In order to minimize both the number of shots required and further to minimize the shifting of equipment and personnel to obtain the two sets of records, the table of operations as set forth in FIG. 4 has been devised. By following the indicated steps, it will be seen that the foregoing requirements of the invention are realized. Thus, by arranging the detector cable with the right-hand detector at the position illustrated in FIG. 2, and thus the left-hand end of the cable ending with detector 16, and with the recorder in the vicinity of the shothole D, one member of the party, generally known as the "shooter", may be located at shothole E and upon an appropriate signal, he detonates the explosive, and the first record 50a of the expanding-spread is recorded. In this connection, it will be noted that the gang switch 35 for the recorder 43 is closed. This gang switch 35 is now opened, and the gang switch 34 is closed, and a second shooter at the shotpoint D detonates his charge. There is thus then recorded on the first of the split records 51a the resulting seismic energy detected by the spread 11–16.

The spread of geophones is then moved to the locations illustrated by the geophones 14–19. It is to be noted, however, that the connections to the recorder 46 of the record 50b are reversed relative to their connections to the recorder 39 for split-spread record 51b. The directions of cable connections have been indicated in the chart of FIG. 4 by the arrows just below the capital letters indicative of the shotpoints. The arrows show that the connections for a spread will be made from right-to-left or from left-to-right, as the case may be.

While the foregoing has taken place, shooter No. 1 has moved from shotpoint E to shotpoint B. Upon signal, he detonates the dynamite in shot hole B, it being understood that the gang switch associated with the recorder 46 has been closed and the remaining gang switches operated to their open positions. Thereafter, the gang switch for recorder 46 is opened, and the gang switch for the recorder 39 is closed. At that time, shooter No. 2 detonates the dynamite in shotpoint C, and the second record 51b, of the split-spread records is made. It is only necessary to follow the instructions of the table of FIG. 4 to complete the records. These records are then ready for use in accordance with further aspects of the invention, as will now be set forth. These additional steps and the apparatus involved may be taken to the field, though in general it is contemplated that the operations will be carried out at a processing center.

It has already been indicated that a more extensive expanding-spread may be involved, and there may be utilized many more detectors per spread. In general, each detector will have its own associated amplifier, one of them, the amplifier 30, being identified, though all have been shown. It is to be further understood that simplified field operations may involve but a single recorder, which will produce first one of the records for the split-spread, and then a record for the expanding-spread. These records at a processing center will be assemblied as illustrated in FIGS. 2, 3 and 3A preparatory to the operations now to be described.

Figure 3:
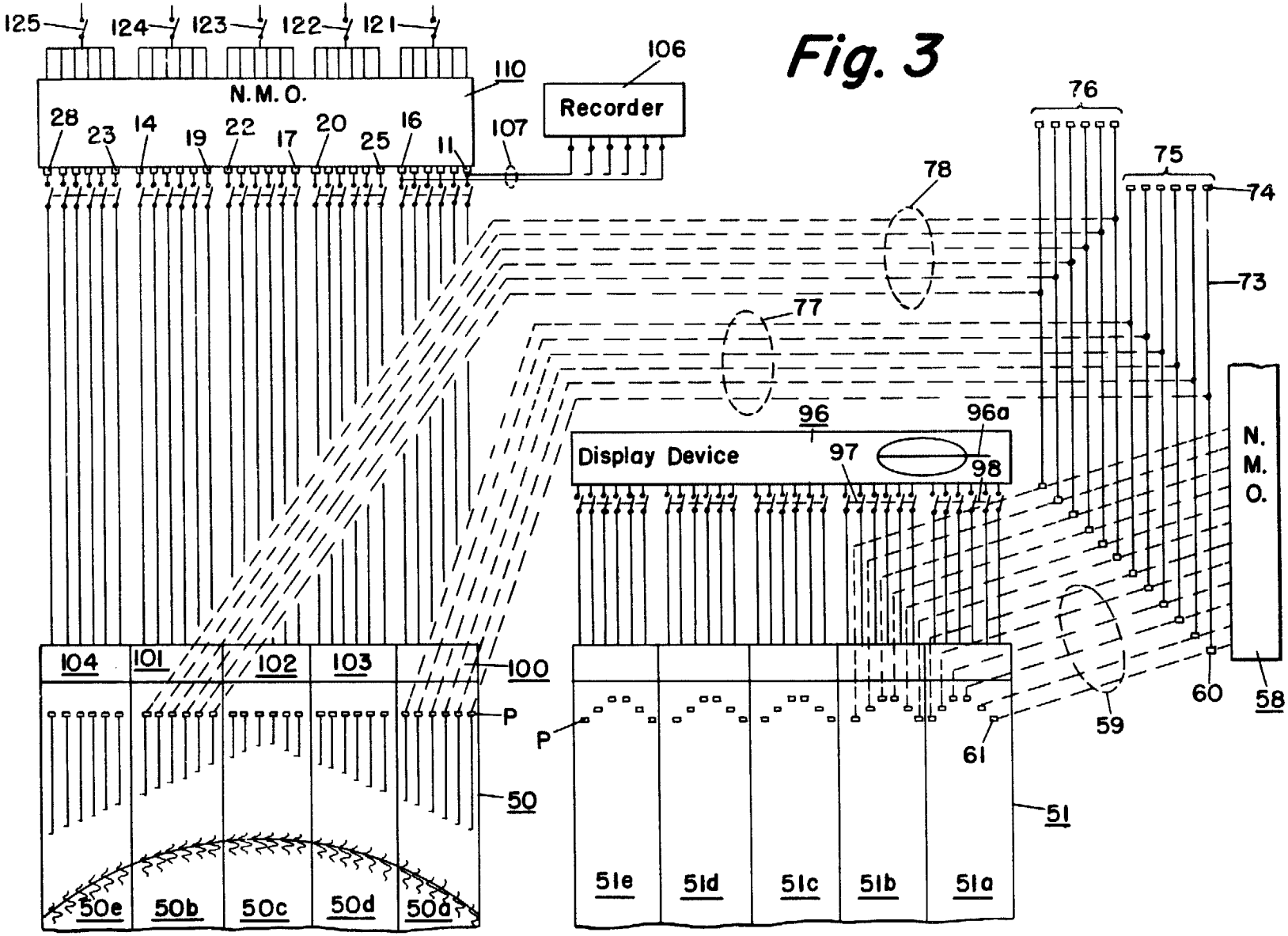
Figure 3A:
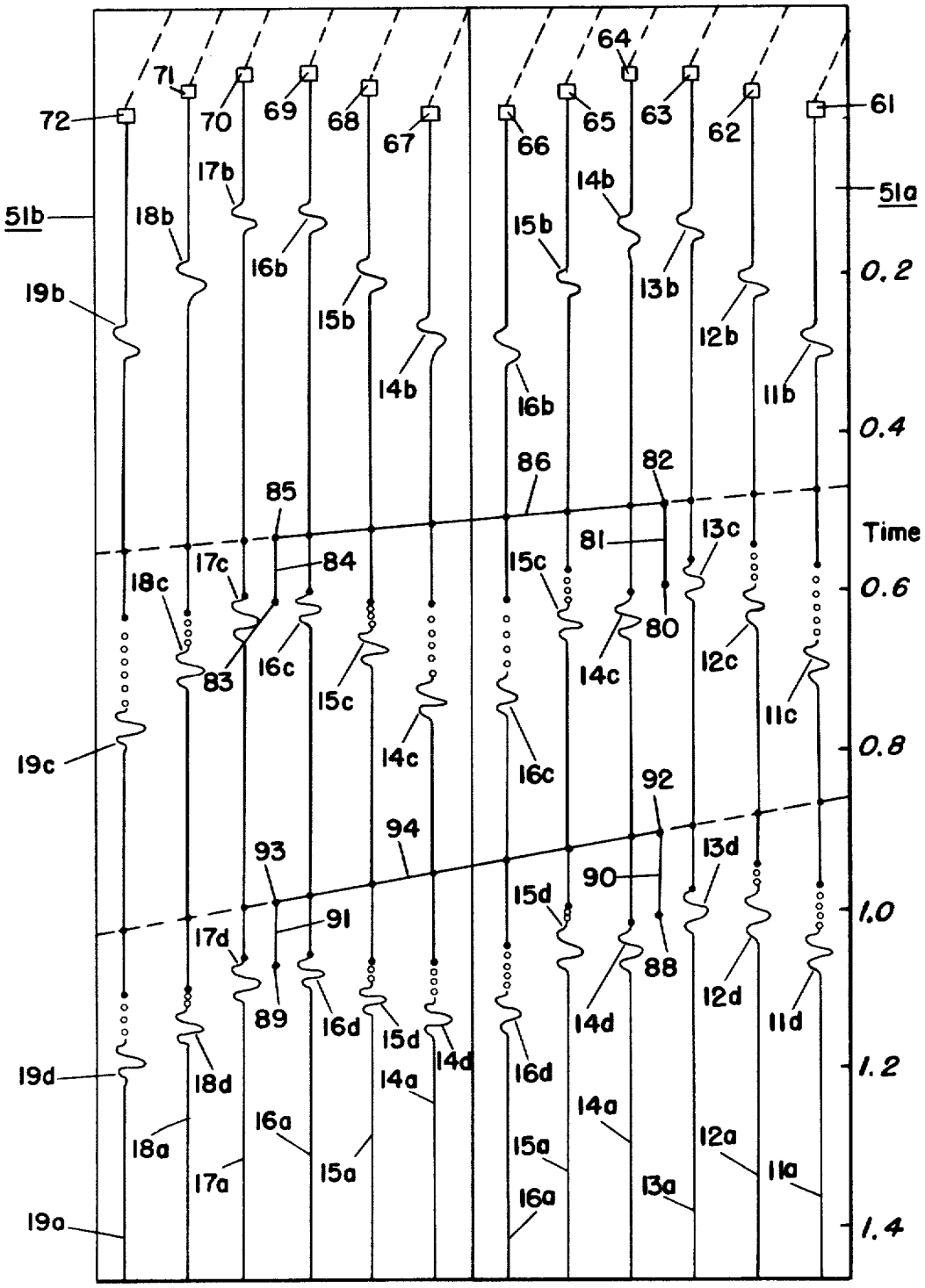
FIG. 3A is an enlargement of a part of records 51a and 51b of FIG. 2.

Referring now to FIG. 3A, there have been illustrated the records 51a and 51b, somewhat enlarged for ease in identifying the events recorded on the two records, For example, after the detonation of an explosive at shotpoint D, the detectors 11–16 of FIG. 2 will respond to the first-arriving energy from the shotpoint to produce the first breaks 11b–16b which appear at the upper right-hand part of the two records 51a and 51b. Thereafter, and due to the reflection of seismic energy from the first reflecting horizon $RH_1$, the detectors 11–16 respond to produce the wave-forms 11c–16c representative of the first reflection. Similarly, seismic energy will be recorded on records 51a and 51b representative of reflections from successively deeper reflecting horizons. For the second reflection, the wave-forms have been identified as $11_a$-$16_d$. The record 51b appears in like manner as a result of detonation of an explosive at shotpoint C.

Figure 3B:
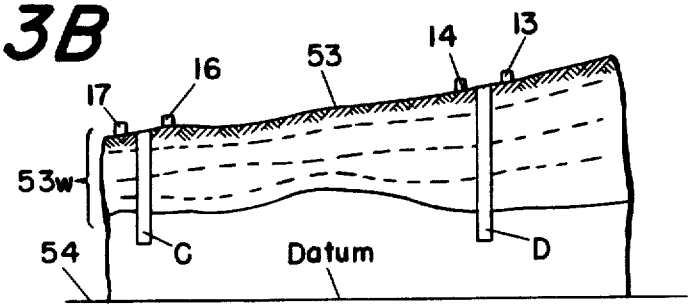
FIG. 3B is a fractional earth section helpful in explaining the invention.
Figure 3C:
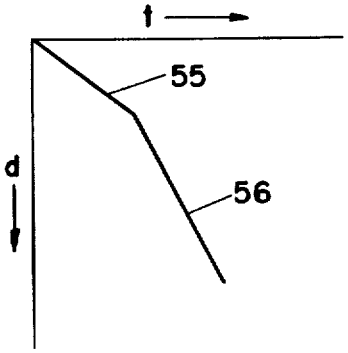
FIGS. 3C, 3D and 3E are graphs helpful in presenting the theory and operation of the present invention.

Though in FIG. 2, the detectors or geophones 11–28 have for convenience been shown as though on a horizontal surface, it will be understood by those skilled in the art that such is seldom realized in the field. More generally, the terrain may take the form such as that illustrated in FIG. 3B where a section 53 of the earth is shown inclined downwardly to the left. There is also illustrated what is generally referred to as the weathered layer 53w of variable thickness. To correlate FIG. 3B with FIG. 2 there have been shown the two drill holes in which dynamite charges will be located to form the shotpoints at C and D. These shot holes may be of variable depth where the program calls for each shot hole to be drilled to a point below the weathered layer. Illustrated on opposite sides of the two shot holes are the detectors 13 and 14 for shotpoint D and the detectors 16 and 17 for shotpoint C. In order to make maximum use of the information obtained, it is necessary to apply weathering and elevation corrections to bring all data to a common datum plane. For convenience, this datum plane has been illustrated in FIG. 3B as at 54. To correct the data to a selected datum plane, there will be utilized information generally available from an area covered by the survey and generally shown in the form of a time-depth plot as illustrated in FIG. 3C. Thus, the section 55 illustrates variation in the time plotted as abscissae against depth as ordinates for the travel of the seismic energy in the weathered layer 53w, while the section 56 of the time-depth plot shows the variations that occur in the deeper consolidated layer. It will be understood that the slope of each of the sections 55 and 56 represents respectively the velocity of the seismic energy in the weathered layer and in the consolidated layer below it.

Those skilled in the art are familiar with a number of different ways for the correcting for weathering and for elevation and for the selection of the location of the datum plane. For the purposes of the present invention, it will suffice to refer to the text "Seismic Prospecting For Oil" by C. Hewitt Dix (1952) and to the Dahm U.S. Pat. No. 2,503,904. These references contain detailed discussions of the manner of utilizing the graph of FIG. 3C to produce the weathering corrections needed to correct all data to a selected datum plane. Thus the weathering correction as used herein includes the elevational correction as well as the correction to a selected datum plane.

In addition to the static corrections needed for weathering and elevation, there must also be applied a dynamic correction due to the geometry of the spread, that is to say, the fact that the geophones 12 and 11 are more remote from the shotpoint D than the geophone or detector 13. The component of total correction made necessary by the spacing of the detectors one from the other, namely, the normal moveout correction, may be determined from the geometry of the system and the best velocity information available. Normal moveout correction theory in general is well understood. More particularly, reference may be had to Hawkins U.S. Pat. No. 2,858,523, or Palmer U.S. Pat. No. 2,440,971 for discussions of the theories involved and suitable apparatus for producing normal moveout corrections. Normal moveout correcting devices of preferred form have been disclosed in Loper et al. U.S. Pat. No. 3,075,172 and Koeijmans U.S. Pat. No. 3,092,805. In FIG. 3, there has been illustrated in block form a normal moveout correcting device 58 having a plurality of mechanical adjusting elements shown as linkages 59 respectively extending to the pick-up transducers associated with record 51a. A similar set of mechanical linkages extend to the pick-up heads associated with the record 51b, and other like linkages (not shown) to the remaining pick-up heads of records 51c–51e. It is to be noted that included in each mechanical link is an adjusting elements 60 in the form of a differential gear. More particularly, the normal moveout corrector 58 can, through the lowermost mechanical linkage, drive directly through the differential gearing 60 (shown in block form) to adjust vertically, that is advance or retard, the position of pick-up head 61. However, by rotating a rod 73 as by a knob 74, the position of the pick-up head 61 along the length of the corresponding trace 11a shown in FIG. 3A may be adjusted independently of the operation of the normal moveout corrector 58. Accordingly, there may be utilized the two components needed to correct the records. The first correction, for the components including weathering and elevation, is accomplished by rotation of rod 73, while the second correction, the component due to geometrical spreading, is introduced by the operation of the corrector 58. It is to be observed that there are also mechanical linkages extending from each of the rods of the two correcting arrays 75 and 76 to the pick-up heads associated with records 50a and 50b. The first set 77 of these linkages is identified by the broken-line ellipse, and the second set 78 of linkages is identified by the second broken-line ellipse. The manner in which the linkages function and their purposes will hereinafter be set forth. Similar sets of linkages (not shown) are provided for use in connection with records 51c–51e and 50c–50e.

Returning now to FIG. 3A, it will be seen at once that for a split-spread, i.e., where as for records 51a and 51b the detectors are symmetrically disposed on opposite sides of their respective shotpoints, the center detectors 13, 14 and 16, 17 are symmetrically disposed on opposite sides of the shotpoints D and C.

For a centrally located detector and for the two adjacent detectors as in FIG. 2, no corrections need be made for geometrical spreading since there is no spreading, the detectors are at the shotpoints. This means that for each split-spread record, only the weathering and elevation corrections need be made for the two traces in close proximity to the shotpoint.

In determining the weathering and elevation correction for the center traces 13a and 14a of the record 51a, FIG. 3A, there will first be established the point 80 which will determine the time-occurrence of the first reflection on these traces. The point 80 is fixed by taking the average time-occurrence of the first troughs on the two wave-forms 13c and 14c. By then applying the weathering and elevation correction as represented by the vertical line 81, there will be determined a point 82 which is representative of the location of the corrected reflection. In order that the determination of the point 82 may be achieved with considerable precision, it is preferred that there also be utilized the second reflections on the center traces 13a and 14a as shown by the wave-forms 13d and 14d. The point 88 is established by taking the average time-occurrence of the first troughs on the two wave-forms 13d and 14d. The weathering and elevation correction is again applied as shown by the vertical line 90 to locate the point 92. The foregoing corrections 81 and 90 taken respectively from the points 80 and 88 are equal to the correction to datum plane as shotpoint D.

In a similar manner, the point 83 is established for the traces 16a and 17a, and the weathering and elevation correction applied as indicated by the vertical line 84 to establish the point 85. With the two points 82 and 85 now located on the records, a line 86 is drawn interconnecting them. This line 86 is then extended to the right until it intersects with the edge of the record. It is also extended to the left, but not as an extrapolation as in the case of the right-hand portion. Instead, the foregoing procedures are carried out for the adjacent record 51c (FIG. 2), and a line drawn from the point 85 to the corresponding point which will be established for the center traces of the record 51c of FIG. 2. In a similar manner, the points 88 and 89 for the second reflection are placed on the chart, FIG. 3A, the weathering and elevation corrections applied as at 90 and 91 to establish the points 92 and 93. Between these points there is drawn a line 94 to establish a correcting line for the second reflection.

It is to be noted that the detectors 11–16 FIG. 2, used for the split record 51a have the same positions on the earth as when these detectors are used for the production of the record 50a of the expanding-spread. Accordingly, the weathering corrections as determined for the split record 51a will be identical with those needed for the record 50a of the expanding-spread. It is for this reason that there may be, and there are, provided the mechanical linkages indicated at 77. Thus, if the knob 74 be rotated to adjust the pick-up head 61 vertically, that is advance or retard it, by an amount corresponding to the weathering and elevation correction, that correction will be correct for the pick-up head for trace 11 of record 50a. Thus the movement of the pick-up heads, by linkages 77 and 78, register the magnitude of each of the individual static adjustments, each pick-up head forming the indicia for that purpose. However, the extent of the correction for the weathering and elevation for the trace 11a has not as yet been explicitly determined.

That determination has been explicit for an average of the center traces 13a and 14a and, accordingly, the two centrally located knobs in the array 75 may be adjusted by the amount indicated by the line 81 of FIG. 3A. Consequently, the reflections 13c and 14c as viewed on the display device 96 would be shifted in time but would not be in alignment. Thus the two centrally located knobs in the array 75 would then be adjusted in equal amounts and in opposite senses to bring the reflections 13c and 14c into alignment. The average of the corrections applied is thus equal to the correction 81.

The extent of the normal moveout correction for each pick-up head as determined by the device 58 depends upon the data set into that device. That data will be approximately correct for a given section. Accordingly, the records 51a and 51b are transported at uniform speed past their associated transducers (including transducer 61), which, it will be observed, are connected to a display device or oscilloscope 96, FIG. 3, the gang switches 97 and 98 being closed. During the transport of the record with the dynamic normal moveout corrections applied, there will be observed on the oscilloscope or display device 96 the multiplicity of traces, and it will be determined whether or not the first reflection appears as a straight line as indicated at 96a. If the first reflection does not appear as a straight line, then the outermost pairs of knobs in the arrays 75 and 76 will be adjusted until there is a line-up of the first reflection to approximate a straight line at 96a. When these adjustments have been completed, it will be known that the several traces have been corrected to the line 86 of FIG. 3A. Since the corrections to this line represent the sum of the two components, (normal moveout and weathering), the adjustments required of the arrays of knobs 75 and 76 explicitly determine the weathering corrections. Accordingly, through the two sets of linkages 77 and 78, there will have been established the weathering corrections for the pick-up heads associated with the records 50a–50e.

In the foregoing, it is to be understood that the operation preferably is carried out using progressively changing pairs of records. For example, after the corrections have been determined for the records 51a and 51b, there will then be utilized the records 51b and 51c, etc. Only a portion of the control linkages have been illustrated in FIG. 3, it being understood there will be provided a rod and knob for each of the transducers and with their corresponding linkages interconnecting the corresponding pick-up heads on the remaining records, and likewise connected to the normal moveout correcting device 58.

The display device 96 may be of the type shown in U.S. Pat. No. 2,950,459, or it may be of the type described in ELECTRONICS, May 1955, in an article by Groenendyke and Loper entitled "Cathode Ray Display of Seismic Records". In accordance with the foregoing disclosures, repeated display of a given seismic event may appear on the oscilloscope, as for example, the first reflection. By its repeated or continued appearance on the oscilloscope, adequate time is given for the adjustment of the knobs singularly to determine the weathering and elevation corrections for the expanding-spread record at the same time they are explicitly determined for the split-spread records.

Having thus determined the weathering corrections necessary at each detector location, at which the signals in the expanding-spread data were obtained, the expanding-spread data may then be reproduced by the playback units 100–104 as seen in FIG. 3. The signals as reproduced may be recorded as by means of a recorder 106 having six inputs connected through the signal channel 107 to the six traces from the playback unit 100. By the selective operation of the illustrated gang switches, the recorder may be connected to the channels for the records 50a, 50d, 50c, 50b and 50e in succession. The details for the wiring connections have not be shown, it being understood that the symbol for the signal channel 107 is indicative of the suitable connection including the gang switches which have been illustrated.

The records produced by the recorder 106 provide a set of expanding-spread data which has been accurately corrected for the effects of variable weathering under the spread itself, the latter correction having been made in such detail for each separate detector location that the wave-forms as they appear on such records may be relied upon as presenting reliably corrected expanding-spread data. It has been found that, having thus corrected the expanding-spread data, the analysis carried out by the interpreter may be made with greater reliability, and interpretive techniques otherwise subject to considerable question may be employed with increased confidence. From the foregoing, it will be seen that the applicant has provided a method in connection with expanding-spread operations for the determination of the velocity characteristics of subsurface formations which involves securing at each spread employed in the expanding-spread operations, a related set of data obtained from split-spread information. The data obtained from the split-spread operations are then employed solely for the purpose of determining the needed corrections for weathering and elevation as necessary at each individual detector location. These corrections are then applied to the detectors for the entire expanding-spread profile, and thus there is achieved detailed correction for relatively minor variation in the weathering itself which, ordinarily ignored, has been found to introduce such ambiguities in expanding-spread record sections as would prevent their accurate and reliable interpretation and which could, and have, led to erroneous interpretations in terms of subsurface structure.

Figure 3D:
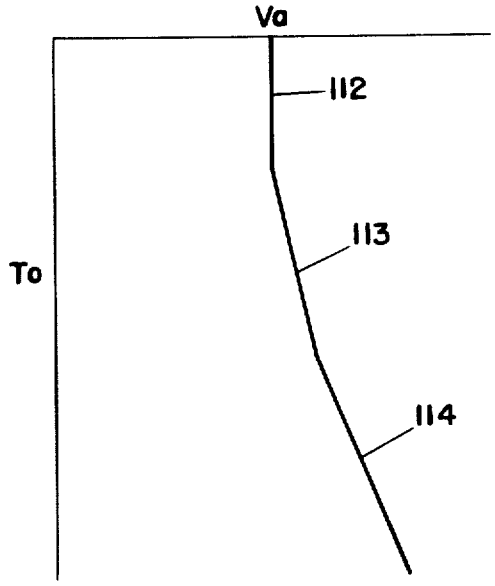

The normal movement correcting device 110 (like the device 58) will utilize the available information for the velocity of the subsurface strata. This will, in general, be available in the form of a graph, such as shown in FIG. 3D, where $T_o$, the vertical time, is plotted as ordinates, and the apparent average velocity $V_a$ is plotted as abscissae. The resulting graph illustrates three sections 112, 113 and 114 of gradually increasing velocity with increase in vertical time. Utilizing the data in the form of the graph of FIG. 3D, there may then be utilized the equation (1) appearing as part of FIG. 3E to develop a family of curves of which two, the curves 115 and 116, have been illustrated. The curve 115 is plotted for the maximum distance (x) from a detector to a shotpoint, as for example, FIG. 2, the distance from the shot E to the detector 11 (and vice versa, from the shotpoint D to the detector 28). Each curve is plotted with value $\Delta T$, the correction-time, as ordinates against $T_o$ as abscissae. The curve 115 will be applicable to the detector 11, and the curve 116 for the detector 12. Similar data represented by other curves will be used for the remaining detectors. Accordingly, as the records are reproduced by the playback units 100–104, they are individually corrected by the normal moveout device 110 for geometrical spreading, the several traces already having been corrected, of course, for weathering and elevation.

In utilizing the device 110, applicable to the expanded-spread record-section, it is preferred that there be added a further correction, namely, to establish the datum plane to correspond with the surface at the location of the detecting stations 19 and 20 midway of that section.

Figure 3E:
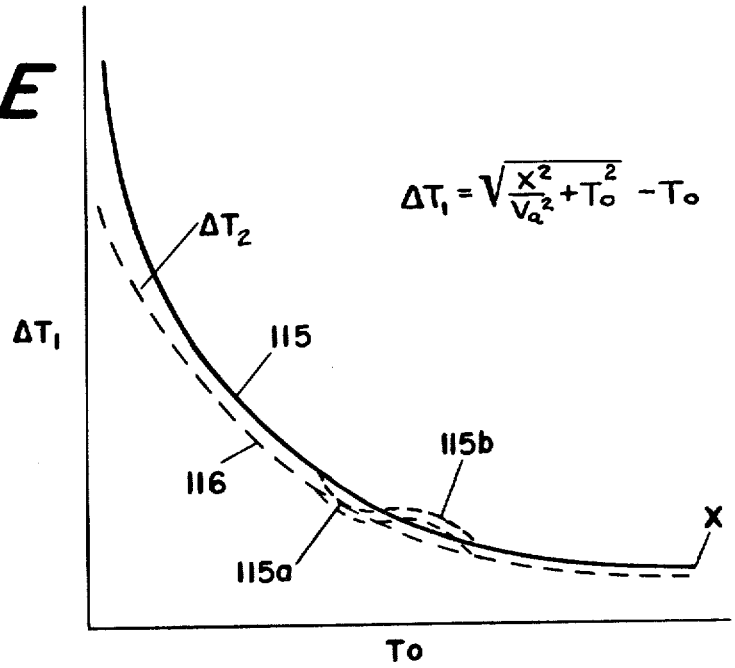
Figure 7:
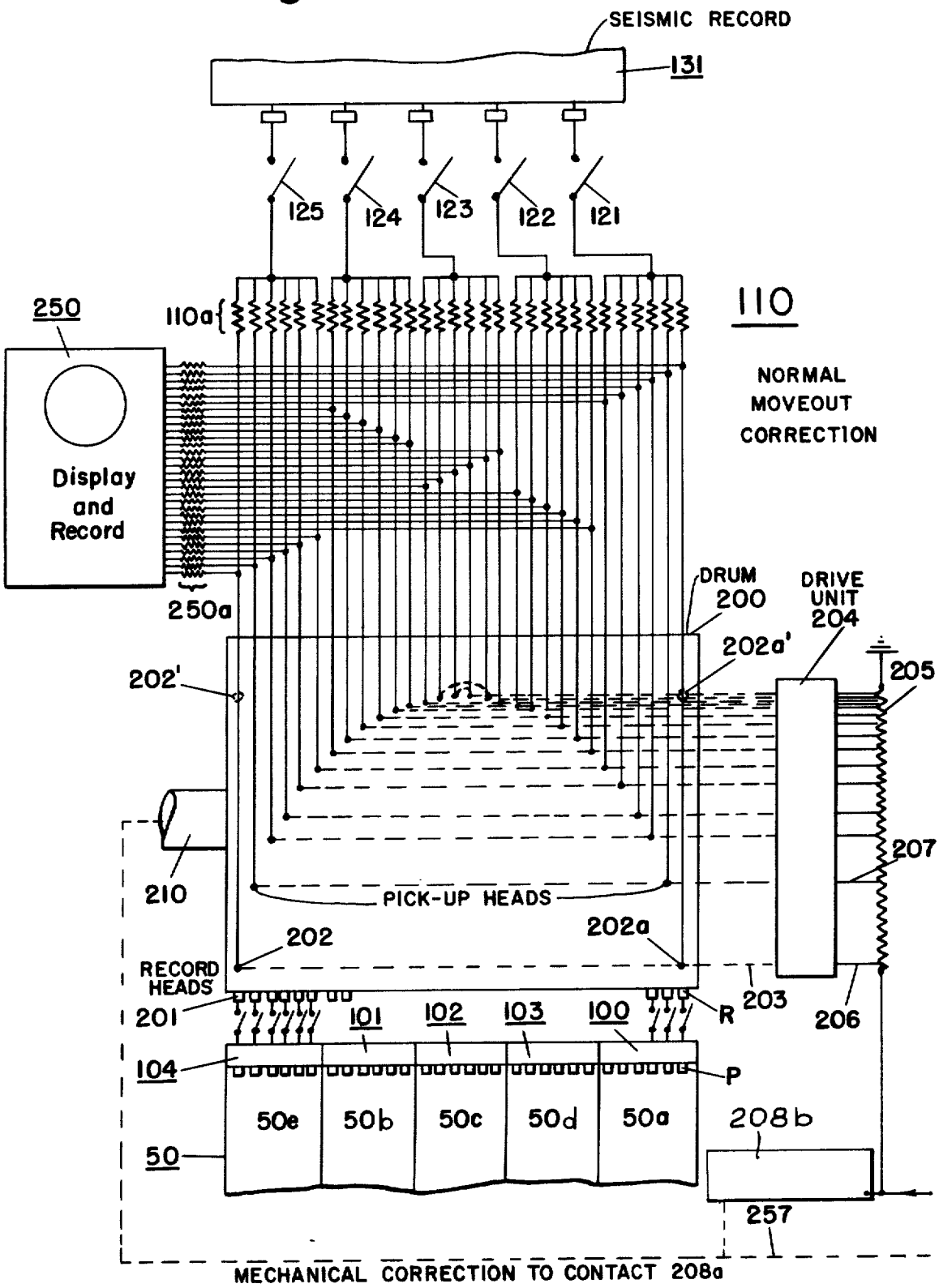
Figure 8:
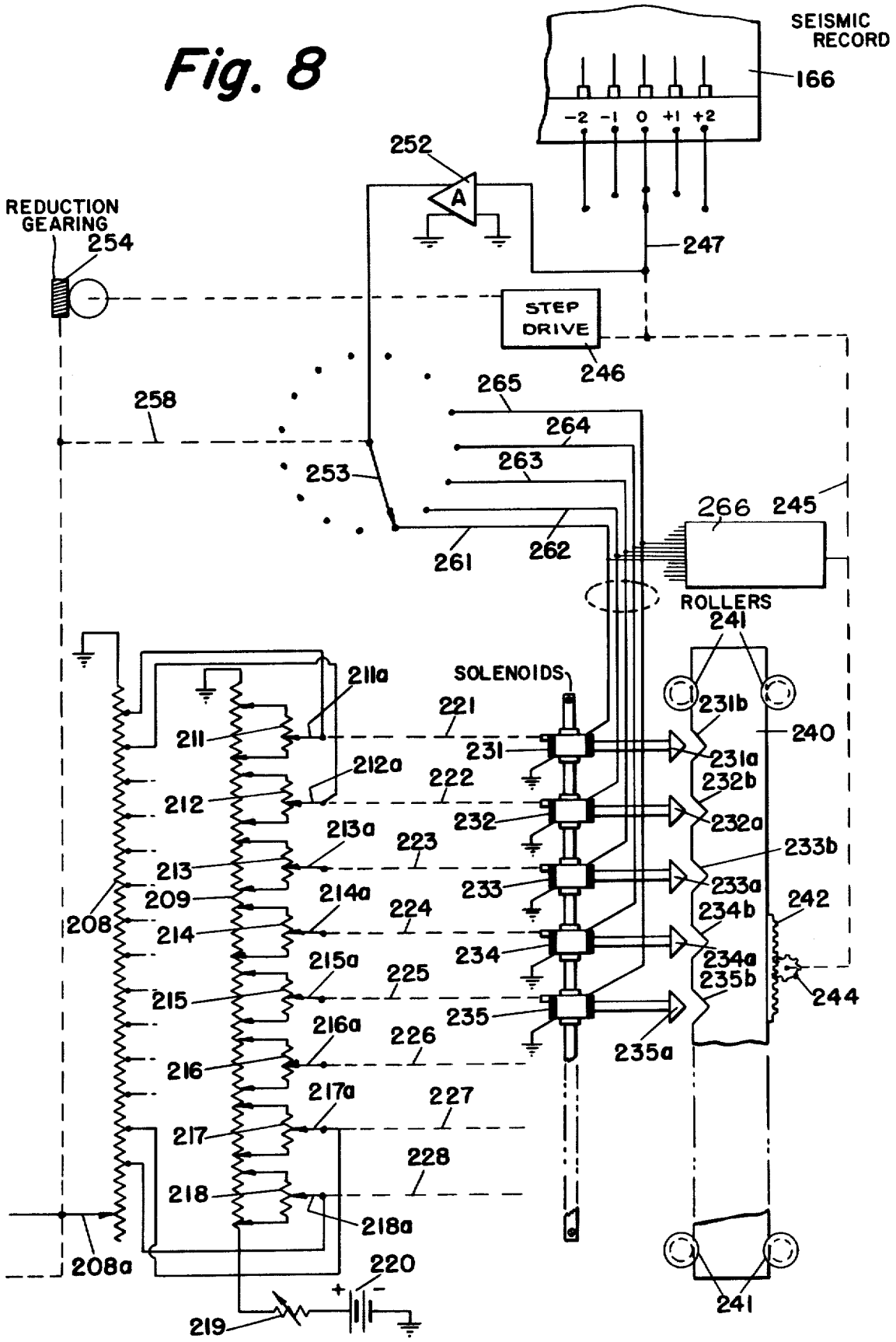

Though normal moveout arrangements such as referred to above in connection with the normal moveout device 58 may be utilized, there has been illustrated in FIGS. 7 and 8 a preferred form of a normal moveout device and which in itself includes provisions for the correction of the normal moveout curve of FIG. 3E from the expanding-spread data after it has been modified in accordance with features of the invention yet to be described. The construction and operation of the normal moveout corrector 110 will later be described in more detail, it being understood that its operation as just set forth will be strictly in conformity with the available velocity information for the area under survey and that the corrective features incorporated into that device will later be utilized.

The outputs from the normal moveout correcting device 110 are now composited into five traces as indicated by the common conductors respectively connected to the switches 121–125. The resulting composited traces will, by the transducing heads, be recorded on a reproducible record. More particularly, the signals on record 50a are composited and by way of switch 121 are applied to the transducer or recording head R of FIG. 5 to appear on recorder 131 as the single trace 126. Similarly, the signals composited from the record 50d are applied by way of the switch 122, and by way of the transducer of FIG. 5 appear as the single trace 127. The corresponding composited signals from the records 50c, 50b and 50e are applied respectively by way of the switches 123, 124 and 125 and the associated transducers to produce the signals appearing on traces 128, 129 and 130. Notwithstanding the fact that the two corrective components, one for weathering and elevation, and the other for normal moveout have been applied, the resultant signals on the record of recorder 131 do not fall in exact alignment. There are several reasons why the signals are not in alignment. First, in an expanded-spread section, the time sequence in which a reflection-wave-front is detected by the geophones or detectors is hyperbolic in character, a phenomenon resulting from the geometry. Secondly, each composite record includes both reflections and multiples. The time-appearance of reflections is approximate by reason of the assumed velocity utilized for the setting of the normal moveout correcting device 110. Finally, the alignment of the signals will be affected by the presence of multiples.

The effect of multiples can be readily illustrated by reference to FIG. 5A, Sheet 3. If the first reflecting horizon $RH_1$ be as illustrated, it will be noted that there will be a reflection detected by the geophone, this reflection being labeled $R_1$. However, at a greater time as indicated in the central portion of the Figure, it will be then noted that seismic energy originating at a shotpoint can be reflected first from the reflecting horizon $RH_1$, then from the surface, again from horizon $RH_1$, and will then be received by the geophone. This multiple $M_1$ may appear as though it were a reflection, where in fact it has not been reflected from a single horizon but is a multiple reflection, and, hence, the term multiple. The presence of multiples tends to confuse the records as they may be both additive and subtractive. As illustrated in this special case, the multiple $M_1$ will obscure the reflection $R_2$ from the second reflecting horizon $RH_2$. In the third case, it will be noted that there are present two multiples $M_{11}$ and $M_{12}$. The first portion of the multiple gives rise to reflected energy which extends downwardly through the first layer and thence through the horizon $RH_1$ to be reflected at the second reflecting horizon $RH_2$, and thence returned to the geophone or detector. Thus, in the third illustrated special case, there will be arriving at the geophone reflection energy representing the reflection $R_3$ as well as the multiples $M_{11}$ and $M_{12}$.

As indicated above, it is the purpose of the present invention to eliminate from the record the effect of multiples.

Figure 5:
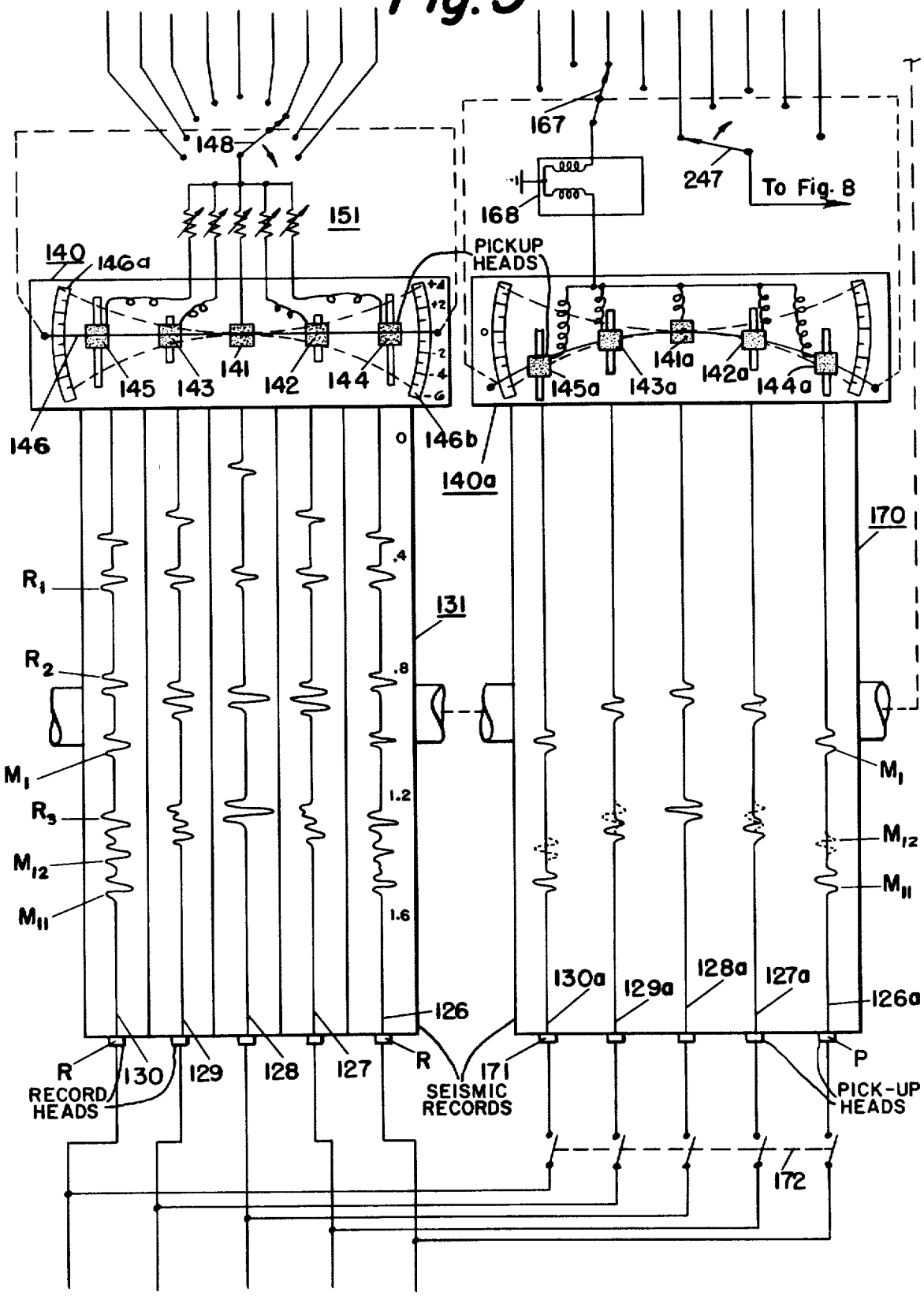

Returning now to FIG. 5, it will be noted that the signals at the lowermost portion of the record (representing reflections at greater depths) have a configuration across the record 131 which is concave downwardly. The reflection components $R_3$ shown at the lowermost portion of the record section 131 will be horizontally disposed if the velocity data employed for normal moveout is correct. The multiples thereof will be downwardly concave. The reflection components can be either concave downwardly or concave upwardly or linear depending upon the velocity data employed for normal moveout. As illustrated in FIG. 5, the intermediate signals $R_2$ and $M_1$ show the reflection components $R_2$ upwardly concave to a slight degree with the multiples $M_1$ downwardly concave but to a lesser degree than the signals $R_3$, $M_{12}$ and $M_{11}$ in the lower portion. The early arriving components representing reflection $R_1$ are disposed in fairly regular horizontal alignment across the five traces.

Referring now to FIGS. 2 and 3, it is to be noted that on the expanding-spread record 50 there have been illustrated signals on the respective traces representative of the first reflection $R_1$ from the first reflecting horizon $RH_1$ and from the reflecting segment $S_1$. The time occurrence of the signals across the record provides a pattern or configuration which is not only concave downwardly, but to a close approximation corresponds with a hyperbolic curve. The purpose of the normal moveout corrector 110 is to introduce a corrective time-function ($\Delta T$) so that the hyperbolic character of the reflections as appearing on record section 50 will on the record 131 of FIG. 5 appear as a horizontal line. Thus the correction to be applied to a particular reflection, such as $R_1$, will to a very close approximation be a corrective function of hyperbolic character. The function and operation of the normal moveout corrector 110 is somewhat more complex than just indicated, and in the operations thus far described, it is to be remembered that the data of FIG. 3D used to control the operation of the normal moveout corrector 110 was not necessarily exact, but based upon available velocity information. Accordingly, as the normal moveout corrector functions, the end result in FIG. 5 is the substantially precise alignment of reflections and misalignment of multiples. The reason for this is that the multiples pass through material different from that which the two reflections arriving at the same time pass through, and therefore the true geometric correction for the reflection does not bring the multiples into alignment. For the reflections, a residual amount of geometrical correction remains unaccounted for.

With the foregoing in mind, if there now be applied to the five traces 126–130 of FIG. 5 corrective hyperbolic functions, better line-ups may be achieved. More importantly, corrections of this character are, in accordance with the present invention, utilized to identify multiples, and provisions are also made for the removal of the multiple reflections on the record of recorder 131.

The desired corrections are achieved by utilizing a scanning device 140 which is arranged to position pick-up-up heads 141–145 along a plurality of hyperbolic curves which provide hyperbolic corrective functions extending through a range adequate to correct all configurations of multiples and normal moveout deviations. More particularly, the scanning device 140 is provided with a flexible element 146 connected to the several pick-up heads 141–145. The pick-up head 141 for the center trace 128 is retained in fixed position. However, as the ends of the flexible element 146 are concurrently moved along the scales 146a and 146b, the pick-up heads 142, 144, 143 and 145 will move in suitable guideways by amounts which for each position on the scale will cause them to be in positions respectively along a hyperbolic curve common to them. Thus the plurality of hyperbolic curves representative of the multiplicity of positions of the pick-up heads 142–145 corresponds with differences between two hyperbolic functions, and these differences define hyperbolic functions which are both positive and negative in character in that they range from hyperbolic curves which are concave downwardly to those which are concave upwardly.

In operation, the flexible element 146 may first be operated to its −6 position. It is so operated by rotating a selector switch 148 to its left-most position corresponding to the "−6" trace of a record 149 (FIG. 6) which is to be produced. It will be noted that nine traces are to be produced on the record 149. These may be greater in number or less in number. In the usual case, there will be many times the number provided for illustrative purposes in explaining the invention. The first or the "−6" trace, is produced by combining or compositing the signals on the five traces 126–130 of FIG. 5. Thus the output circuits from each of the transducers 141–145 is connected by way of individually adjustable attenuators to a common conductor and thence to the movable switch arm 148. Inasmuch as normal moveout is greatest at the more remote detectors, it is desired that the signals from the outermost traces, such as 126 and 130, shall be given greater weight in identifying the correct hyperbolic function for reflections as well as multiples. To this end, the central one of the attenuators 151 is set for substantial attenuation of the signals of the center trace, while the attenuators outwardly thereof are set with decreasing attenuation. In this manner, there is provided greater weighting of the outermost traces by establishment of increasingly greater amplitudes of the signals of the traces spaced outwardly from the central traces.

Besides correction for normal moveout for the reflections, there is also achieved identification of multiples. Mention has already been made of the fact that the lowermost signals on records 126–130 form a configuration of downward concavity; more specifically, such signals are more or less coincident with the hyperbolic function represented by the position of the flexible member 146 in its −6 position. Accordingly, the pick-up heads 141–145 in the −6 position are in time-alignment with the lowermost signals and will thus produce on the −6 trace a signal of large amplitude representing the composite of the lowermost signals on the traces 126–130. The remaining signals on the traces 126–130 will be intermixed out of phase and will partially cancel so that the composite trace will be relatively quiescent except for the large amplitude signal which has been marked $M_{11}$.

It is to be understood that the record of recorder 131 is repeatedly played back with the setting of the flexible element 146 and the selector switch 148 changed between each playback operation. Thus for the second playback, the selector switch and the flexible element 146 are set to the "−5" position. It will be observed that on the trace "−5" no evidence of alignment of signals from the traces 126–130 appears, i.e., there are no signals of large amplitude. For the third traverse of the record of recorder 131 past the pick-up heads 141–145, there is produced on the "−4" trace a signal of large amplitude labeled $M_1$. Similarly, on trace "−3" a large amplitude signal $M_{12}$ appears, and on the "−1", "0" and "+1" traces, large amplitude signals labled $R_3$, $R_1$ and $R_2$ appear. The traces "−2" and "+2" are relatively quiescent.

There will be now discussed the background theory and reasoning which justifies the conclusion that the signal $M_{11}$ of trace "−6" is known to be a multiple. Inasmuch as this background theory is also relied upon for further development of the theories underlying the present invention, reference will be had to a number of explanatory diagrams, the first of which will be FIG. 6A. In FIG. 6A there has been illustrated the maximum distance x representative of the distance between the shotpoint E and the most remote detector 11. This distance has been above referred to as the one utilized in establishing the normal moveout curve and to which Equation (1) is applicable. That equation is:

$$\Delta T = \sqrt{T_o^2 + \frac{x^2}{V_a^2}} - T_o \qquad (1)$$

In FIG. 6A the vertical time $T_o$ has been plotted as ordinates as against the distance x as abscissae. There also appears in FIG. 6A the three reflecting horizons $RH_1$, $RH_2$, and $RH_3$, together with ray paths showing the path of travel of seismic energy. In order to bring all reflections into alignment it is necessary to introduce corrections so that for each detector the travel time will be corrected to that corresponding with vertical travel time, that is to say, directly from the shotpoint E to the reflecting horizon $RH_1$ and back to shotpoint E. For reflections arriving at detector 11, the travel path is much longer. The travel path $T_{x1}$ extends from shotpoint E to the point $P_2$ from which the seismic energy is reflected to the detector 11. If now the line 11-$P_2$ be extended to the vertical line from the shotpoint E, it will be seen there is formed a right triangle from which the following equation may be written:

$$x^2/Va^2 = T_x^2 - T_{o1}^2 = (T_x + T_{o1})(T_x - T_{o1}) \qquad 2$$

The correction needed in terms of time and referred to as ΔT will be equal to the difference between the travel time (E−$P_2$−11) and the vertical travel time $T_{o1}$. (In the following equations the subscript 1 will be dropped, and the vertical travel time given as $T_o$.) Accordingly, $$\Delta T = T_x - T_o \quad (3)$$

Substituting Equation (3) in Equation (2), there will be derived:

$$\Delta T(T_x + T_o) = x^2/Va^2 \quad (4)$$

The following relationship will be self-evident:

$$T_x + T_o = T_x - T_o + 2T_o \quad (5)$$

Simplifying, $$T_x + T_o = \Delta T + 2T_o \quad (6)$$

Now substituting Equation (6) into Equation (4) there is obtained:

$$\Delta T(\Delta T + 2T_o) = x^2/Va^2 \quad (7)$$

Solving now for $V_a$:

$$V_a = \sqrt{\frac{x^2}{\Delta T(\Delta T + 2T_o)}} \quad (8)$$

Equation (7) may also be written in its quadratic form, $$\Delta T^2 + 2T_o\Delta T - x^2/Va^2 = 0 \quad (9)$$

Applying now the formula-solution to quadratic Equation (9), $\Delta T$ may be expressed:

$$\Delta T = \frac{-2T_o \pm \sqrt{(2T_o)^2 + 4\frac{x^2}{V_a^2}}}{2} \quad (10)$$

Simplifying, $$\Delta T = \sqrt{T_o^2 + \frac{x^2}{V_a^2}} - T_o \quad (1)$$

An inspection of Equation (1) in terms of the diagram of FIG. 6A will demonstrate at once that with the time $T_o$ small as compared with x/Va, $\Delta T$ will be large, and vice versa. This may be readily verified by referring to the reflection from $RH_3$ where it will be noted that the difference between the time required to traverse the path $E-P_4-11$ is now approaching the travel time $T_{o3}$. When $T_{o3}$ is infinite, then the vertical travel time will be equal to the travel time to the reflecting horizon located at infinity.

FIG. 6A further illustrates the need for the normal moveout correctors 58 and 110 to operate in accordance with the family of correcting curves, as has been illustrated and explained in connection with FIG. 3E.

Referring now to FIG. 5A, it will be recalled that the reflections $M_1$ and $M_{11}$ occur by reason of the travel of the seismic energy within the region above the first reflecting horizon $RH_1$. Inasmuch as velocity in most regions increases with depth and which fact will be assumed in further explanation of the invention, it will be understood at once that the travel time required for the reflection $M_1$ will be twice that of the travel time required for the reflection $R_1$. Similarly, the travel time for the reflection $M_{11}$ will be three times that for the reflection $R_1$. Accordingly, the travel time is great because the energy is passing through a relatively low velocity zone. An inspection of Equation (1) will reveal that these two factors indicate increased normal moveout correction if, for example, there is to be alignment of the multiples $M_{11}$ as they appear across the several traces of the record. It is by reason of this phenomenon that these reflections on the traces 126–130 of FIG. 5 provide the highly downwardly concave configuration already noted. Additionally, it will now be better understood why with the maximum correction applied by the scanning device 140 there is achieved the time-coincidence of the reflection $M_{11}$ on all traces and thus produced the wave-form $M_{11}$ on trace "−6" of FIG. 6. The location of the wave-form $M_{11}$ appears late in time, as for example, somewhat below 1.2 seconds, whereas, as will be noted above, the reflection $R_1$ appears slightly after the lapse of 0.4 of a second. By these circumstances, it is known that the wave-form on the trace "−6" is a multiple.

Applying the foregoing reasoning, it is similarly known that the wave-form $M_1$ appearing on the trace "−4" is a multiple, and similarly the wave-form appearing on the trace "−3" and labeled $M_{12}$ is a multiple.

Consider again FIG. 6A and rewriting Equation (2), $$[V_aT_x]^2 = x^2 + [V_aT_o]^2 \quad (11)$$

Since the distance h from the surface to a reflecting horizon is equal to the average velocity times the vertical travel time, there may be written:

$$2h = V_aT_o \quad (12)$$

Substituting Equation (12) into Equation (11):

$$[V_aT_x]^2 = x^2 + (2h)^2 \quad (13)$$

Now applying the familiar equation of a straight line to the foregoing, i.e.:

$$\text{since } y = mx + b \quad (14)$$

Then, $$\text{slope} = m = 1/Va^2 \quad (15)$$

and $$\text{Intercept} = b = (2h)^2/Va^2 = T_o^2 \quad (16)$$

Referring now to FIG. 6B, there has been plotted on non-linear squared-squared paper the distance x from a given shot-point in the expanding-spread of FIG. 2 to particular detector locations, together with time T in seconds as ordinates. The vertical travel time $T_o$ for the reflection $R_1$ of FIG. 5A will be assumed to be 0.4 second. It will also be assumed that the average velocity $V_{a1}$ from the surface to the first reflecting horizon $RH_1$ is 6,000 feet per second. Accordingly, there may be established the straight line 150 and from which it will be known the manner in which the times of arrival of the first reflections $R_1$ will appear at the geophones and shot points spaced at increasingly greater distances across the center of the expanding-spread.

Assuming the second reflection $R_2$ has a vertical travel time at the center of the expanding-spread of 0.8 second and that the average velocity to $RH_2$ is 7,000 feet per second, then the straight line curve 151 may be plotted. Similarly, assuming an average velocity to the third layer of 8,000 feet per second and a vertical travel time $T_o$ of 1.2 seconds, the third straight line 152 may be plotted.

Inasmuch as the first reflection $M_1$ traveled solely in the upper layer and of relatively low velocity but with twice the travel time of the reflection $R_1$, it will be seen that the line 153 for the reflection $M_1$ has its origin at 0.8 second and that its slope will correspond with 6,000 feet per second, that is, the slope corresponding with the line 150.

Returning now to FIG. 6, it will be seen that from the times given in that Figure on the right-hand edge of record 149, the wave-form $M_1$ on the "−4" trace arrived at 0.8 second.

It will now be understood that the scanner 140, by introducing a hyperbolic scanning function, the difference between the two hyperbolic functions previously described, in effect introduces corrections which may be represented by a family of straight lines, each with its origin at times $T_o$ for given reflections and each having a different slope. Thus, for example, when the selector switch 148 is set to the "−4" position, it will have established a normal moveout correction corresponding, FIG. 6B, with the line 153, at a time equal to 0.8 second and hence produces the alignment of the reflections across the traces of the record of recorder 131 to produce the amplified composite signal $M_1$ on record 149.

Inasmuch as the multiple $M_{11}$ of FIG. 5A traveled entirely through the low velocity region, its slope will be the same as the line 150, but it will have its origin at 1.2 seconds. Hence, the line 154 will be representative of the multiple $M_{11}$. The multiple $M_{12}$ traveled in part through the low velocity region and in part through the next higher velocity region. Accordingly, as shown by the line 155, its slope will represent an average velocity of 6,667 feet per second.

It will now be understood that with the selector switch in its left-most position, there will have been established a modified normal moveout correction representative of the line 154 at time 1.2 seconds and, hence, will cause the composited signals to produce the wave-form of multiple $M_{11}$ of large amplitude.

Summarizing the foregoing, it may be said that the time-appearance of the signals on the left-most traces of record 149 are indicative of the fact that they are multiples, whereas signals appearing, say, from the "−2" trace to the "+2" trace will be identifiable as true reflections.

If the normal moveout corrector 110 had compensated exactly for the hyperbolic relationship of the signals appearing on the several traces, all of the reflections $R_1$, $R_2$ and $R_3$ would have appeared on the zero trace. While this might sometimes happen, it is not likely. Accordingly, it will be noted that with the selector switch 148 in the "−1" position, there appeared the reflection $R_3$, while the reflections $R_1$ and $R_2$ appeared respectively on the traces 0 and +1, and in each case after operation of the selector switch 148 to those traces. The time-appearance of the wave-forms on the traces "−1", 0, and "+2" are indicative, of course, of the depths of the reflecting horizons $RH_3$, $RH_1$ and $RH_2$ from which they came.

After the completion of the scanning of the record 131 with the hyperbolic functions as just described, a gang switch 160 is closed and the reproducible record 149 is then rotated as by means of a driveshaft 161 for reproduction by the transducers of the information on each of the traces. Reference has already been made to the fact that the traces are relatively quiescent, but nevertheless there is present on them a certain amount of noise. Accordingly, the signals produced from the record 149 are transmitted individually through squelch circuits collectively indicated by the box 162. These squelch circuits perform the function of passing through the signals of high amplitude and eliminating the signals of low amplitude. Squelch circuits of this kind are well understood by those skilled in the art.

The signals after passing through the squelch circuits 162 are then applied to recording heads associated with a reproducible record 166. On this record, there have been illustrated the reflections $R_1$–$R_3$, and the multiples $M_1$, $M_{11}$ and $M_{12}$. For the moment, the description will be limited to the manner in which there are utilized the multiples of record 166 in order to remove the effect of such multiples on the record 131. With the gang switch 160 now open, the shaft 161 will be rotated to move the record 166 past a plurality of transducers for reproducing the several signals. It will be observed that a selector switch 167 shown in FIG. 5 has been illustrated in its "−4" position and that the moveable contact is connected to a phase inverter 168 shown in simplified form as a transformer. After the phase reversal of the multiple $M_1$ by the transformer 168, the signal is applied to the pick-up heads 141a–145a of a scanning device 140a which is the duplicate of the scanning device 140 above described. With the scanning device set at its "−4" position, as indicated, it will be understood there will be produced a record on recorder 170 of the multiple $M_1$, and as the switch 167 is moved to "−6" and "−3" it will record multiples $M_{11}$ and $M_{12}$. These multiples on the record of recorder 170 have been reestablished in the same time-relationship but the opposite phase-relationship as on the record of recorder 131.

After the scanning of the record 166 for the completion of the record 170, the selector switch 167 is moved to an open circuit position, and the records of recorders 131 and 170 are then rotated in synchronism. A gang switch 172, FIG. 5, is then closed to connect a plurality of pick-up heads, one associated with each of the traces of the record of recorder 170 (one of the pick-up heads 171 being identified by a reference character) in order to apply to the respective input circuits to the recorder 131, the multiples in time-coincidence with their appearance on record 131, but 180° out of phase.

In this manner, there are removed from the record on recorder 131 the multiples $M_1$, $M_{11}$ and $M_{12}$ to provide a new record. This record may, and likely will, show changes or time-shifts in the appearance of the reflections because, as well understood in the art, the multiples have such effects on the reflections, and it is for this reason that multiples give rise to such great difficulties in interpretation of seismic data. Accordingly, with a new record established on recorder 131 free of multiples, it will be understood that it is then passed through the scanning device 140 which is operated, as for example, from its "−2" position to its "+2" position in order to reproduce again the reflections $R_1$, $R_2$ and $R_3$. It is possible that the modifications in time-appearance of one reflection may have been enough by reason of the presence of the multiples to cause it to shift from one to another trace. For the purposes of the present description, however, it will be assumed the reflections again appear in approximately the positions illustrated on record 149. With the reflections appearing in proper time-relationship on one or more of the traces from "−2" to "+2", and specifically on traces "−1" "0" and "+1", the gang switch 160 will again be closed, and the reflections $R_1$, $R_2$ and $R_3$ again reproduced on the record 166. This time, of course, there will not be present any of the multiples since they were all eliminated as a result of the operations which have just been described.

Figure 6:
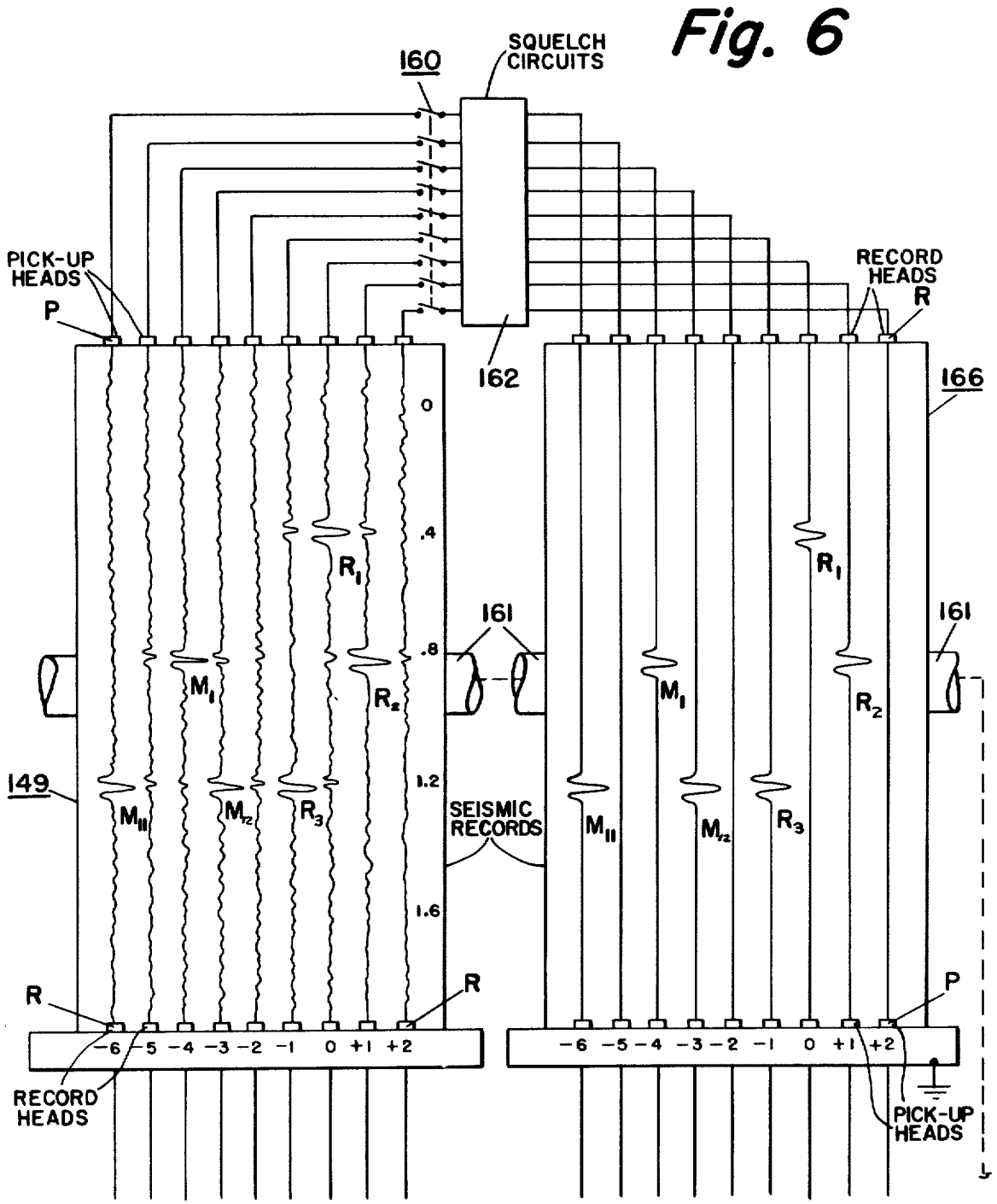

It will be remembered that the reflections $R_1$, $R_2$ and $R_3$ appear respectively on the "0" trace, the "+1" trace, and the "−1" trace of the record 166 of FIG. 6, by reason of the fact that the normal moveout corrector 110 was set up on the basis of available but not entirely accurate information as to velocity distribution over the area being surveyed. Since that information was not precisely correct, all of the reflections on record 166 do not appear on the "0" trace. The occurrences of reflections on traces other than the zero trace are employed to correct the settings of the normal moveout corrector 110 so that it will function on an exact basis corresponding with the actual velocity distribution in the subsurface region below the expanding-spread.

Though the invention is applicable to normal moveout correctors of various kinds, and such as those noted above, the normal moveout corrector 110 will be illustrated diagrammatically and in terms of both electrical and mechanical operations.

In FIGS. 7 and 8, the normal moveout corrector 110 includes a drum 200 having associated therewith a plurality of recording heads 201, one for each of the traces of the expanded record 50 of FIGS. 2 and 3. It will be assumed that the gang switches interconnecting the recording heads 201 and the pick-up units 100–104 are in their open positions. It will be further assumed that the switches 121–125 of FIG. 3 are closed.

The normal moveout device 110 is provided with a plurality of playback heads, one for each of the traces of the expanding-spread 50. Inasmuch as the expanding-spread provides data from detector locations symmetrically located on either side of the centrally located pair of detectors, it will be seen at once that each pair of detectors may be mechanically connected together. Thus the end detectors 202 and 202a are shown as jointly adjustable by a mechanical linkage illustrated by the broken line 203 which extends to a drive unit 204. This drive unit actuates the two pick-up heads 202, 202a along ways or tracks associated with the drum 200, so that these heads 202, 202a may be moved from their illustrated positions to the broken-line positions 202' and 202a'.

To provide the greatest movement for the end pickup heads 202 and 202a, there is utilized a voltage dividing resistor 205 having a plurality of taps, of which 206 and 207 have been labeled with reference characters. Those skilled in the art will understand that normal moveout has one component which varies with the square of the distance between the shotpoint and the detector. Since shotpoint E, FIG. 2, is a maximum from detector 11 (and D a maximum from detector 28), the taps or conductors 206, 207, FIG. 7, are connected to the voltage dividing resistor 205 at positions such that the voltage developed between conductor 206 and ground is proportional to the square of the distance between said shotpoints D and E and their respective detectors 28 and 11. The voltage between tap 207 and ground is proportional to the square of the distance between shotpoints D and E and detectors 27 and 12, respectively, of FIG. 2.

In connection with the foregoing, reference is to be had to Equation (7). In that equation there appears the term $(\Delta T+2T_o)$. To simplify the normal moveout device 110, the operation is such that the foregoing term is neglected. Relatively accurate corrections for normal moveout may be achieved, notwithstanding the fact the foregoing term be neglected in the operation of the computer inasmuch as that term introduces a second order correction-effect which is principally effective at the shallow depths and is of negligible value for deeper reflections, generally of greatest significance. Accordingly, the corrections in terms of the relative movements of the several playback heads are made proportional to the square of the distance between a given shotpoint and detector station. The necessary voltages for achieving this movement are obtained from the fixed taps along resistor 205, such that the voltages are proportional to the squares of the aforesaid distances.

Where the second order effect corresponding with the term $(\Delta T+2T_o)$ is to be taken into account, then there may be utilized a suitable device functioning in accordance with that term and utilized to modify the voltages selected from the resistor 205. As an alternative, there may also be utilized an arrangement like that described in an article by E. M. Palmer in GEOPHYSICS of April 1957, beginning the last paragraph, page 298.

In the normal moveout corrector 110, a pair of resistors 208 and 209 shown in FIG. 8, together with their interconnections and adjustable means function in combination with the adjustable resistor 219 and the source 220 to provide an output at a slideable contact 208a corresponding or proportional to the curve 115 of FIG. 3E. Thus, the curve 115 and the family of curves, of which only the additional curve 116 has been illustrated, all generally correspond to the function which defines curve 115 as set forth by Equation (1). More particularly, there is provided along the length of resistor 209 a plurality of shunting resistors 211–218, each connected to resistor 209 through a pair of slideable contacts which are jointly movable in the same selected direction along resistor 209. Thus, by varying the positions of the shunting resistors 211–218 along the length of resistor 209 and by connecting slideable contacts 211a–218a to selected points on resistor 208, there will be produced, as contact 208a is moved along resistor 208, an output corresponding with the normal moveout curve 115 of FIG. 3E.

For the purpose of simplifying the drawing, only the two upper contacts 211a ad 212a and the two lower contacts 217a and 218a have been illustrated as connected to resistor 208. It is to be understood, however, that the remaining contacts are connected to resistor 208 and there have been shown lead lines from resistor 208 indicative of such remaining connections. More lead lines have been illustrated than there are resistors 211–218 to indicate that there will be provided a large number of shunting resistors in order to produce as closely as may be desired an output in exact correspondence with the normal moveout curve 115 of FIG. 3E.

The taps extending to the resistor 208 may be adjustable, if desired. The distribution of the points of connection on resistor 208 may, in general, correspond roughly with curve 115, which is to say that the connections at the upper portion of the resistors 208 as illustrated, may be somewhat closer than at the lower portion of the resistor, it being understood, of course, that by providing the adjustable taps for the resistors 211–218, great flexibility is provided in producing outputs to match a wide variety of normal moveout correcting functions.

Since the curve 115 of FIG. 3E represents an approximation based upon the available data as set forth in FIG. 3D, it is necessary to correct the curve 115, as for example, in a manner indicated by the broken line 115a which is concave upwardly and the broken line 115b which represents a departure from curve 115 in an upward direction, i.e., it is concave downwardly. These variations along the curve 115 with change in time may occur at any place, and they may be in either direction. It is to be noted that it any one of the contacts 211a–218a is moved upwardly or downwardly, it will shift the voltage distribution of resistor 209 and, hence, the position of the pick-up heads in directions corresponding with the departures 115a and 115b. Where these departures may occur on the curve 115 will, of course, depend on which of contacts 211a–218a has been shifted. The determination of which of the contacts is to be adjusted and the extent of that adjustment will now be explained.

It is to be observed that the contacts 211a–218a have been shown respectively connected as by their own linkages 221–228 to their associated positioning units 231-235, only five of which have been illustrated. Each positioning means 231–235 may comprise a solenoid normally in the illustrated position, but upon energization of its coil, movable to the right to cause a wedge-shaped end to enter into a wedge-shaped opening, such as 231b, formed in an adjustable slidebar 240, FIG. 8A. It is to be noted that the bar 240 is guided for vertical movement as by means of a plurality of rollers 241 and that the position of the bar 240 vertically is determined by a rack gear 242 driven by a driving gear 244, as through the mechanical connection 245, from a step drive 246 which also serves to actuate a switch 247 from one to the other of its switching positions.

With the switch 247 in its "0" trace position, all of the wedge-shaped openings 231b–235b are located with their apices in alignment with the corresponding apices of the triangular or wedge-shaped members 231a–235a. Hence, if one of the solenoids 231–235 be energized, it will be seen that the wedge-shaped member will enter into the triangular shaped opening and will not result in the production of a lateral force on the solenoid 231. On the other hand, if the member 240 be displaced downwardly and the solenoid 231 energized, it will be seen that the upper face of the triangular or wedge-shaped member 231a will engage the upper face of the triangular shaped slot 231b. Thus there will be a downward force applied to the solenoid 231, and this force will be transmitted through the linkage 221 to move the contact 211a a corresponding amount. Had the movement of the member 240 been in an upward direction from its mid-position, then, of course, the lower face of the wedge-shaped member 231a would have engaged the lower face of the triangular shaped slot and the movement of the solenoid 231 and of contact 211a would have been in an upward direction.

It will be remembered that the zero position of switch 247 is indicative of the fact that corrections need not be made, but with the switch in other than the zero position there may be determined the extent of the error appearing in the originally utilized velocity data. The foregoing description of operation of the adjusting mechanism meets the foregoing requirements.

With the above understanding of how the contacts 211a–218a may be moved either upwardly or downwardly, the manner in which the extent of that movement is determined will be set forth. If the switch 247 be moved to the left or to the right of its illustrated "0" position, it will, of course, be seen that the bar 240 will be moved in corresponding directions, either upwardly or downwardly. Moreover if the switch 247 be operated to its extreme positions, then there will be greater movement of the member 240 and a greater corresponding movement of contacts 211a–218a in the event of energization of any one of the solenoids 231–235.

In the foregoing description, it has been assumed that the rheostat 219 in series with the resistor 209 has been set at the proper position, to establish a voltage of selected magnitude across resistor 209 as from a suitable source of supply illustrated as a battery 220. In this connection, reference is also to be had to a combined display and recording device 250. It may be the same kind as described above for the display device 96 and in conjunction with it there are provided recording means such as a multi-channel magnitude recorder for producing an expanded-spread record.

The normal moveout corrector 110 now is to be readjusted to correct the voltage on resistors 208 and 209 in accordance with the information provided by the distribution of the reflection $R_1$–Rhd 3 on the traces of record 166. The switch 247 will, by a step drive, be driven to its left-most "−2" position. In this position, the step drive 246 will through the connection 245 have rotated gear 244 to move the adjusting bar 240 to its corresponding position. Assuming all of contacts 211a–218a to be in their mid-positions, then with the bar 240 in its maximum upward position, energization of any one of the solenoids will cause its corresponding contact to be moved upwardly by the foregoing maximum amount. Since this is in the direction of ground, the time change will be in a negative direction, and hence, may introduce a correction in curve 115 of FIG. 3E similar to that illustrated at 115a.

As the drum 200 is rotated, it drives through a mechanical connection 257, the contact 208a, and through reduction gearing 254, which gearing also actuates the step drive 246. A branch mechanical connection 258, rotates the contact of the switch 253 in synchronism with the drum 200 through a plurality of positions, there being one position of switch 253 for each of contacts 211a–218a and corresponding in number with the number of solenoids or actuators 231, etc. There have been shown more contacts on switch 253 than either the number of contacts 211a–218a or of solenoids 231–235 to indicate larger numbers will normally be utilized.

In the first and illustrated position of switch 253, it will be observed that a connection has been completed from an amplifier 252 receiving as its input any signal which may appear on the left-hand or "−2" position of switch 247, and for completing a connection by way of conductor 261 to a solenoid 231. This solenoid 231, however, is not energized for the reason that an inspection of the record 166 of FIG. 6 will indicate that in the "−2" position of switch 247, no signal appears. Due to the absence of that signal, none of solenoids 231–235 will be energized as scanning contact 253 is moved through its plurality of positions for the first revolution of drum 200.

After the first revolution of drum 200, the step drive 246 functions to rotate the switch 247 to its "−1" position.

Through the mechanical connection 245 and the gear 244, the adjusting bar 240 is concurrently moved downwardly to a new position. As the drum 200 now rotates through a second revolution, the scanning switch 253 will again be operated through its multiplicity of positions. As illustrated in FIG. 6, the reflection $R_2$ appears on the "−1" trace. The signal representative of that reflection is applied to the amplifier 252 and completes a circuit through one of the stationary contacts to one of the solenoids which thereupon moves its associated wedge-shaped head into a triangular-shaped opening to adjust one of the contacts 211a–218a upwardly to introduce a correction into the voltage representative of the normal moveout curve of FIG. 3E. Thus, this correction might well correspond with that labelled 115a of FIG. 3E.

After completion of the second revolution of the drum, the foregoing procedure is repeated for the "0" trace of record 166, the switch 247 and the bar 240 then occupying their illustrated positions. No shift in the position of any of contacts 211a–218a occurs for the "0" trace for the reason that this is the original position on all shunts 211, etc. Even though a signal is received on amplifier 252 at a time corresponding with energization of solenoid 233, no movement of adjustable contact 213a occurs.

The operation above described includes the zero position since it makes for simplicity in the illustration of the apparatus including the step drive.

As the foregoing procedures are repeated, the waveform of reflection $R_2$ on the trace "+1" is amplified by the amplifier 252 and a circuit may be completed at a time to energize a circuit by way of a conductor 264 to solenoid 234. Inasmuch as the switch 247 is now connected to the "+1" trace, it will be understood that the bar 240 has moved downwardly from its illustrated position to reverse the direction of movement of the contact 214a as compared with those previously adjusted.

It is to be emphasized that the time occurrence of the corrections will depend upon the position of the reflections on traces "−2" to "+2" on record 166, and that the solenoids 231–235, etc. which may be energized will depend upon the position of switch 253. Thus, switch 253 completes a circuit to introduce the correction at the proper time on curve 115 of FIG. 3E to shift the time correction introduced by the normal moveout corrector 110.

With the normal moveout corrector 110 now corrected so that its operation corresponds in fact with the velocity distribution in the earth below the expanded-spread section, the gang switches from the playback units 100–104 are now closed and the switches 121–125 opened. Hence, there may be produced a new record as at the device 250 which will be a record of an expanded-spread section in which precise correction has been made for normal moveout and based upon the existing velocity conditions and not upon the initially assumed velocity conditions. Thus, there has been achieved a record heretofore not available, and one which will be of greater value to those who interpret seismic records.

Returning now to FIG. 2, it will be remembered that the records 50a–50e making up the record-section 50 are arranged in an order in which the record 50d appears to the right of 50c, and 50b to the left of record 50c. This arrangement is preferred for all operations until after the normal moveout corrector 110 of FIG. 7 has been set to conform with the existing velocity distribution. Thereafter, it is desired that the records 50a–50e be arranged from right to left in the same order as in the record-section 51. This re-arrangement has been illustrated in FIG. 7 by way of the connection of the conductors to the several traces. An inspection of the connections to the display and recording device 250 indicates that the six uppermost horizontal conductors correspond to the traces of record 50a, the next six for the record 50b, and so on for the records 50c, 50d and 50e. Though not illustrated, it is to be understood that gang switches may be included in the connections to the display are record means 250. Such gang switches can be normally open until after the adjustment of the normal moveout device 110 in the manner just described.

Returning now to the normal moveout device 110, reference may now be had to FIG. 9 which may be taken as illustrative of an exact normal moveout correcting function 115c after modification by the resetting of the normal moveout corrector 110, as has just been explained. A comparison between the original curve 115 of FIG. 3E which was based upon available data and that of the corrected curve 115c will make self-evident variations introduced by the techniques and apparatus thus far explained. The curve or graph of FIG. 9 may be obtained by recording the output voltage at the contact 208a with respect to time $T_o$, i.e., in correlation with the rotation of the drum 200. Accordingly, there may now be utilized the data from the new curve 115c by utilizing Equation (8) also appearing in FIG. 10 to derive a new curve or graph 270 representing the change in the apparent average velocity with change in vertical time. Again, a comparison of the graph or curve 270 with that appearing in FIG. 3D will emphasize the importance of the corrections which have been thus far made.

In order to simplify the description and eliminate need to discuss the effect of dip on the operations, it was tacitly assumed in FIG. 1A that the earth's surface was flat or horizontal and that the reflecting horizon $RH_1$ had a like configuration. Such conditions, as have been mentioned, are seldom encountered in practice. In fact, when surveys are conducted for the purpose of locating likely spots for the drilling of an oil well, dip is one of the factors which is looked for and which, if present, may give rise to the possibilities of the discovery of salt domes, faulting, and other clues which can be interpreted as indicative of the likely presence of oil and/or gas.

It will be remembered that there was illustrated in FIG. 7 a display device and recorder 250 by means of which a new set of records representing the expanding-spread might be achieved. Such a record has been illustrated in FIG. 13, the reference character 250 again being applied to identify the recorder utilized for producing the new set of records labeled respectively $50a_1$–$50e_1$.

Such a set of records as discussed in connection with FIG. 1A is useful in its own right particularly when the records are in the order 50a, 50d, 50c, 50b and 50e. Further in accordance with the present invention, the records in the order $50a_1$, $50b_1$, $50c_1$, $50e_1$, are now utilized to determine the presence or absence of dip and the extent to which it may be present. By means of a playback device 280 including transducers or pickup heads the traces on the expanding-spread record-section are composited trace-by-trace. Preferably, for the very early reflections, such as $R_1$, the several gang switches for the seismograms 50a$_1$, 50b$_1$, 50d$_1$, and 50e$_1$ will be open. Accordingly, only the traces from the centrally disposed seismogram 50c$_1$ will be connected to the transducers of the recording device 287 for recording on the six traces thereof the first breaks and the shallower reflections, such as $R_1$. By means of a cam 282 and the mechanical linkage 284, the gang switches for the seismograms 50b$_1$ and 50d$_1$ are now closed to establish summation circuits for the corresponding traces of each of the seismograms. With the signals so composited, reflections at intermediate depths, such for example as reflections $R_2$, are recorded on the seismogram 300 by the recorder 287. For the deeper reflections, the end seismograms 50a' and 50e' are, by action of the cam 281 and the linkage 283 for closing the end-gang switches, included in the trace-by-trace compositing. Thus with all seismograms composited on a trace-by-trace basis, there is produced on the new record of seismogram 300 the deeper reflections including $R_3$.

It has been found that compositing in the manner just described results in composited seismograms of enhanced definition and for the reason that there has been eliminated the effect of first breaks and surface noises from the outermost seismograms which in reference to the early or shallow reflections may tend to obscure them. These effects are less serious for the deeper reflections, and for the latter, the addition of the more remote seismograms of the expanding-spread record-section are particularly effective in increasing the amplitude of the signals reflected from the deeper reflection beds.

After the application of the aforesaid composited signals to the recorder 287 by way of the signal channel 286, it will be noted that on the resultant record or seismogram 300, the reflection $R_1$ has the same time occurrence across the several traces. This is evident by the horizontal alignment of the cumulatively added signals which identify the reflection $R_1$. On the other hand, reflection $R_2$ inclines upwardly to the right, while the reflection $R_3$ inclines downwardly to the right. Through the use of an accurate, normal moveout correcting function, the reflections add in phase, and multiples and all other signals tend to add out-of-phase, and thus disappear due to cancellation effects. It is for this reason that there only appears on the seismogram 300 the first breaks and the several reflections, all with appreciable amplitude.

In order now to determine the extent of the dip (quite apart from direct measurement of it on the record 300), there is utilized a dip-scanning device 302 having a movable arm 303 mounted for rotation about an axis coincident with the location of the central portion of record 300 and which has driving connections to a plurality of pick-up heads mounted along the length of element 303 so that these pick-up devices may be maintained in alignment but rotated about the central axis. Thus, by operating a knob 305, the element 303 may be rotated from its illustrated solid-line position to its dotted-line position indicated at 303a. The element 303 is movable across a scale 306 which, it will be observed, has markings thereon from "+4" to "0" and thence to "−4".

Figure 14:
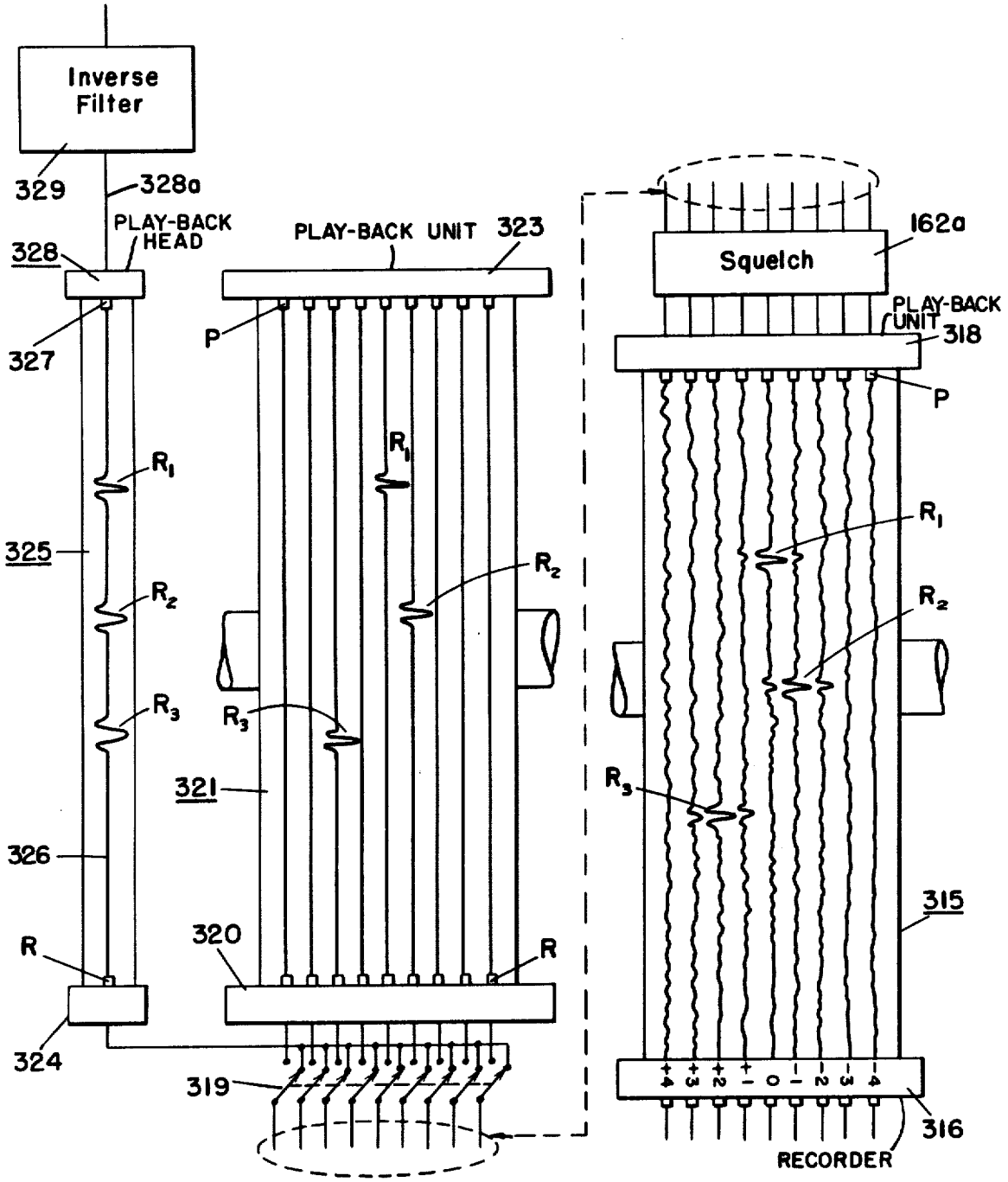

The conductors extending from the pick-up heads carried on the element 303 are connected together and to conductor 308 to provide a composite output signal which is applied to the switch arm 309 rotatable through a plurality of positions. Each stationary contact is connected to a recording channel for recording one of a plurality of traces on which signals are to be produced on a record 315. As illustrated, the switch 309 is completing a circuit to the "−4" channel for record 315. (FIG. 14)

As a result of the record 300 being rotated throughout its length past the dip-scanner 302, it will be observed that the reflections $R_1$, $R_2$ and $R_3$ are eliminated and, accordingly, no signal appears on trace "−4". After the completion of the first traverse of record 300, the element 303 is moved to the "−3" position, and the procedure repeated. No signal appears either in the "−3" or the "−2" position, but when element 303 has reached its "−1" position, the reflections $R_2$ of the several traces on record 300 add up accumulatively and produce a high amplitude signal $R_2$. Similarly, with the element 303 in the "0" position, the reflection $R_1$ is recorded on the "0" trace and the reflection $R_3$ is recorded on the "+2" trace when that position is reached by the element 303.

Inasmuch as some noise is present on the several traces, as shown, it is desirable to transport the record 315 through a playback unit 318, the signals from the several traces passing through a squelch circuit arrangement 162a corresponding with that described above for the device 162. The squelch circuit arrangement 162a removes the noise from the several traces and leaves only the reflections which with a gang switch 319 in its left-hand position functions through a recording device 320 to produce a new record 321 showing quiescent traces except for the traces on which there appear the reflections $R_1$, $R_2$ and $R_3$.

The positions of reflections $R_1$, $R_2$ and $R_3$ on record 321 indicated the depth and dip of reflecting horizons as visually indicated on the record 300. However, by providing record 321 in the form illustrated, the reflection time and dip of any reflections present may then be sensed by a unit 323 which may provide a print-out type record of an analysis of the expanding spread data and thus permits a final step in machine data analysis. The print-out device 323 will merely translate the visual positions of the reflections $R_1$, $R_2$ and $R_3$ to finite time values (which are illustrated on the chart) and concurrently print out the dip which will be known by the presence of the reflection on the particular traces corresponding respectively with the scanning positions of the dip-scanning device 302. The resulting data in one form would be presented as a tabulation of reflector depth in a first column and dip at such depth in a second column.

It will now be apparent that the disposition of the reflections on the several traces has a direct relationship to the slope. Accordingly, the dip-scanning device 302 provides a direct measure of the dip per unit distance, known as K in the following equation:

$$v_a\text{corr.} = \sqrt{\frac{V_o}{1 + K^2 V_o^2}} \tag{17}$$

This equation has been illustrated in FIG. 11 and indicates that the dip correcting device 302 may be utilized for ascertainment of dip and by means of which there may then be plotted a new curve 270a of FIG. 12 showing the relationship between the correct apparent average velocity $V_a$ (corr.) against vertical time $T_o$ plotted as ordinates. A comparison of the curve 270 of FIG. 10 and 270a of FIG. 12 will indicate significant differences achieved in accordance with the present invention.

Alternatively, with the switch 319 in its right-hand position (as illustrated), all of the signals including reflections $R_1$, $R_2$ and $R_3$ will be added together to form a composite signal which is applied to a recording device 324 to produce on trace 326 of record 325 a single signal which best represents the time occurrence of the reflections of $R_1$, $R_2$ and $R_3$ and is a composite of all data obtained from the expanding-spread procedure. The signal on trace 326 may then be employed for the interpretation of the subsurface structures underlying the expanding-spread array, or may be processed through various techniques, such as inverse filtering, to provide a more exact representation of subsurface layering. To illustrate the latter, a play-back head 327 is employed for the production of a signal which is applied by way of channel 328a to an inverse filter unit 329. Filter 329, representative of an attentuation function the inverse of that through which the acoustic waves and resultant seismic signals have passed, will restore the signal represented by trace 326 to an undistorted form which may be considered more representative in detail of velocity layering below the expanding-spread than the initial seismic signals or record-section 50. The inverse filter 329 may be of the type illustrated in Lawrence et al U.S. Pat. No. 3,076,177.

Figure 15:
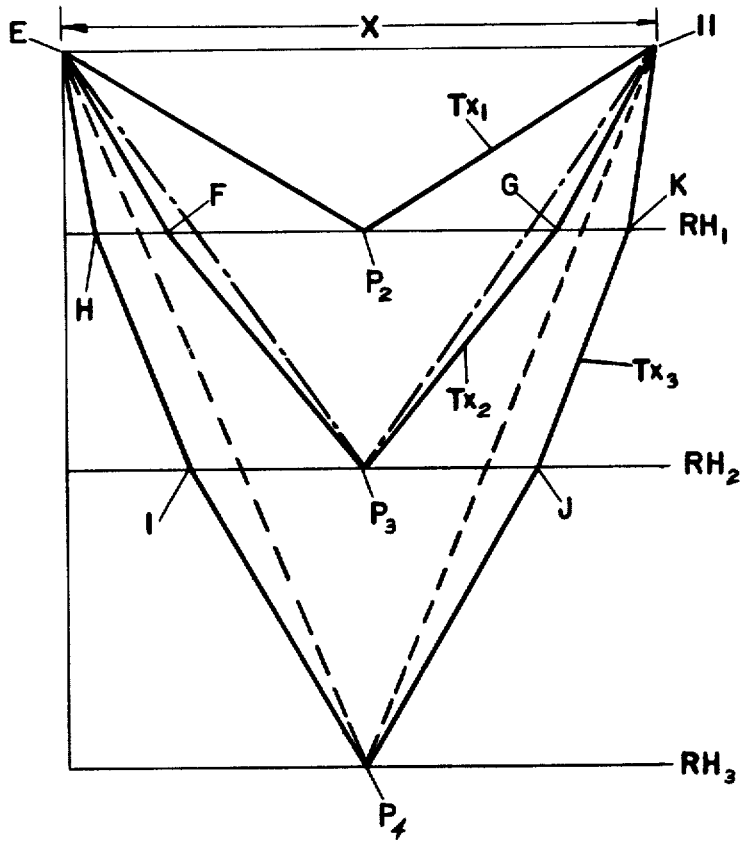
FIGS. 15 and 16 are graphs illustrative of further aspects of the present invention.
Figure 16:
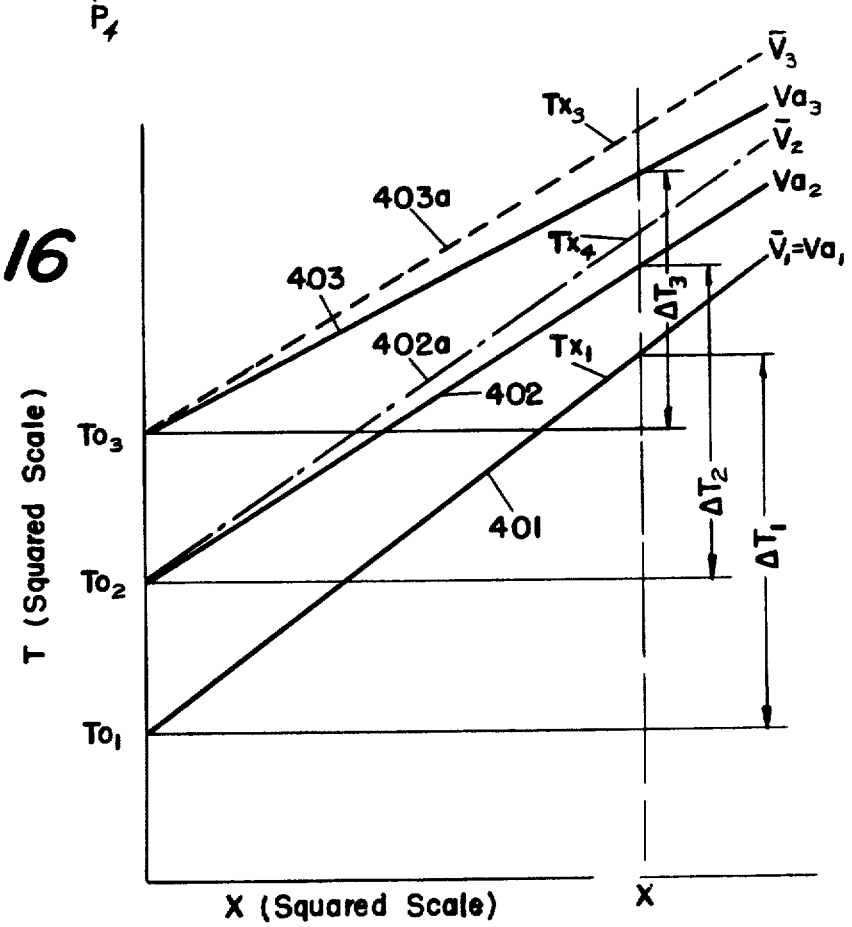

The development of expanded-spread seismic data as described herein provides information heretofore unavailable from conventional seismic reflection methods. Principally the information developed is of a three-fold nature. The first is the delineation between multiple reflections and primary reflections and the elimination of multiples. The second is the provision of additional velocity control to that normally available from scattered velocity surveys in drilled wells. The third is the correlation possible as to lithologic information using the interval velocities determined in accordance with the present invention as a tool for such interpretative techniques. In carrying out the invention, computing system either of the digital variety as are well-known in the art or of analog systems of the type illustrated herein may thus be employed. In one aspect the invention contemplates the processing of expanded-spread data through all of the steps illustrated in FIGS. 1–14. In a further aspect there may be employed data processing steps and systems for upgrading data such as illustrated in FIG. 3E for the production of the corrected normal moveout function shown in FIG. 9. From the data of FIG. 9 there is then produced by means of unit 270', FIG. 10, the apparent average velocity function shown by curve 270. Data represented by curve 270 as processed by the unit of FIG. 11 is corrected for dip to produce the curve 270a of FIG. 12. It may then be necessary to modify the data represented by FIG. 12 so that an exact average velocity profile is obtained. The latter would be obtained from the apparent average velocity curve 270a of FIG. 12. The reason for the latter steps will be indicated from an inspection of FIGS. 15 and 16. The straight line 401, FIG. 16, is a plot on the $T^2-X^2$ scale of the variations in travel time of a reflection from the first reflector $RH_1$, FIG. 15, for seismic waves generated at shotpoint E and detected at various distances X, FIG. 15. The curve 401 is correct for the case where the velocity from the surface down to the reflection horizon $RH_1$ is constant, the travel path from shotpoint E to the reflection $P_2$ back to the detector location 11 being considered to be the straight line ray path $Tx_1$. However, in the case of the reflection from the second reflecting horizon $RH_2$ and a third-reflecting horizon $RH_3$ the apparent average velocities are represented by the solid lines 402 and 403, FIG. 16, and are representative of the travel path, FIG. 15, to horizon $RH_2$, i.e., E, F, $P_3$, G, and 11, and to horizon $RH_3$, i.e., E, H, I, $P_4$, J, K, and 11, respectively. The variation in travel time plotted on the straight line travel path, i.e., on the same basis as curve 401, would be represented by the dashed lines 402a and 403a, FIG. 16, which would provide a measure of the actual average velocity from the surface to horizons $RH_2$ and $RH_3$, respectively. If a measurement were made from the surface to a given reflector and directly back to the surface, it would be found that less time would be required than indicated from the average velocity curves 402a and 403a. This is because a given ray path seeks its fastest path. This means that an impulse would spend less time than indicated by the straight line path such as connects shotpoint E and reflection point $P_3$ in the upper formation of lower velocity. In contrast, more time would be spent in the second bed between points $P_2$ and $P_3$. Therefore, the actual average velocity is lower than the apparent average velocity. Only the apparent average velocities $Va_1$, $Va_2$ and $Va_3$ would thus be determined unless the corrections indicated in FIGS. 15 and 16 are made. In accordance with the proposals of Dix hereinabove noted, the actual average velocities $V_2$ and $V_3$ may be approximated.

Having obtained data as to the correct average velocity profile, there may then be produced signals representative of the actual interval velocity from surface to the depth of the deepest horizon, the latter information being available without the necessity of providing a hole drilled to such depth.

It will be appreciated that useful information may be derived without extending the data processing as indicated above. For example, the parameters of the exact normal moveout curve 115c of FIG. 9 taken above are valuable. The comparison of curve 115c with curve 115 of FIG. 3E would provide valuable information as to the precise nature of the normal moveout corrections. For this purpose there has been provided herein a recorder 208b, FIG. 7, which may be employed to provide a plot of the voltage across the resistor 208 as a function of record time. It will be noted that the mechanical linkage 257 is connected to recorder 208b and that the connection 208a leading from resistor 208 is connected to the input terminal of recorder 208b. A direct plot of the voltage 115c as illustrated in FIG. 9 is registered by recorder 208b.

Furthermore, information as to the magnitude and the sense of the necessary correcting functions applied in the system of FIG. 8 to establish the correct voltage across resistor 208 in and of itself is useful. For this purpose a recorder 266 has been provided in FIG. 8 which is connected to the various taps leading from the switch arm 253 and thus provides a multichannel record both as to the magnitude and direction of the necessary correction for the normal moveout voltage across resistor 208.

Referring again to FIG. 1B, it will be noted that a loop is formed by units 131, 140, 149, 166, 140a and 170. In FIG. 5 the sweeping functions of hyperbolic character in units 140 and 140a are indicated as being established through the use of a rod such as rod 146 which is flexible such that when latched at selected points along scales 146a and 146b the distribution of the detectors 141–145 will be hyperbolic in character. It is to be noted that a rod 146 of uniform thickness and width would ordinarily define a cubic curve rather than a segment of a true hyperbola. Thus, it may be desirable to so shape the element 146 so that for all degrees of flexure it will conform with the desire hyperbolic function. Alternatively, separate scales could be provided for playback units 142 and 143 so that each could be independently locked at the desired position for each playback operation.

Furthermore, the increments on the playback operations such as represented by the scales 146a and 146b may be successively decreased for successive cycles of flow of data around the loop indicated in FIG. 1B. The foregoing description has treated primarily the functions involved in identifying multiples in the first pass through the system, the removal of multiples during the second pass around the loop and, after multiple removal, feeding the data to the exact moveout correcting unit 110 for the succeeding operations. A plurality of cycles around the playback loop would permit finer and finer determination of the corrections necessary to be applied to the normal moveout correcting function at unit 110 in order to make it exact.

Referring again to FIG. 1A, it will be seen that the evaluation of the velocity profile at each of a plurality of points along a traverse will permit some lithologic interpretation from the surface exploration techniques based upon the velocity character. This interpretation may be carried out through the use of the products of an inverse filter or may be dependent upon an exact velocity distribution function of the type illustrated in FIG. 12. The data processing method and system herein disclosed, and particularly in connection with FIGS. 7 and 8, are employed for generating output signals which are dependent in magnitude and sense upon the magnitude and direction of variations in the tine-occurrence of successive reflection components in the set of expanded-spread data corrected for weathering, elevation and approximately corrected for normal moveout.

The latter correction based upon the best available velocity data is then employed to provide a key to the exact velocity function. The correcting function may then be employed either to correct the normal moveout curve so as to produce curve 115c, FIG. 9, or may be recorded directly to provide an index to velocity character. To this end the system of the present invention may include broadly a means or apparatus for producing a first set of expanded-spread seismograms each of which includes seismic reflections from reflecting layers encountered in a given stratigraphic column probed by the seismic waves. A system is then provided for applying corrections to the first set of seismograms, which corrections include dynamic corrections based upon the best known velocity distribution function to produce a second set of seismograms. The system further includes means for generating physical representations which in magnitude and sense are dependent upon the magnitude and direction, respectively, of the variation in the time-occurrence of successive reflections appearing in the second set of seismograms. The set of seismograms then corrected in dependence upon the information derived from the production of error functions may then be employed for further refining the data to provide a maximum utilization of the expanded-spread information.

From the above description, it will now be clear that the present invention provides a method and means of determining the subsurface character of selected stratigraphic columns, such as those above-identified in FIG. 1A as 10b, 10c and 10d. The probing of each stratigraphic column by means of field data involves the utilization of a multiplicity of seismograms obtained from corresponding subsurface reflecting segments, one such segment being identified by $S_1$, FIG. 2. It will be further remembered that in record 50 of the expanding spread, like reflections and like multiples lie on curves extending across the record, which curves roughly approximate the curves of hyperbolic functions. In the approximate normal moveout correction, there is utilized a family of curves of approximate hyperbolic character, two of which are illustrated in FIG. 3E.

Figure 17:
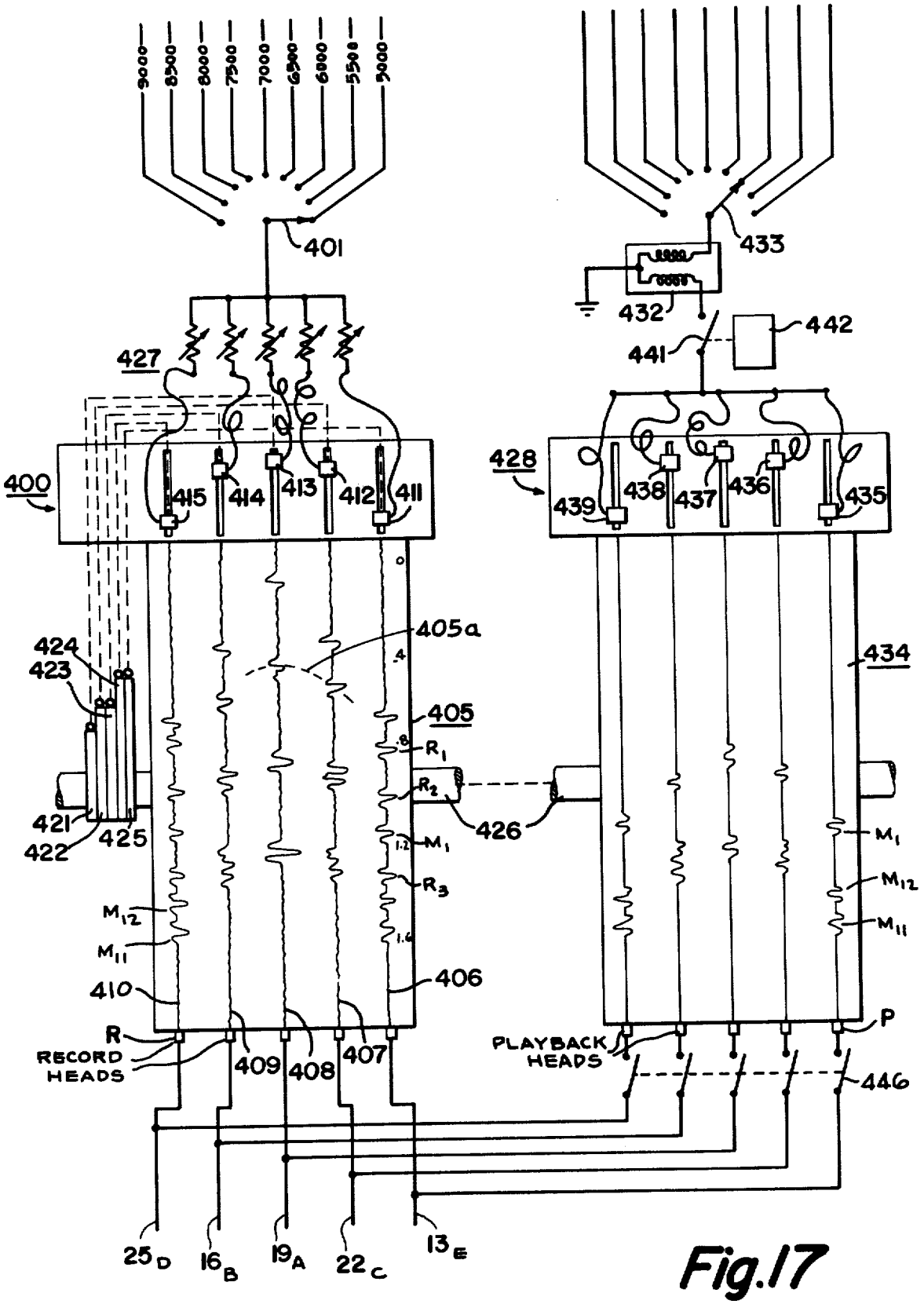
FIGS. 17 and 18 diagrammatically illustrate a modification of the invention.

With the foregoing in mind, the advantages of the present invention may also be realized with a modified operation of the scanning devices 140 and 140a of FIG. 5 and as more particularly illustrated in FIG. 17. Instead of utilizing a normal moveout corrector for the normal moveout correction of the data of expanding spread 50 so that summations can be obtained, as explained in connection with FIG. 3, the dynamic scanning device 400 of FIG. 17 is provided with a controlled dynamic operation so as to avoid the need of the normal moveout corrector. By this means, a record 416 (FIG. 18) is obtained from the output connections from switch contact 401, which record comprises a plurality of traces each made with a different assumed constant velocity. On this record, each of several reflections and multiples appear in a manner soon to be described and on a time-scale the same as for the original seismograms.

In the modification of the invention now being described, an equation similar to Equation (1) is utilized which is as follows:

$$\Delta T_d = \sqrt{T_o^2 + \frac{x^1}{V_o^2}} - T_o \qquad \text{(IA)}$$

where $\Delta T_d$ is the dynamic correction time;

$T_o$ is the vertical travel time;

x equals the distance from the shotpoint to each detector which produces a seismogram; and Vc will for successive scanning operations be different assumed constant velocities covering the range of those present in the area in which said seismograms were made.

Figure 19:
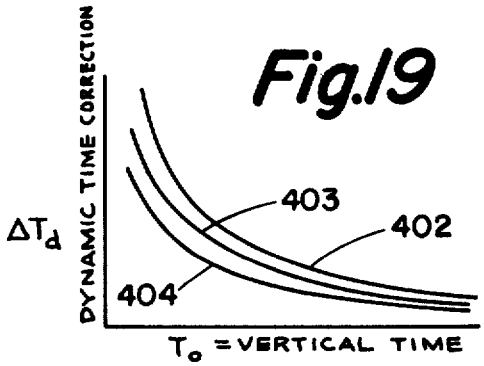
FIG. 19 illustrates graphs explanatory of the operation of the system of FIGS. 17 and 18.

The magnitude of Vc will be both less than and greater than those likely to be encountered in the area of the stratigraphic column being explored. For example, if a constant velocity of 5,000 feet per second be utilized, then there will be obtained for a given detector the curve 402 of FIG. 19, plotted with vertical time $T_o$ as abscissae, and $\Delta T_d$, the dynamic time correction, as ordinate. It will, of course, be understood that there will be a family of such curves each based upon the constant velocity of 5,000 feet per second, but with different values of x for the several detectors.

For the next assumed velocity of, say, 5,500 feet per second, curve 403 may be plotted, and so on for successively higher assumed velocities, though only one additional curve 404 has been shown for a velocity of 6,000 feet per second.

For each different assumed constant velocity it will, of course, be understood that there will again be a family of curves each with x varying with the different distances from the respective shotpoints to different detectors.

The curves represented in FIG. 19 as well as the family of curves associated with each curve represent functions which are approximations of hyperbolic function when $\Delta T_d$ is small, i.e., below about unity. Accordingly, the function exhibited by each of these curves will hereafter be referred to as an approximate hyperbolic function. By approximate it is intended to generically describe the functions of FIG. 19 as well as the hyperbolic functions and difference between hyperbolic functions described above.

The manner of operation is as follows. In FIG. 17, the conductors labeled $13_E$, $22_C$, $19_A$, $16_B$ and $25_D$ are respectively connected to the detectors of FIG. 2 having corresponding numbers 13, 22, 19, 16 and 25. Each subscript letter refers to the shotpoint utilized to obtain the respective traces appearing on the record 405 and hence establishes the distance x for each detector. These detectors are connected to the recording heads R to produce the record 405. The record 405 is a seismogram with a plurality of traces, each of which may also be referred to as a seismogram.

Brief consideration of FIG. 2 will reveal the fact that the five traces 406–410 of FIG. 17 all result from reflections from the point $P_3$ of segment $S_1$, and that the paths of acoustic energy to and from that point are different. The seismic signals applied to the recording heads R for the record 405 result in an expanding spread display on the record in which there appear the first breaks, then the shallow reflections, those nearer the surface, followed by the deeper reflections. Signals representative of multiple reflections also appear. The signals on the record form patterns, the one 405a for the first reflection $R_1$ being of greatest downward concave configuration, i.e., with greatest hyperbolic eccentricity. For reflections with increasing depth and as shown by the increasing time scale at the right of the record 405, the eccentricity of the hyperbolic function for the reflections decreases (see FIG. 19). The rate of decrease may not be the same for multiples and, in general, will be less.

By applying to the seismograms dynamic corrections as set forth by the above Equation (1A), the reflections present, whose velocity corresponds with that utilized in defining a particular scanning function, will add cumulatively to increase the amplitude of such reflections as appearing in the output from the switch contact 401. It will be noted that the $\Delta T_d$ correction is greatest for the outermost traces, and less for the mid-traces.

In order that the dynamic scanning may be readily accomplished, the playback heads 411–415 are moved from their illustrated positions, the positions of greatest hyperbolic eccentricity, by means of cams 421–425 inclusive. The cams have shapes for generation of control functions which by means of a mechanical connection provided between each of the cams and its associated playback head move the playback heads in conformity with Equation (1A). The playback heads 411–415 are mounted for movement along guide slots. The conventional provisions of a positive drive from each cam to each playback head are provided together with springs associated with each playback head and its linkage to bias the cam follower against the cam and to assure that each playback head at all times occupies the position determined by the applicable curve of FIG. 19.

The diameter of the record 405, which may be of magnetic tape, provides a length of record equal to that of the length of the field seismograms. Accordingly, upon a single revolution of the shaft 426, the entire length of the usable portion of each trace of each seismogram will be scanned.

It is to be remembered that for the curve 402 of FIG. 19, corresponding with the assumed constant velocity of 5,000 feet per second there will be a family of curves for that assumed velocity with different dimensions of x. Accordingly, the cams 421–425 will respectively correspond with, i.e., generate control functions corresponding with, the last mentioned family of curves for the first revolution of the shaft 426 and of the record 405.

The feature of selective weighting of the traces, utilized in connection with the earlier embodiment, is preferably also utilized in the system being described, namely the provision of a plurality of potentiometers 427, one for each trace. These are set to provide predetermined weighting functions for the traces; more specifically, to provide greater attenuation for the intermediate traces than the outermost traces which means that the outermost traces are given greater weight (the amplitudes of the signals thereon will be greater) when the traces are added together and the resultant sum applied to the switch contact 401.

Figure 18:
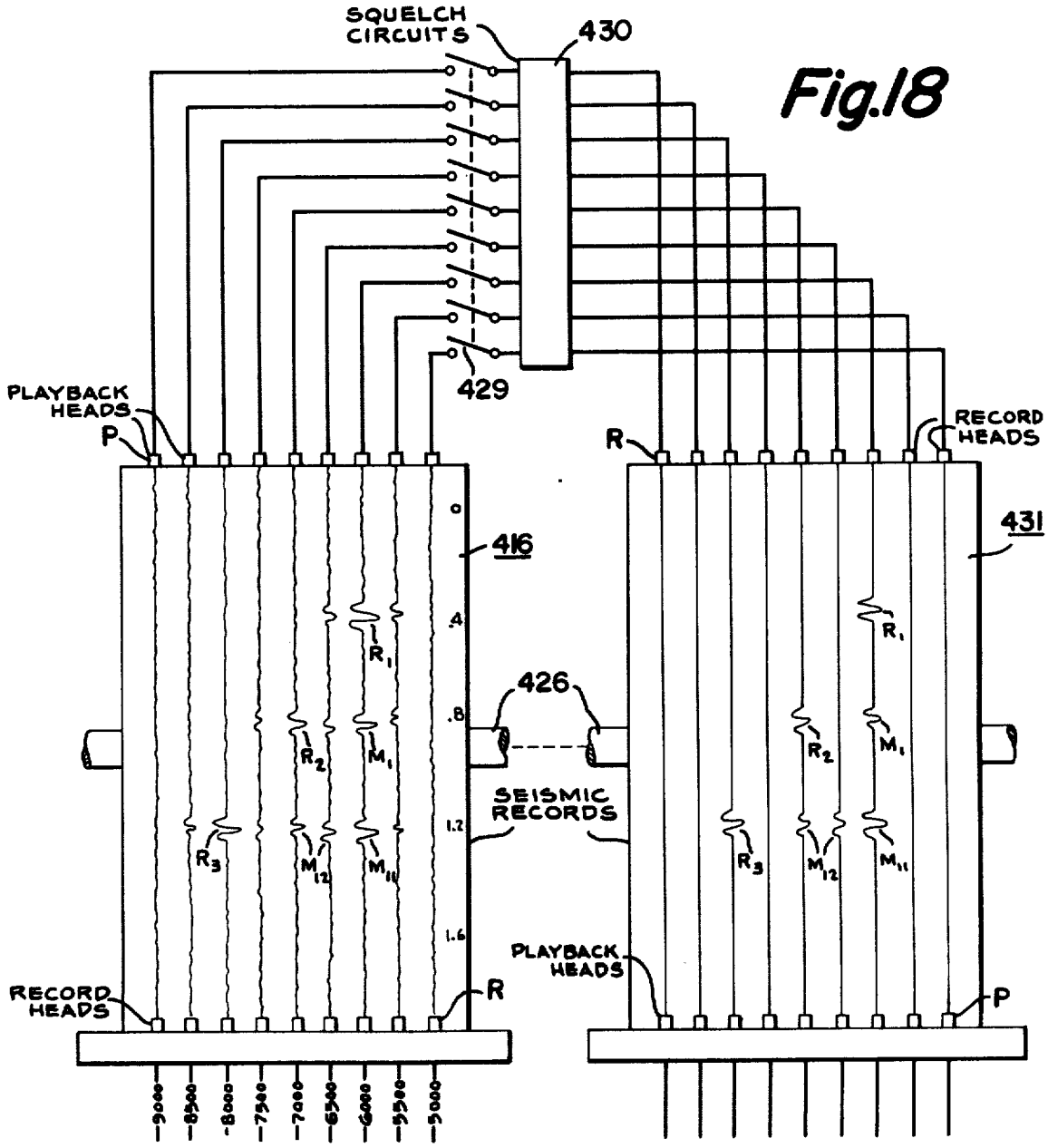

With the switch contact 401 in its illustrated position, it will be seen that the right-hand trace of FIG. 18 is produced corresponding with the assumed velocity of 5,000 feet per second.

For the first trace, none of the reflections or multiples add cumulatively, but instead cancel out so there is no significant signal on the first trace. For the next trace, a second set of cams are used which correspond with a second family of curves in which Vc is 5,500 feet per second, one curve of which is identified as curve 403 of FIG. 19. Accordingly, with the selector contact 401 in its second position, it will be observed that signals do appear but of low amplitude. However, for a scan with Vc equal to 6,000 feet per second, the reflection $R_1$ and the multiples $M_1$ and $M_{11}$ each appears with large amplitude and together provide the important information that the acoustic energy responsible for the reflection $R_1$ and both multiples $M_1$ and $M_{11}$ traveled through earth strata having an average velocity of 6,000 feet per second. This may be readily confirmed by reference to FIG. 5A (Sheet 3) where reflection $R_1$ is due to the acoustic energy having traveled through a region at an average velocity of 6,000 feet per second. The acoustic energy giving rise to the multiples $M_1$ and $M_{11}$ travels through the same strata and hence at the same average velocity.

The next trace during which Vc equals 6,500 feet per second displays the multiple $M_{12}$ of substantial amplitude for the reason that the velocity of the acoustic energy responsible for multiple $M_{12}$, as shown in FIG. 6B (Sheet 10), is approximately 6,667 feet per second.

The next following trace, during which Vc equals 7,000 feet per second, shows a prominent display corresponding with the reflection $R_2$ and also a signal due to the multiple $M_{12}$. Again referring to FIG. 5A, it will be seen that the acoustic energy for both the reflection $R_2$ and the multiple $M_{12}$ must travel through both the low velocity section and the next higher velocity section of the earth. It may be noted that the multiple $M_{12}$ is of less amplitude than the reflection $R_2$, since the energy giving rise to the multiple $M_{12}$ twice traveled (two round trips) through the velocity section. The next trace, where Vc equals 7,500 feet per second, is relatively quiescent, but the reflection $R_3$ comes in prominently on the 8,000 feet per second scan and in correspondence with the diagram of FIG. 5A.

By utilizing the dynamic correcting system of FIG. 17, advantages are obtained in the use which may be made of the data as it appears on the record 416 of FIG. 18 in that multiples can be more easily recognized, since they are now, due to their appearance on a given assumed velocity trace, identified in terms of the average velocity of the strata through which their acoustic energy traveled, thus allowing the interpreter to make readings therefrom which he can relate directly to the interpretation problems involved. In other words, the record 416 provides a graphic display relating velocity, Va, and vertical time $T_o$, one to another.

The use thereafter made of the record 416 in eliminating multiples from the original seismic record is accomplished in a manner similar to that described above, that is, by utilizing a record-scanning device 428 of FIG. 17 whose operation is the reciprocal of that of the device 400. More particularly, the signals from the record 416 of FIG. 18, after completion of the several traces, are reproduced by playback heads P and applied by way of the contact of the switch 429, now in its closed position, to a noise eliminator or squelch circuit 430. With the noise so removed, a new record 431 is made by recording heads R. On this record 431, only signals of interest above a selected amplitude appear and in the absence of noise which is always present in field seismograms.

Since there has now been achieved the identification of the multiples, by providing an inverter 432 in series with the movable contact 433 of a scanning switch, a new record 434 may now be produced on which the multiples appear, each 180 degrees out of phase with their appearance on record 405 and in the same time-positions on record 434 as on record 405. To provide the dynamic scan for the recording heads 435–439, a set of cams identical with the cams 421–425 will be provided or the same cams may be utilized for the generation of the needed control functions for the dynamic control of recording heads 435–439 in the same manner described above for the playback heads 411"415.

When the scanning contact 433 is in its third position, the multiples $M_1$ and $M_{11}$ are recorded as appearing on record 434. However, the reflection $R_1$ does not appear on the record 434 and for the reason that a switch 441, by means of a switch controller 442, is opened prior to passage of the multiples $M_1$ and $M_{11}$ but is closed prior to the appearance of the first of the two multiples, namely $M_1$. In a similar manner the reflections $R_2$ and $R_3$ are prevented from appearing on record 434.

In setting the controller 442 for the control of switch 441, advantage is taken of two facts. First it will be noted that the reflections always appear on the upper portion of record 431. A diagonal line drawn across record 431 will delineate the time appearance of the reflections above that line and the time appearance of the multiples below that line. Thus, for each record, the switch 441 will be open during the passing of the leading portion of the record by the playback heads and until arrival of the imaginary diagonal line just described. The second fact is that the reflection signals are the first to appear on the respective traces of record 431 and this will be true regardless of the number of reflections which may appear on that record. Thus, the switch 441 may be closed in response to and immediately following the appearance of each trace of the first signal detected by the corresponding playback head associated with record 431.

After the completion of record 434, the switch 446 is moved to its closed position thereby connecting the several traces on record 434 by way of playback heads P to the corresponding circuits $13_E$, $22_C$, $19_A$, $16_B$ and $25_D$. With this connection complete, a rerun of the record from the same detectors will result in the cancellation of the multiples from each of the seismograms. If any residual of the multiple signals remains, the cancellation will be completed by repeating the above operations with newly made record by treating it in a manner identical with that just described.

It will be recalled the present operations were described for the point $P_3$ of segment $S_1$ of FIG. 2. However, it will be understood that there will now be repeated the above operations for a multiplicity of points along the segment $S_1$ and of course including the other two points $P_1$ and $P_2$ already identified on segment $S_1$ of FIG. 2.

It is to be further understood that the dynamic scanning functions of the scanning devices 400 and 428 may be accomplished by computers of types differing from the analog arrangements illustrated. Such a modification of the invention has already been mentioned in connection with the scanning devices 140 and 140a of FIG. 5. A digital computer is well adapted to perform the scanning functions described in connection with FIGS. 5 and 17, together with other operations of the analog system described above and illustrated in the drawings.

Whether the records 416 and 431 be made by the analog equipment or whether the same operations be performed by a digital computer for a like treatment of the seismic data, one of the advantages of the present invention is that the resultant records (corresponding with either records 416 and 431) may be stacked, that is added together. More particularly, a plurality of such records may be made, each produced for different points on the reflecting segment $S_1$ of FIG. 2, and these records then composited. The resultant averaging effect will increase the signal-to-noise ratio. After such compositing, the resultant record may then be utilized in place of one or the other of records 416 and 431 as described above.

The compositing of a plurality of records like either of records 416 and 431 in the form illustrated in FIG. 18 requires the substantial absence of any dip of the reflecting interfaces. If the reflecting segment $S_1$ extends at either a positive or negative angle relative to the illustrated horizontal reflecting horizon $RH_1$, cancellation problems arise. If the dip should be such that the acoustic energy reflected from two points differ in time by one-half the period of the respective waveforms, then, of course, cancellation would take place upon stacking or compositing of a plurality of such records.

Figure 20:
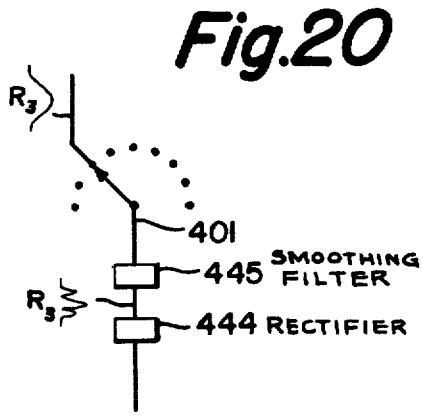
FIG. 20 is a fractional view illustrating a modification of the system of FIG. 17.

However, if dip be present, the records may be composited by providing a static shift to compensate for the dip as by manually changing the positions of the recording heads R for the record 416 of FIG. 18. A set of knobs may be provided for this purpose as described in connection with the knobs 75 and 76 of FIG. 3. Alternatively, and as illustrated in FIG. 20, a full wave rectifier 444 may be inserted in the output from the weighting potentiometers 427, preferably with a smoothing filter 445, to thus produce resultant signals of the same polarity, one such signal being illustrated in FIG. 20 for the reflection $R_3$ as it would appear prior to the smoothing filter as well as subsequent thereto. Thus, instead of negative and positive excursions of the resultant signals of record 416, all signals will have the same polarity, either positive or negative, and hence there is avoided the cancellation problems arising due to dip of the kind above described.

It will be recalled that one of the features of the expanding-spread, important to the present invention, is the multiple coverage of selected segments as for example the segment $S_1$ of FIG. 2. This was further exemplified by the illustration of the stratigraphic columns in FIG. 1A. If the shotpoints all be located to one side of a selected stratigraphic column and the detectors as a spread be displaced to the opposite side thereof, there will be obtained a plurality of paths of acoustic energy reflected from the same point on the subsurface segment. By thus achieving multiple records from the same subsurface points on a selected segment of the stratigraphic column, the requirements of an expanding spread will have been met and hence the present invention can be utilized with field seismograms made in the described manner.

It is to be observed that by scanning the several seismograms by the dynamic functions including different assumed constant velocities, there is determined quite explicitly the average velocity for each of the reflections. With such information plotted against vertical time $T_o$, there will have been determined quite explicitly a graph similar to the one illustrated in FIG. 3D and hence this graph may now be utilized for exact normal moveout corrections of the original seismic data. Further, this information has many other uses, i.e., (1) continued updating of the normal moveout curve used in multiple coverage shooting, (2) continually varying lateral velocity for more accurate depth conversion, (3) continual varying lateral velocity for control of migration and depth conversion, and (4) the lithologic inferences possible to make from these surface measurements of velocity variation.

Having described the invention in connection with certain embodiments thereof, it is to be understood that further modifications may suggest themselves to those skilled in the art and that features of one modification may be utilized with the other modification and vice versa and that all such modifications and variations within the scope of the appended claims are part and parcel of the present invention.

What is claimed is:

1. In seismic exploration, the method of establishing weathering corrections in the form of individual static time-corrections for the signals from each of a plurality of seismic detecting stations spaced one from the other along a traverse which comprises generating at generating stations seismic signals adjacent selected ones of said detecting stations whereby the magnitudes of said static corrections at said selected stations are known, applying said known static corrections respectively to signals generated at said selected stations, applying relative to said known corrections interpolated static corrections to the remaining signals generated at the remaining of said detecting stations, and thereafter generating at generating stations further seismic signals at spaced locations along said traverse, detecting at the location of a first group of said stations and thereafter at other locations of other groups of said stations seismic signals, said locations being selected in reference to the locations of said second-named generating stations for the production of an expanding-spread seismic-section having applied to the signals from each of said detecting stations said static corrections, and applying dynamic normal moveout corrections to the signals of each group of said detectors to correct them for geometrical spreading, adding together the signals of each said group of detecting stations to form composited signals in number equal to the number of said groups, sequentially applying to said composited signals time-corrections of differing magnitude and respectively conforming with scanning functions respectively proportional to the magnitudes of the differences between one hyperbolic function and that of a differing hyperbolic function, adding together said composited signals after application thereto of each said time-correction and separately recording the resultant summation signals for each differing time-correction applied thereto for identifying signals representative of single reflections and of multiple reflections.

2. The method of claim 1 in which said signals representative of multiple reflections are inverted and added to said composited signals of said groups to remove therefrom signals representative of said multiple reflections and concurrently to remove their effects from the time occurrence of signals representative of said single reflections, and varying said normal moveout corrections by amounts determined by the magnitudes of said scanning functions and at times determined by the time-occurrence on said summation signals of primary reflections to establish precise conformity with the velocity distribution of subsurface formations disposed below said traverse.

3. The method of claim 2 in which said signals of said expanded-spread record-section are re-recorded after application thereto of said modified normal moveout corrections, and adding together the signals within each of said groups to form composited signals equal in number to the number of said groups whereby multiple reflections cancel while single reflections add cumulatively.

4. The method of claim 2 in which said signals of said expanded-spread record-section after application thereto of said modified normal moveout corrections are recorded as follows: (1) the traces forming an intermediate split-spread in the expanded-spread seismic-section are recorded without addition thereto of other traces, (2) after expiration of a time interval corresponding with the arrival time of shallow reflections there are added on a trace-by-trace basis to said centrally disposed traces signals from the detecting stations of spreads located to the right and to the left of the stations forming said split-spread, and (3) after the expiration of a time interval exceeding that during which reflections from reflecting beds of intermediate depth appear adding on a trace-by-trace basis to the sum of the preceding signals the signals from the detecting stations forming the outermost spreads of the expanded-spread seismic-section.

5. The method of claim 4 in which linear dip-scanning corrections are applied to said last-named composited signals, separately recording the resultant composited signals with each differing linear dip-scanning correction applied thereto for establishing in terms of the magnitude of each dip-scanning correction the dip of each reflecting bed.

6. The method of claim 5 in which said last-named composited signals are added together for production of a single composited signal in which said reflections appear in succession thereon.

7. The method of establishing magnitudes of weathering corrections individual to each of a plurality of detecting stations along a line of substantial length and forming an expanding-spread section which comprises generating seismic signals at a plurality of said detecting stations along said line, concurrently recording signals from first one and then the remainder of groups of said detector stations, each group including a plurality of stations symmetrically located along said line with respect to a generating station to form a split-spread, recording the signals from each said split-spread, the first-arrival times at the detecting stations located centrally of each split-spread providing the known magnitudes of static weathering corrections applicable thereto, applying said static corrections to said signals detected at said centrally located stations, generating playback signals from said split-spread recordings, during the generation of said playback signals applying dynamic normal moveout corrections thereto, visually displaying said signals, applying static corrections to bring into time-alignment corresponding components of said playback signals with said components of said centrally corrected signals, recording seismic signals from said detecting stations to form an expanding spread section, and applying said static corrections to playback signals from the recorded signals of said expanded-spread section the amount of each static correction for each detecting station corresponding with the static correction applied to that detecting station as determined by said split-spread records.

8. The method of claim 7 in which dynamic corrections are applied to said playback signals of said expanded-spread section to correct for normal moveout and recording said corrected signals to form a corrected expanded-spread record-section.

9. In seismic exploration the method which comprises (1) generating a first seismic impulse at a first sending station, (2) at a plurality of detecting stations, two of which are located at points of known weathering and all of which are spaced one from another along a line substantial distances from said first sending station, generating a first set of signals representative of seismic waves resulting from said first seismic impulse and each including components thereof reflected upwardly from a first segment of a subsurface bed intermediate said first sending station and said detecting stations, (3) storing said first set of signals, (4) generating a second seismic impulse at a second sending station located adjacent said detecting stations, (5) at said detecting stations generating a second set of signals representative of seismic waves resulting from said second seismic impulse and each including components thereof reflected upwardly from a second segment of subsurface beds more directly under said detecting stations than said first segment, (6) introducing individual static adjustments in the two of said second set of signals generated at said two detecting stations to establish a base for weathering correction for the remainder of said detecting stations, (7) modifying said second set of signals by time-variable amounts to correct for geometrical time distortion, (8) applying individual static adjustments to the signals of said second set of signals other than said two signals for alignment of said components therein to correct the remainder of said second set of signals for weathering, and (9) introducing the same static adjustments to said first set of signals as introduced to said second set of signals to correct the said first set of signals for weathering peculiar to each of said detecting stations.

10. In seismic exploration the method which comprises (1) generating a first set of signals representative of seismic waves resulting from generation of a first seismic impulse at a first sending station and including components reflected upwardly from a first segment on a subsurface bed located intermediate said first sending station and arriving at detecting stations located along a line extending from said first sending station, (2) storing said first set of signals, (3) generating a second set of signals representative of seismic waves resulting from generation of a second seismic impulse at a second sending station and including components reflected upwardly from a second segment on said subsurface bed located substantially directly below said detecting stations, (4) applying individual weathering correcting static adjustments to two signals of said second set from two of said detecting stations at which weathering is known, (5) applying to said second set of signals time variable adjustments representative of differences between the travel paths of said second acoustic impulse to succeedingly deeper beds and paths extending from said detecting stations perpendicular to said second segment to produce a modified set of signals representative of the travel of said second acoustic impulse over such perpendicular paths, (6) establishing alignment in a reflection component common to said modified set of signals by applying individual static adjustments to signals of said modified set of signals other than said two signals, and (7) applying to each signal of said first set the same individual static adjustment as applied to the signal in said second set from the same detecting station to correct said first set for weathering peculiar to each said detecting station.

11. In seismic exploration the method which comprises (1) generating a first set of signals representative of seismic waves resulting from generating of a first seismic impulse at a first sending station and including components reflected upwardly from a first segment on a subsurface bed intermediate said first sending station and arriving at detecting stations located along a line extending from said first sending station, (2) storing said first set of signals, (3) generating a second set of signals representative of seismic waves resulting from generation of a second seismic impulse at a second sending station and including components reflected upwardly from a second segment on said subsurface bed located substantially directly below said detecting stations, (4) applying individual static weathering correcting adjustments to two signals of said second set from two of said detecting stations at which surface weathering conditions are known, (5) applying to said second set of signals time-variable adjustments representative of differences between the travel paths of said second seismic impulse to succeedingly deeper beds and paths extending from said detecting stations perpendicular to said segment to produce a modified set of signals representative of the travel of said second seismic impulse over such perpendicular paths, (6) establishing alignment of a reflection component common to said modified set of signals by applying individual static adjustments to signals of said modified set of signals other than said two signals, (7) generating a modified first set of signals by reproducing each signals of said first set of signals and applying thereto the same individual static adjustment as applied to the signal in said second set from the same detecting station to correct said first set for weathering peculiar to each detecting station, and (8) recording said modified first set of signals to form an expanding-spread record section corrected for differences in weathering underlying individual detecting stations.

12. A system of establishing individual weather corrections for each of a plurality of seismic detectors spaced one from the other along a line, comprising means including a first group of transducers for generating signals from first groups of said detectors which, in respect to sources of seismic energy applied to the earth form split-spreads whereby the weathering corrections for detectors located midway of each split-spread are known, means for adjusting the transducers corresponding with each of said detectors located midway of said split-spreads for introducing time-corrections in the signals generated thereby which correspond respectively with said known weathering corrections, display means having a plurality of input circuits, means connecting a plurality of said transducers to said input circuits of said display means and including at least two detectors for which said weathering corrections are known, means for adjusting said transducers to introduce time-alignment to selected common components of signals from said detectors to bring said components into alignment with like components of said detectors in respect to which said weathering corrections have been made, a second set of transducers for reproducing from said detectors an expanding-spread record-section, and means operable concurrently with adjustment of said first-named transducers for correspondingly adjusting the transducers of said second set to introduce weathering corrections on a trace-by-trace basis corresponding with those applied to said first-named transducers.

13. The system of claim 12 in which there are provided normal moveout means for introducing dynamic corrections for the signals from said transducers forming said split-spreads, to compensate for geometrical spreading, and in which said weathering corrections for all of said transducers except those for which weathering corrections are known are introduced during their relative adjustment by said normal moveout means.

14. In seismic exploration, the method which comprises applying to seismic signals of an expanded-spread record-section dynamic corrections based upon an approximate velocity profile of formations underlying said section and representative of the differences between the travel paths of acoustic energy from spaced generating stations and a path perpendicular to a common reflecting segment, combining the signals from selected groups of traces of said record-section to form sets of seismic signals in number equal to the number of said groups, generating a plurality of sets of summation signals each of which is representative of the sum of each said set of signals displaced in time one from the other in accordance with differences between a plurality of preselected hyperbolic functions, wherein some of said summation signals include reflection components which are indicative of multiple reflections and others are indicative of single reflections, correcting to a more exact velocity profile said time corrections by modifying said dynamic time corrections based upon said approximate velocity profile by amounts related to the degree of eccentricity of said hyperbolic functions which produce cumulative addition of reflection signals, reproducing said signals of said expanding-spread record-section, and applying to said last-named signals dynamic corrections based upon said more exact velocity profile.

[15. A method of producing an improved record of seismic data which method comprises: generating signals corresponding with a seismic section composed of seismograms including multiple reflections and primary reflections reflected from common segments of subsurface reflecting horizons after travel to said segments over a plurality of paths, said primary reflections and said multiple reflections appearing across said section with time differences closely approximating hyperbolic arcs of varying eccentricities:

repeatedly scanning the signals along said seismograms and across said section under the control of different hyperbolic scanning functions of respectively different eccentricities closely approximating hyperbolic arcs to identify with reference to said scanning functions the signals representative of primary reflections;

producing corrective functions in response to those of said scanning functions which produce said identification of signals representative of said primary reflection; and thereafter combining the signals of said seismograms, after normal moveout correction thereof in time-relation at least in part determined by said corrective functions.]

16. [The method of claim 15 in which there is performed the additional step of] *A method of producing an improved record of seismic data which method comprises:*

*generating signals corresponding with a seismic section composed of seismograms including multiple reflections and primary reflections reflected from common segments of subsurface reflecting horizons after travel to said segments over a plurality of paths, said primary reflections and said multiple reflections appearing across said section with time differences closely approximating hyperbolic arcs of varying eccentricities;*

*repeatedly scanning the signals along said seismograms and across said section under the control of different hyperbolic scanning functions of respectively different eccentricities: closely approximating hyperbolic arcs to identify with reference to said scanning functions the signals representative of primary reflections;*

*producing corrective functions in response to those of said scanning functions which produce said identification of signals representative of said primary reflections;*

*thereafter combining the signals of said seismograms, after normal moveout correction thereof in time-relation at least in part determined by said corrective functions; and* establishing the relationship between vertical travel time and average velocity of the acoustic energy to each corresponding reflecting point located at successively greater depth in accordance with said corrective functions which produce identification of said signals representative of said primary reflections.

17. The method of claim 15 in which the additional step is performed of compositing the seismograms of said seismic section which are representative of reflections from a common depth point to increase the amplitude of said signals representative of primary reflections and to attenuate signals representative of multiple reflections.

18. The method of claim 17 in which the additional step is performed of separately and reproducibly recording said signals of increased amplitude and representative of said primary reflections.

19. The method of claim 18 in which the additional steps are performed of applying a series of different linear dip-scanning corrections to said last-named recorded signals, separately recording the resultant signals from each differing linear dip-scanning correction applied thereto for establishing in terms of the magnitude of each dip-scanning operation the dip of each reflecting horizon, and adding together said resultant signals for production of a single composited signal in which the reflections appear in succession on a single trace of a record.

20. The method of claim 15 in which only centrally located seismograms forming said seismic section are composited to increase the amplitude of said signals representative of primary reflections and to attenuate signals representative of multiple reflections resulting from reflecting horizons at shallow depth, and at increasing depths of said reflecting horizons compositing with said centrally located seismograms additional seismograms located respectively on opposite sides of said centrally located seismograms thereby to eliminate the effect of first breaks and surface noise from the outermost groups of seismograms with resultant enhanced signals representative of reflections from the deeper reflecting horizons.

21. The method of claim 15 in which the eccentricities of said hyperbolic scanning functions cover ranges at least as great as the range of eccentricities in the hyperbolic arcs formed by said primary reflections and by said multiple reflections.

22. The method of claim 21 in which signals representative of multiple reflections identified by said scanning functions are inverted in phase, and adding said inverted multiple reflections in time coincidence with the appearance of the multiple reflections of said seismograms substantially to cancel from said seismograms signals representaive of said multiple reflections.

23. The method of claim 22 in which there is performed the additional step of applying the phase-inverted signals to the inverse of said hyperbolic scanning functions for generating a plurality of traces on which there appear only the phase-inverted signals representative of said identified multiple reflections.

24. The method of claim 15 in which there are a plurality of seismic sections respectively to predetermined points along a traverse of the area being explored, the plurality of common segments of successively deeper reflecting horizons for each said seismic section delineating a stratigraphic column, and which comprises, after the combining of the signals following said normal moveout corrections established at least in part by said corrective functions, estalishing from the time-amplitude functions of the appearance thereon of primary reflections and interval-velocity profile for each of said columns, and registering such interval-velocity profiles at spaced points along said traverse representative of the surface locations of said columns.

25. In seismic exploration where a family of seismograms are produced each consisting of a set of signals each including components representative of seismic waves reflected from a set of subsurface reflecting points after travel to said point over paths, which paths for any one of said seismograms largely differ from the paths for any other of said seismograms, the method which comprises generating a control function *closely approximating a hyprbolic arc and* dependent upon time occurrences of successively deeper reflections and an assumed velocity distribution of earth formations through which said paths extend, dynamically shifting in time components of each of said signals in dependence upon said control function to correct the time occurrence of said components for spread geometry distortion to produce corrected sets of said signals, combining signals of each of said corrected sets of signals which include reflections from the same point in said set of points to form a composite record representative of reflections traveling over all of said paths, and recording the combined signals, *and establishing the relationship between vertical travel time and average velocity of the seismic waves in accordance with the combined signals.*

26. In seismic exploration where a family of seismograms are produced each consisting of a set of signals including reflection components representative of seismic waves reflected from a set of subsurface reflecting points after travel to said points over paths which for any one of said seismograms differ from those of other of said seismograms, the method which comprises individually modifying the time relationships between components of each of the signals in said set of signals in dependence upon an assumed velocity distribution along said paths and the geometrical relations between said paths and said reflecting points substantially to eliminate time distortion in a resultant secondary set of seismic signals, generating a control function dependent upon variations in time occurrences of successively later reflection components in said secondary set of signals to modify and make exact said assumed velocity distribution, individually modifying the time relationship between components of each of the signals in said set of signals in dependence upon said control function to eliminate time distortion in a resultant modified set of signals, and recording said modified second set of signals.

27. The method of identifying the presence of multiples in signals from an expanded-spread record which comprises applying to said signals *along said record* time-adjustments the magnitudes of which vary across the record in accordance with a plurality of hyperbolic functions of different eccentricities, *each being uniquely related at any point along said record to a specific velocity* and through a range of hyperbolic functions whose curves have opposite concavities, adding together after application of each of said corrections the resultant signals whereby signals representing multiple reflections add together cumulatively upon application of certain of said corrections and single reflections add together cumulatively upon application of other of said corrections to said signals.

28. In seismic exploration the method comprising generating signals corresponding with an expanding-spread seismic record-section, combining said signals with successively applied time-corrections to provide a plurality of summation signals, said successively applied time-corrections corresponding with hyperbolic sweeping functions each of varying eccentricity with respect to said signals of said record-section, *the hyperbolic sweeping functions being representative of the velocities of the acoustic energies which gave rise to said signals,* and separately storing said plurality of summation signals along like space scales for producing cumulative addition of signals identifiable in terms of the eccentricity of said sweeping functions *and thus of the velocities.*

29. In seismic exploration the method comprising generating signals corresponding with an expanding-spread record-section across which there appear primary reflections and multiple reflections with time differences across said section closely approximating hyperbolic arcs of varying eccentricities, combining said signals with each of a plurality of differing time changes to provide a corresponding plurality of summation signals, a first group of said time changes including hyperbolic sweeping functions of eccentricities covering a range at least as great as the range of eccentricities in said hyperbolic arcs formed by said primary reflections and a second group of said time changes including hyperbolic sweeping functions of eccentricities covering a range at least as great as the range of eccentricities in hyperbolic arcs formed by said multiple reflections, and separately storing said plurality of summation signals respectively identifiable in terms of the eccentricities of said sweeping functions, *and thus representative of the velocities of the primary reflection and the velocities of the multiple reflection.*

30. The method of claim 29 in which said generated signals toward the end-traces of said summation signals are amplified relative to the signals representative of the intermediate traces.

31. The method of claim 29 in which said signals of the several traces corresponding with said expanding-spread record-section are modified in amplitude to provide increasingly greater amplitudes of the signals of the traces spaced outwardly of the central traces.

32. In seismic exploration where a family of seismograms are produced, each seismogram including multiple reflection signals and a plurality of single reflection signals representative of waves reflected from subsurface reflecting points after travel to said points over a plurality of paths, each of which for any one of said seismograms differs from the path for any other of said seismograms the method which comprises:

generating signals from each of said seismograms, applying to said generated signals a succession of dynamic time-adjustments along said seismograms, one for each said seismogram, and of magnitude to correct for normal moveout delays present in said seismograms, time-shifting said generated signals, the magnitude of the time shifts varying across said family of seismograms in accordance with a plurality of approximate hyperbolic functions of different eccentricities, *each being uniquely related at any point along said seismogram to a specific velocity,* and adding together said generated signals for the production of summation signals representing (a) multiple reflections which add together cumulatively for certain of said hyperbolic functions, and (b) single reflections which add together cumulatively for other of said hyperbolic functions.

33. The method of claim 32 in which said family of seismograms for an expanded-spread, and in which said signals of said family of seismograms are modified for establishing greater amplitudes of the signals of the seismograms spaced outwardly of the central seismograms of the expanded-spread than the amplitudes of the signals of the centrally located seismograms of said expanded-spread.

34. The method of claim 32 in which there are recorded, for each dynamic time-adjustment resultant summation signals for establishment of the relationship between vertical travel time and average velocity of the acoustic energy corresponding reflecting point located at successively greater depths, and applying to said family of seimograms dynamic normal moveout corrections based upon said values of vertical travel time and of said average velocities so determined.

35. The method of utilizing an automatic computing system to treat seismic data representative of characteristics of earth formations traversed by a stratigraphic column comprising the steps of:

a. inputting to the automatic computing system a seismic section derived from the seismic data and comprised of seismograms including primary reflections reflected from common segments of subsurface reflecting horizons in the column after travel to said segments over a plurality of paths;

b. repeatedly searching for signals across said section and along said seismograms under control of different hyperbolic functions *representative of velocities of the acoustic energy over said plurality of paths* to determine the presence of primary reflections;

c. producing from the result of said searching steps functions which identify alignment of reflections with respect to the eccentricities of said hyperbolic functions[; and], *which functions represent the velocities of the earth formation paths traversed by said accustic energy; and* d. utilizing said functions for producing normal moveout corrections for said seismic section.

36. A system for use in seismic exploration wherein a seismic section is delineated by a plurality of seismograms including signals representing multiple reflections and primary reflections reflected from common segments of subsurface reflecting horizons after travel to said segments over a plurality of paths, said primary reflections and said multiple reflections appearing across said section with time differences closely approximating hyperbolic arcs of varying eccentricities, said system comprising:

means for generating hyperbolic scanning functions closely approximating hyperbolic arcs of different respective eccentricities;

means operable under the control of said hyperbolic scanning functions for repeatedly scanning the signals along said seismograms and across said section to identify with reference to said scanning functions the signals representative of primary reflections;

means responsive to each said scanning function which identifies signals representative of primary reflections for producing a corrective function; and means for applying to the plurality of seismograms dynamic normal moveout corrections based upon the values of vertical travel time and of the average velocities, which corrections at least in part are determined by said corrective functions.

37. The system of claim 36 in which means are provided for compositing the seismograms of said seismic section which are representative of reflections from a common depth point to increase the amplitude of said signals representative of primary reflections and to attenuate signals representative of multiple reflections.

38. The system of claim 37 in which means are provided for separately and reproducibly recording said signals of increased amplitude representative of said primary reflections.

39. The system of claim 38 in which means are provided for applying a series of different linear dip-scanning corrections to said last-named recorded signals, the resultant signals being separately recorded with each differing linear dip-scanning applied thereto for establishing in terms of the magnitude of each dip-scanning operation of the dip of each reflecting horizon.

40. The system of claim 36 comprising means for compositing only centrally located seismograms forming said seismic section to increase the amplitude of said signals representative of primary reflections and to attenuate signals representative of multiple reflections resulting from reflecting horizons at shallow depth, and means at increasing depths of said reflecting horizons for compositing with said centrally located seismograms additional seismograms located respectively on the opposite sides of said centally located seismograms thereby to eliminate the effect of first breaks and surface noise from the outermost groups of seismograms with resultant enhanced signals representative of reflections from the deeper reflecting horizons.

41. A system for establishing the magnitude and sense of any error in a known velocity distribution function which may only approximate the velocity distribution function of a given stratigraphic column which comprises means for producing a first set of expanded-spread seismograms each of which includes seismic reflections from reflecting layers encountered in said column, means for applying corrections to said first set including dynamic corrections based upon said known velocity distribution function to produce a second set, means for generating error signals representative in magnitude and sense of the magnitude and direction respectively of the variations in time occurrence of successive reflections in said second set, and registering means for recording said error signals.

42. A system for establishing an exact velocity distribution function from a set of expanded spread seismic reflection signals statically corrected both for weathering and for elevation along the expanded-spread which comprises means for establishing an approximate velocity distribution function for formations underlying said spread, means for applying to said set dynamic corrections dependent upon said approximate velocity distribution function to produce a secondary set approximately corrected for spread geometry, means for reproducing said secondary set, and means for modifying said approximate velocity distribution function at time points therealong corresponding with the time occurrence of reflection signals in said secondary set where the amounts of said corrections and the sense thereof are respectively dependent upon the magnitude and direction of variations in the time occurrence of reflection signals in said secondary set.

43. A system for establishing an exact velocity distribution function from a set of expanded-spread seismic reflection signals statically corrected both for weathering and for elevation along the expanded-spread which comprises means for applying to said set dynamic corrections dependent upon an approximate velocity distribution function for formations underlying said spread to produce a secondary set approximately corrected for spread geometry, means for reproducing said secondary set, means for modifying said approximate velocity distribution function at time points therealong corresponding with the time occurrence of reflection signals in said secondary set where the amounts of said corrections and the sense thereof are respectively dependent upon the magnitude and direction of variations in the time occurrence of reflection signals in said secondary set, and means for registering the modified velocity distribution function.

44. A system for establishing an exact velocity distribution function from a set of expanded-spread seismic reflection signals statically corrected both for weathering and for elevation along the expanded spread which comprises means for applying to said set dynamic corrections dependent upon an approximate velocity distribution function $\Delta T$ vs. $T_o$ where $\Delta T$ is the magnitude of correction at a given record time $T_o$ for formations underlying said spread to produce a secondary set approximately corrected for spread geometry, means for reproducing said secondary set, means for modifying said approximate velocity distribution function at time points therealong corresponding with the time occurrence of reflection signals in said secondary set where the amounts of said corrections and the sense thereof are respectively dependent upon the magnitude and direction of variations in the time occurrence of reflection signals in said secondary set to produce a function $\Delta T$ vs. $T_o$, where $\Delta T$ is defined as the exact velocity distribution function and means for producing an apparent average velocity function $V_a$ in accordance with the expression $$V_a = \sqrt{\frac{x^3}{\Delta T(2T_o + \Delta T)}}$$

where x is the horizontal distance along said spread between sending and receiving stations for a given signal in said set.

45. In seismic exploration, the method of generating signals corresponding with a seismic section comprised of seismograms including primary reflections reflected from common segments of subsurface reflecting horizons after travel to said segments over a plurality of paths, said primary reflections appearing across said record section with time differences closely approximating hyperbolic arcs of varying eccentricites, combining said signals with each of a plurality of differing time changes to provide a corresponding plurality of summation signals, a first group of said time changes including hyperbolic sweeping functions of eccentricities covering a range at least as great as the range of eccentricities of said hyperbolic arcs formed by said primary reflections, [and] *said hyperbolic sweeping functions being representative of the velocities of the acoustic energy over said plurality of paths,* separately storing said plurality of summation signals respectively identifiable in terms of the eccentricities of said sweeping functions, *and establishing the relationship between vertical travel time and average velocity of the acoustic energy in accordance with the stored summation signals.*

46. The method of claim 45 in which functions are generated from said summation signals above a predetermined amplitude, and thereafter combining the signals of said seismograms after normal moveout corrections at least in part determined by said functions.

47. The method of claim 46 in which there is performed the additional steps of:

applying a scanning function to said seismograms after correction for normal moveout for determination of direction and extent, if any, of the dipping of said reflecting horizons, and computing from the direction and extent of dipping of said horizons a velocity log of the earth corrected for dip.

48. The method of claim 47 in which there is performed the additional step of:

inverse filtering said reflections for producing a velocity log of the earth extending to said lowermost one of said segments.

*49. The method of dynamically time correcting seismic traces comprised of expanded spread data with a correcting function, the values of which are determined by the velocities of the earth formations traversed by reflected energy from a multiplicity of subsurface bedding planes comprising the steps of (1) applying time shifts to each set of reflected energies along hyperbolic-like sweeping functions, (2) adding the reflected energies along each of said functions to obtain a maximum value, each maximum value being related uniquely to one of said sweeping functions and to a specific velocity, (3) establishing with said velocities said correcting function, (4) time shifting said traces under control of said correcting function, and (5) stacking said time-shifted traces to obtain a single trace with an enhanced signal to raise ratio.*

* * * * *

UNITED STATES PATENT AND TRADEMARK OFFICE

CERTIFICATE OF CORRECTION

PATENT NO. : Re. 30,347

DATED : July 22, 1980

INVENTOR(S) : Albert W. Musgrave

It is certified that error appears in the above-identified patent and that said Letters Patent are hereby corrected as shown below:

Column 3, line 21 "and subsurface" should be -- the subsurface --.

Column 5, line 40 "movement" should be -- moveout --.

Column 8, line 50 "50a - 50c" should be -- 50a - 50e --.

Column 11, line 38 "elements" should be -- element --.

Column 14, line 13 "be" should be -- been --.

Column 14, line 64 "value" should be -- values --.

~~Col. 17, line 13-14~~ "pick-up-up heads" should be -- pick-up heads --.

Column 24, line 53 "ad" should be -- and --.

Column 25, line 15 "it" should be -- if --.

Column 26, line 29 "$R_1$ - Rhd 3" should be -- $R_1$ - $R_3$ --.

Column 27, line 9 "$R_2$ should be -- $R_3$ --.

Column 27, line 58 "expanded -" should be -- expanded --.

Column 28, line 15 "display are" should be -- display and --.

Column 32, line 30 "$V_2$ and $V_3$" should be -- $V_2 + V_3$.

Column 33, line 39 "tine" should be -- time --.

Column 37, line 2 "the velocity" should be -- the low velocity --.

Column 41, line 26 "expanding spread" should be -- expanding-spread --.

Column 42, line 38 "generating should be -- generation --.

Column 43, line 23 "to" should be -- of --.

UNITED STATES PATENT AND TRADEMARK OFFICE

CERTIFICATE OF CORRECTION

PATENT NO. : Re. 30,347

DATED : July 22, 1980

INVENTOR(S) : Albert W. Musgrave

It is certified that error appears in the above—identified patent and that said Letters Patent is hereby corrected as shown below:

Column 44, line 10 "eccentricities:" should be -- eccentricities; --.

Column 44, line 14 "eccentricities" snould be -- eccentricities: --.

Column 45, line 66 "hyproblic" should be -- hyperbolic --.

Column 46, line 32 "relationship" snould be -- relationships --.

Signed and Sealed this

*Twenty-first* Day of *April 1981*

[SEAL]

*Attest:*

RENE D. TEGTMEYER

*Attesting Officer* *Acting Commissioner of Patents and Trademarks*